(12) United States Patent
Petersen

(10) Patent No.: US 9,244,229 B2
(45) Date of Patent: Jan. 26, 2016

(54) MANAGED FIBER CONNECTIVITY SYSTEMS

(71) Applicant: ADC Telecommunications, Inc., Berwyn, PA (US)

(72) Inventor: Cyle D. Petersen, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/271,552

(22) Filed: May 7, 2014

(65) Prior Publication Data

US 2014/0241692 A1 Aug. 28, 2014

Related U.S. Application Data

(62) Division of application No. 13/446,607, filed on Apr. 13, 2012, now Pat. No. 8,757,895.

(60) Provisional application No. 61/476,032, filed on Apr. 15, 2011.

(51) Int. Cl.
*G02B 6/38* (2006.01)

(52) U.S. Cl.
CPC ............ *G02B 6/3895* (2013.01); *G02B 6/3817* (2013.01); *G02B 6/3825* (2013.01); *G02B 6/3878* (2013.01)

(58) Field of Classification Search
CPC .............................. G02B 6/3825; G02B 6/3895
See application file for complete search history.

(56) References Cited

U.S. PATENT DOCUMENTS

| 4,953,194 A | 8/1990 | Hansen et al. |
| 4,968,929 A | 11/1990 | Hauck et al. |
| 5,052,940 A | 10/1991 | Bengal |
| 5,161,988 A | 11/1992 | Krupka |
| 5,222,164 A | 6/1993 | Bass, Sr. et al. |
| 5,305,405 A | 4/1994 | Emmons et al. |
| 5,317,663 A | 5/1994 | Beard et al. |

(Continued)

FOREIGN PATENT DOCUMENTS

| CN | 101968558 A | 2/2011 |
| DE | 41 14 921 A1 | 11/1992 |

(Continued)

OTHER PUBLICATIONS

European Search Report for Application No. 12771750.2 mailed Sep. 1, 2014.

(Continued)

*Primary Examiner* — Omar R Rojas
(74) *Attorney, Agent, or Firm* — Merchant & Gould P.C.

(57) ABSTRACT

A communications connection system includes an SC fiber optic connector including a storage device having memory configured to store physical layer information. The storage device also includes at least one contact member that is electrically connected to the memory. The communications connection system also includes a fiber optic adapter module having one or more media reading interfaces. Each media reading interface is configured to read physical layer information stored on one of the fiber optic connectors received at the adapter module. Certain types of media reading interfaces extend between an internal passage of the adapter module and an external surface of the adapter module.

19 Claims, 46 Drawing Sheets

(56) References Cited

U.S. PATENT DOCUMENTS

| | | |
|---|---|---|
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,419,717 A | 5/1995 | Abendschein et al. |
| 5,467,062 A | 11/1995 | Burroughs et al. |
| 5,483,467 A | 1/1996 | Krupka et al. |
| 5,579,425 A | 11/1996 | Lampert et al. |
| 5,685,741 A | 11/1997 | Dewey et al. |
| 5,821,510 A | 10/1998 | Cohen et al. |
| 5,910,776 A | 6/1999 | Black |
| 6,002,331 A | 12/1999 | Laor |
| 6,116,961 A | 9/2000 | Henneberger et al. |
| 6,222,908 B1 | 4/2001 | Bartolutti et al. |
| 6,234,830 B1 | 5/2001 | Ensz et al. |
| 6,285,293 B1 | 9/2001 | German et al. |
| 6,300,877 B1 | 10/2001 | Schannach et al. |
| 6,330,307 B1 | 12/2001 | Bloch et al. |
| 6,350,148 B1 | 2/2002 | Bartolutti et al. |
| 6,409,392 B1 | 6/2002 | Lampert et al. |
| 6,424,710 B1 | 7/2002 | Bartolutti et al. |
| 6,437,894 B1 | 8/2002 | Gilbert et al. |
| 6,456,768 B1 | 9/2002 | Boncek et al. |
| 6,499,861 B1 | 12/2002 | German et al. |
| 6,511,231 B2 | 1/2003 | Lampert et al. |
| 6,522,737 B1 | 2/2003 | Bartolutti et al. |
| 6,574,586 B1 | 6/2003 | David et al. |
| 6,636,152 B2 | 10/2003 | Schannach et al. |
| 6,725,177 B2 | 4/2004 | David et al. |
| 6,743,044 B2 | 6/2004 | Musolf et al. |
| 6,802,735 B2 | 10/2004 | Pepe et al. |
| 6,808,116 B1 | 10/2004 | Eslambolchi et al. |
| 6,898,368 B2 | 5/2005 | Colombo et al. |
| 6,905,363 B2 | 6/2005 | Musolf et al. |
| 6,932,517 B2 | 8/2005 | Swayze et al. |
| 6,971,895 B2 | 12/2005 | Sago et al. |
| 7,081,808 B2 | 7/2006 | Colombo et al. |
| 7,088,880 B1 | 8/2006 | Gershman |
| 7,123,810 B2 | 10/2006 | Parrish |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,210,858 B2 | 5/2007 | Sago et al |
| 7,226,217 B1 | 6/2007 | Benton et al. |
| 7,234,944 B2 | 6/2007 | Nordin et al. |
| 7,297,018 B2 | 11/2007 | Caveney et al. |
| 7,315,224 B2 | 1/2008 | Gurovich et al. |
| 7,352,289 B1 | 4/2008 | Harris |
| 7,356,208 B2 | 4/2008 | Becker |
| 7,458,517 B2 | 12/2008 | Durrant et al. |
| 7,519,000 B2 | 4/2009 | Caveney et al. |
| 7,552,872 B2 | 6/2009 | Tokita et al. |
| 7,869,426 B2 | 1/2011 | Hough et al. |
| 7,872,738 B2 | 1/2011 | Abbott |
| 7,934,022 B2 | 4/2011 | Velleca et al. |
| 2002/0081076 A1 | 6/2002 | Lampert et al. |
| 2004/0052471 A1 | 3/2004 | Colombo et al. |
| 2004/0054761 A1 | 3/2004 | Colombo et al. |
| 2004/0117515 A1 | 6/2004 | Sago et al. |
| 2004/0120657 A1 | 6/2004 | Sago et al. |
| 2004/0240807 A1 | 12/2004 | Frohlich et al. |
| 2005/0249477 A1 | 11/2005 | Parrish |
| 2006/0160395 A1 | 7/2006 | Macauley et al. |
| 2006/0193591 A1 | 8/2006 | Rapp et al. |
| 2006/0228086 A1 | 10/2006 | Holmberg et al. |
| 2007/0116411 A1 | 5/2007 | Benton et al. |
| 2007/0237470 A1 | 10/2007 | Aronson et al. |
| 2008/0100456 A1 | 5/2008 | Downie et al. |
| 2008/0100467 A1 | 5/2008 | Downie et al. |
| 2008/0175550 A1 | 7/2008 | Coburn et al. |
| 2008/0310795 A1 | 12/2008 | Parkman, III et al. |
| 2009/0034911 A1 | 2/2009 | Murano |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2011/0222819 A1 | 9/2011 | Anderson et al. |
| 2011/0262077 A1* | 10/2011 | Anderson et al. ............... 385/78 |

FOREIGN PATENT DOCUMENTS

| | | |
|---|---|---|
| DE | 102 44 304 | 3/2004 |
| DE | 10 2004 033 940 A1 | 2/2006 |
| EP | 1 199 586 A2 | 4/2002 |
| EP | 1 467 232 A1 | 10/2004 |
| EP | 1 662 287 A1 | 5/2006 |
| WO | WO 2007/061490 A2 | 5/2007 |
| WO | WO 2010/001400 A1 | 1/2010 |
| WO | WO 2010/121639 A1 | 10/2010 |

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes!* NORDX/CDT © 2003 (6 pages).

International Search Report and Written Opinion for PCT/US2012/033578 mailed Nov. 28, 2012.

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

\* cited by examiner

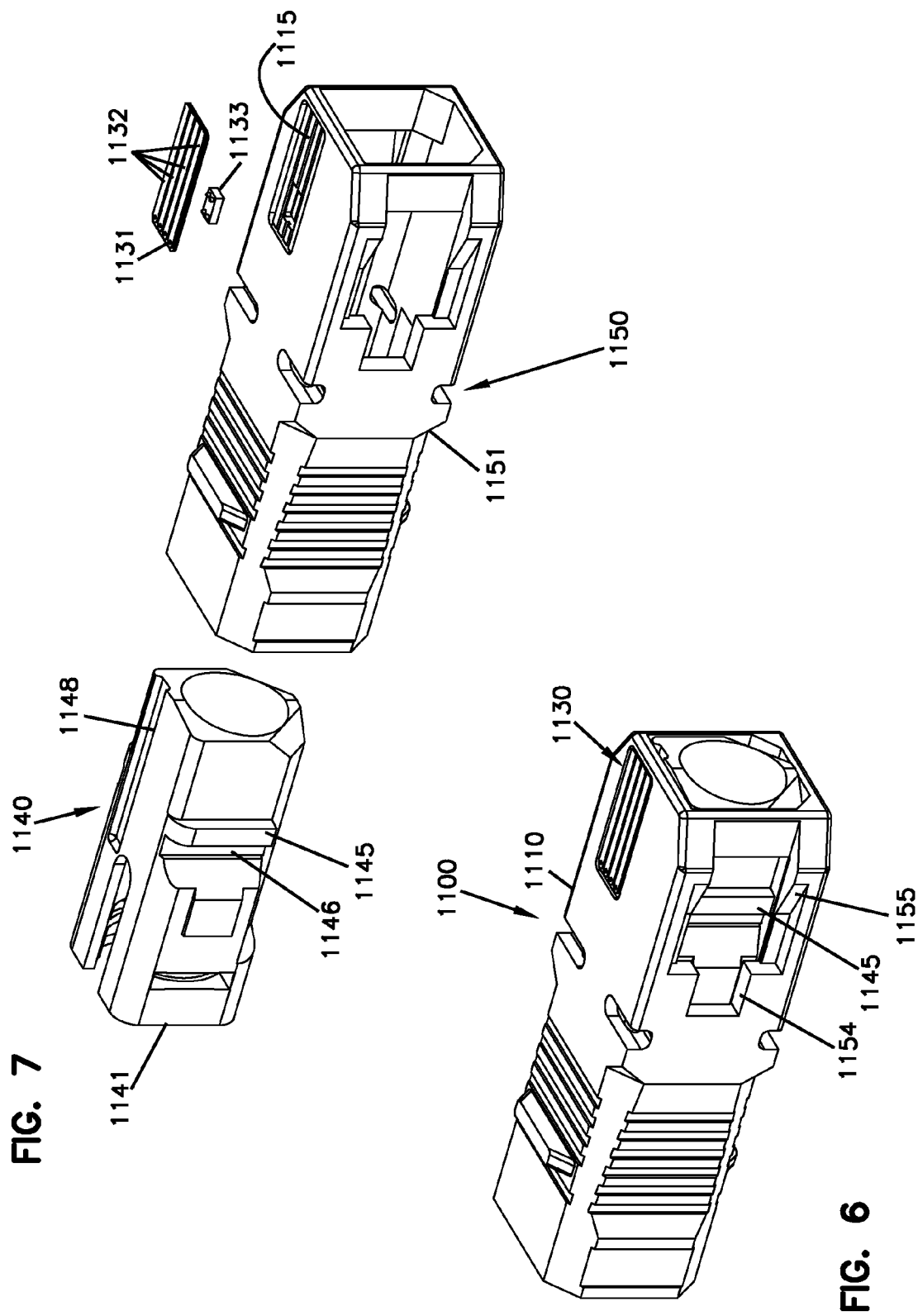

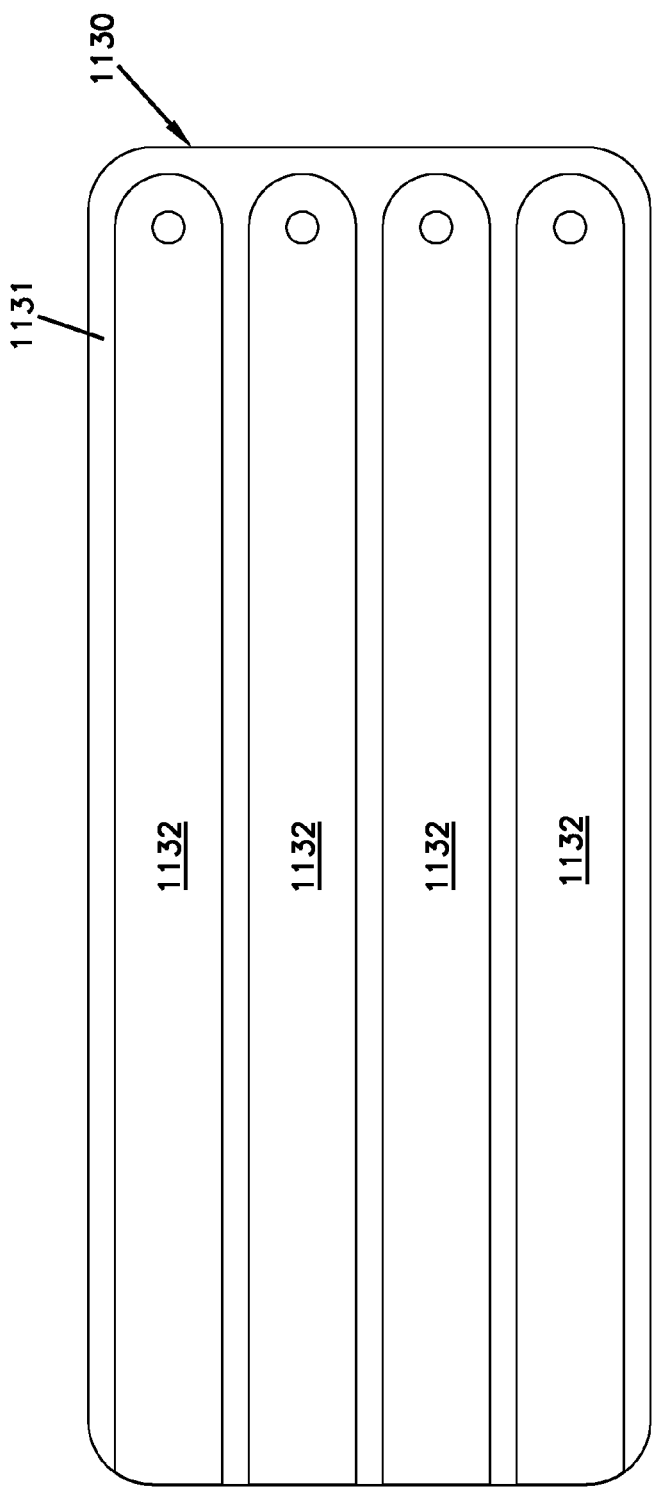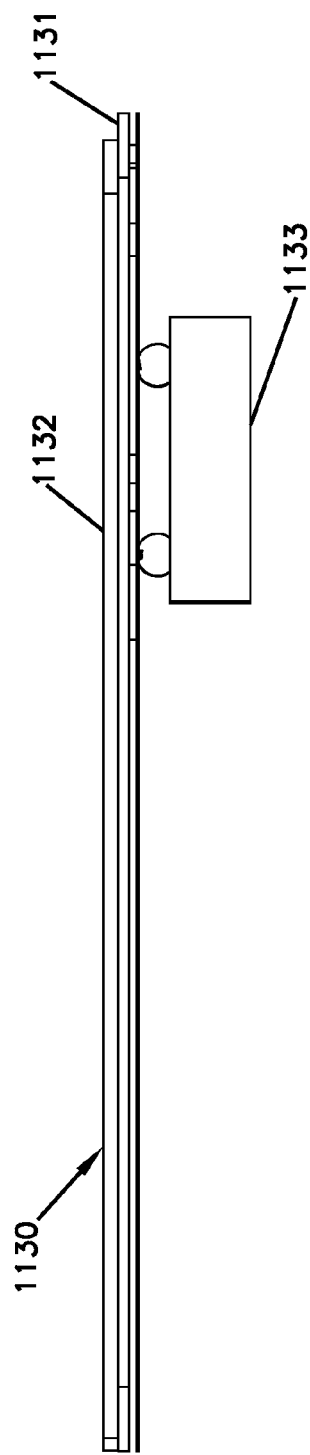

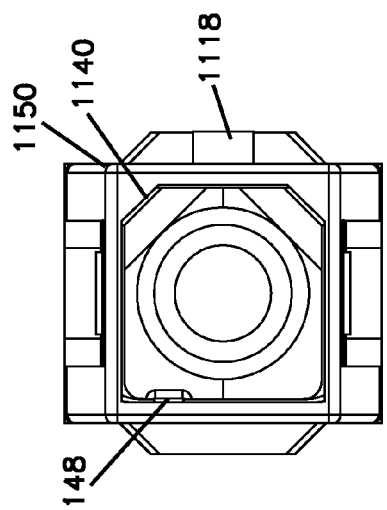
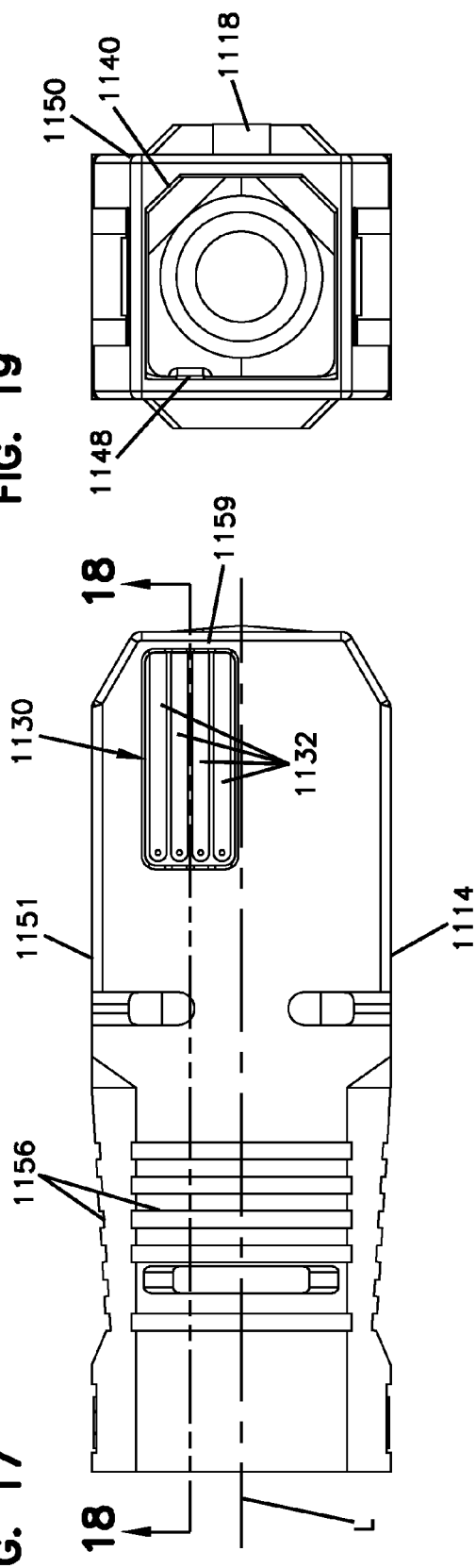
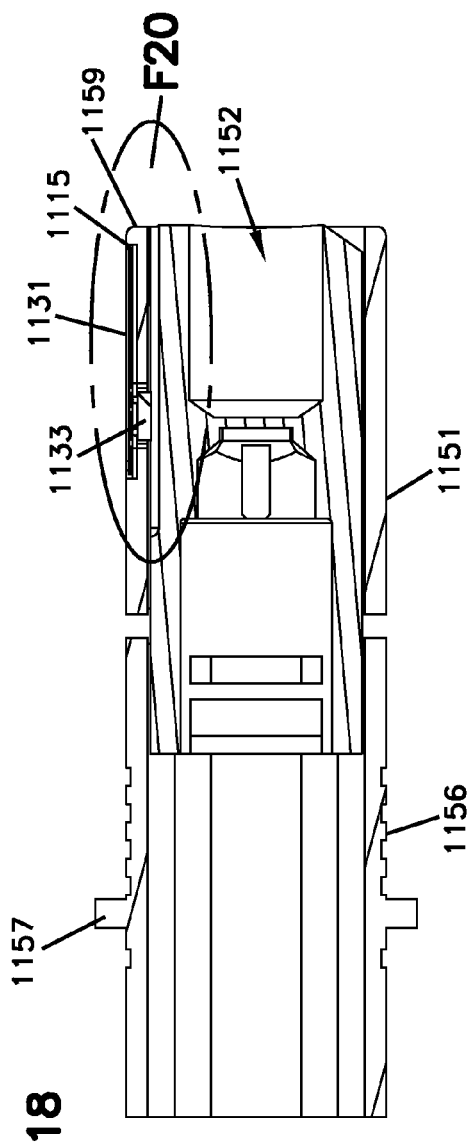

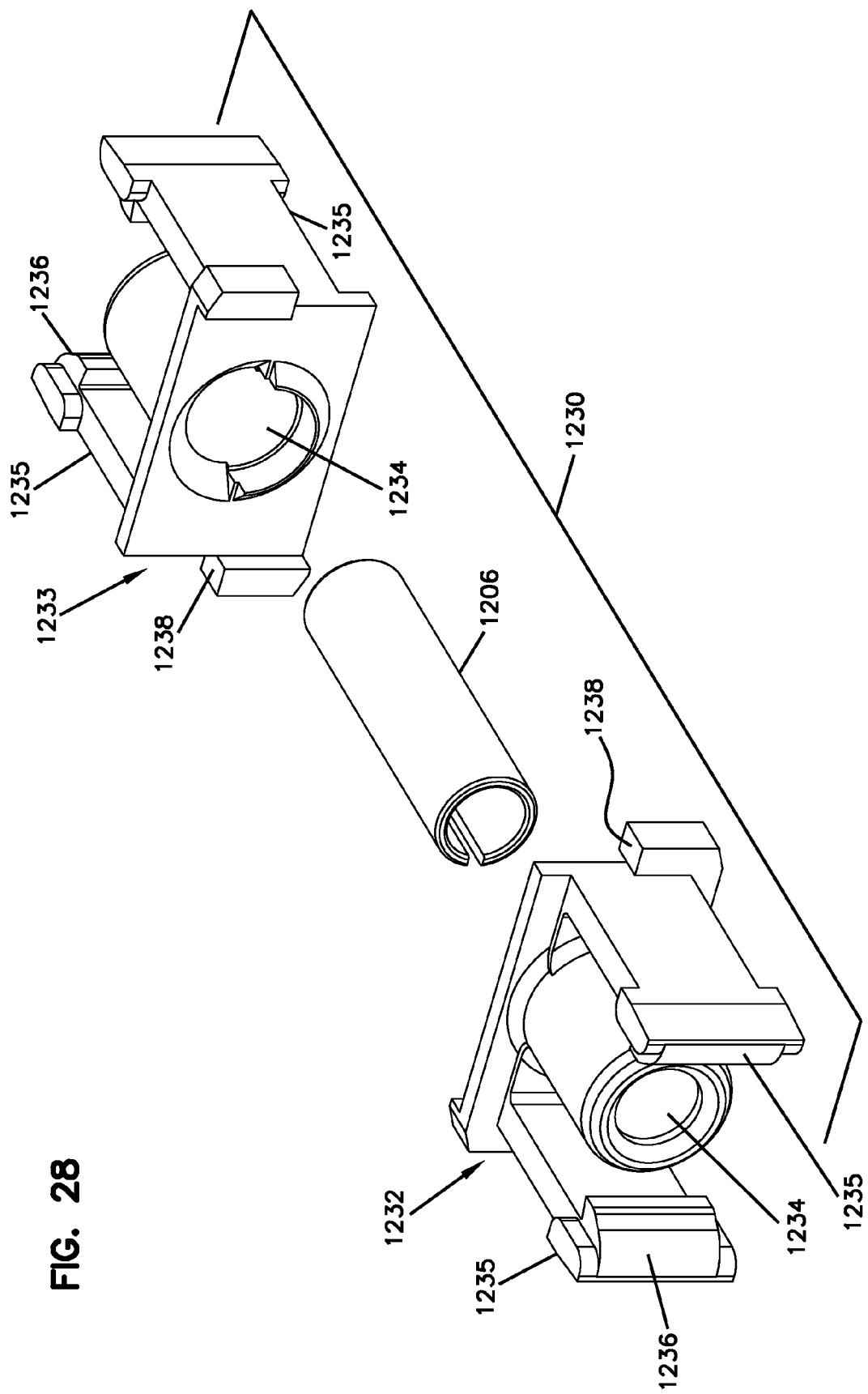

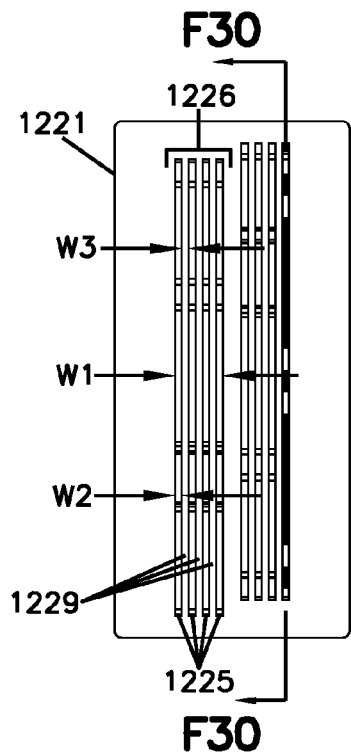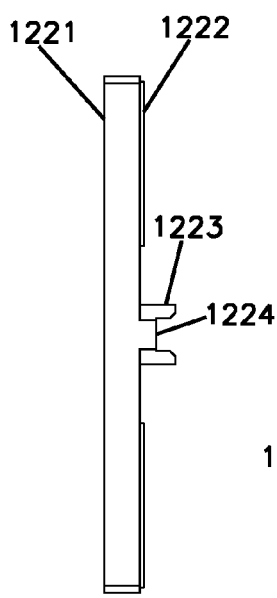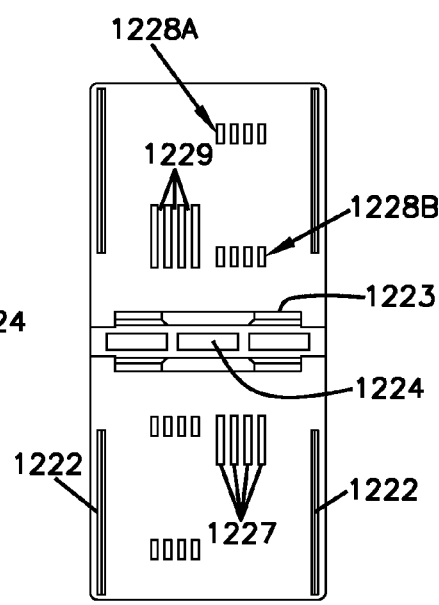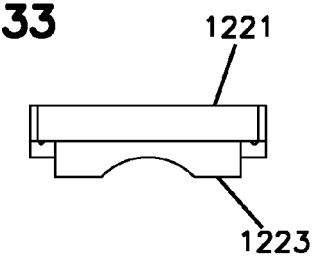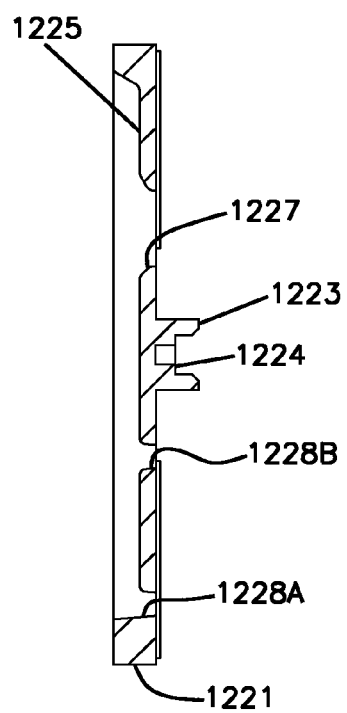

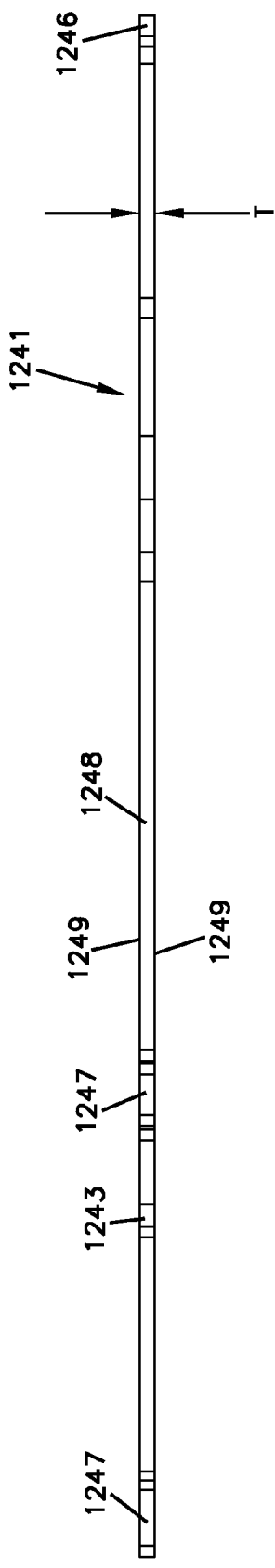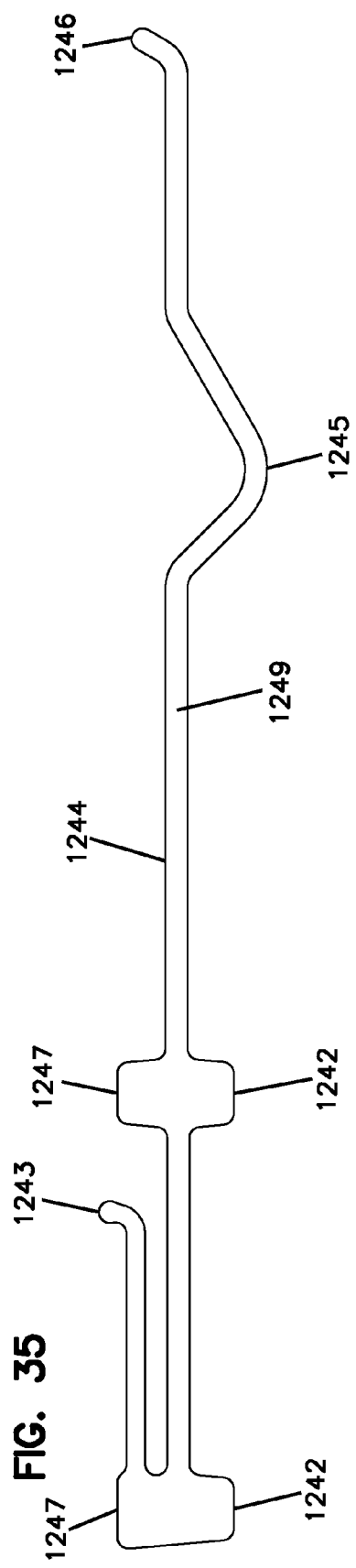

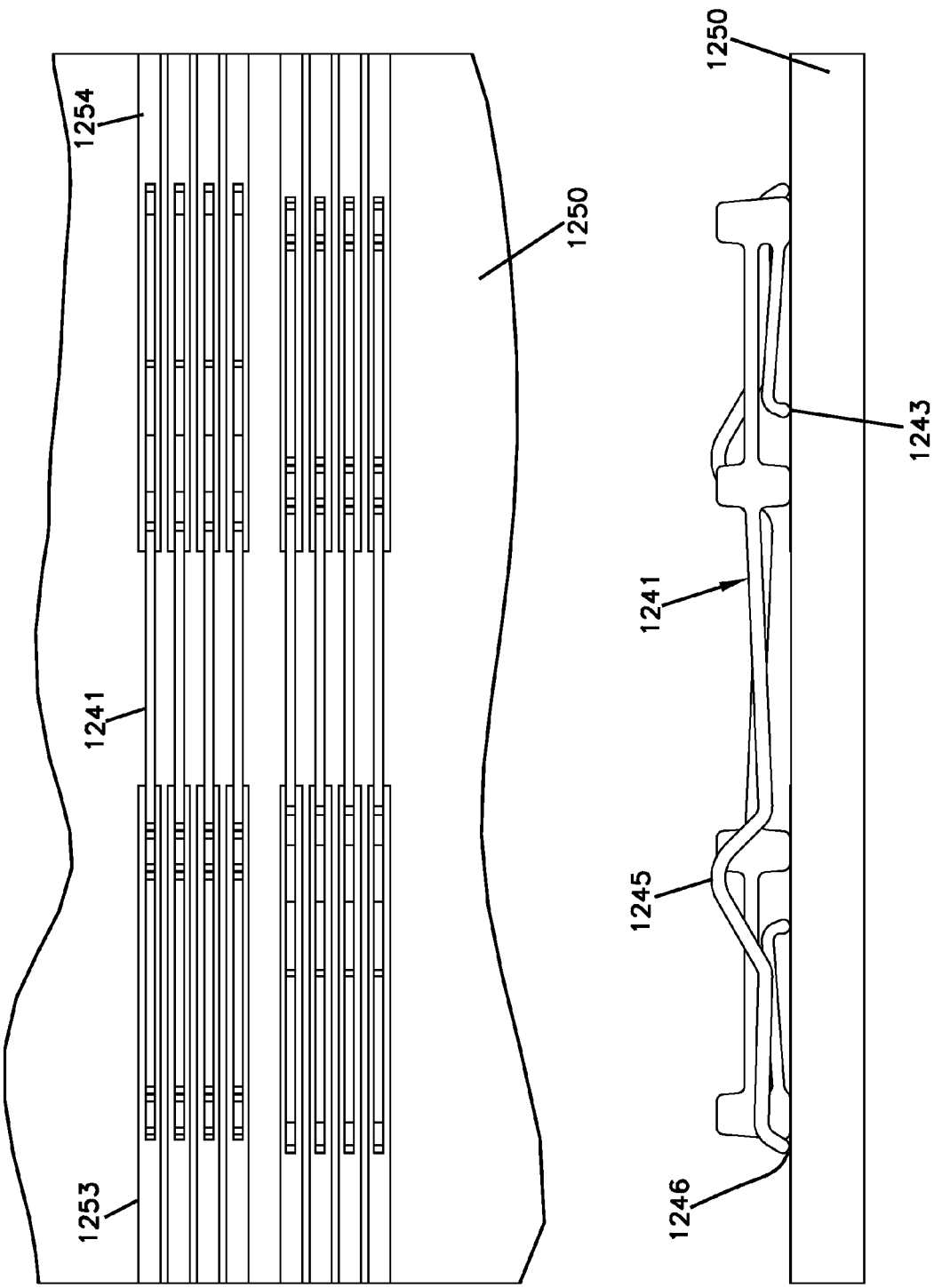

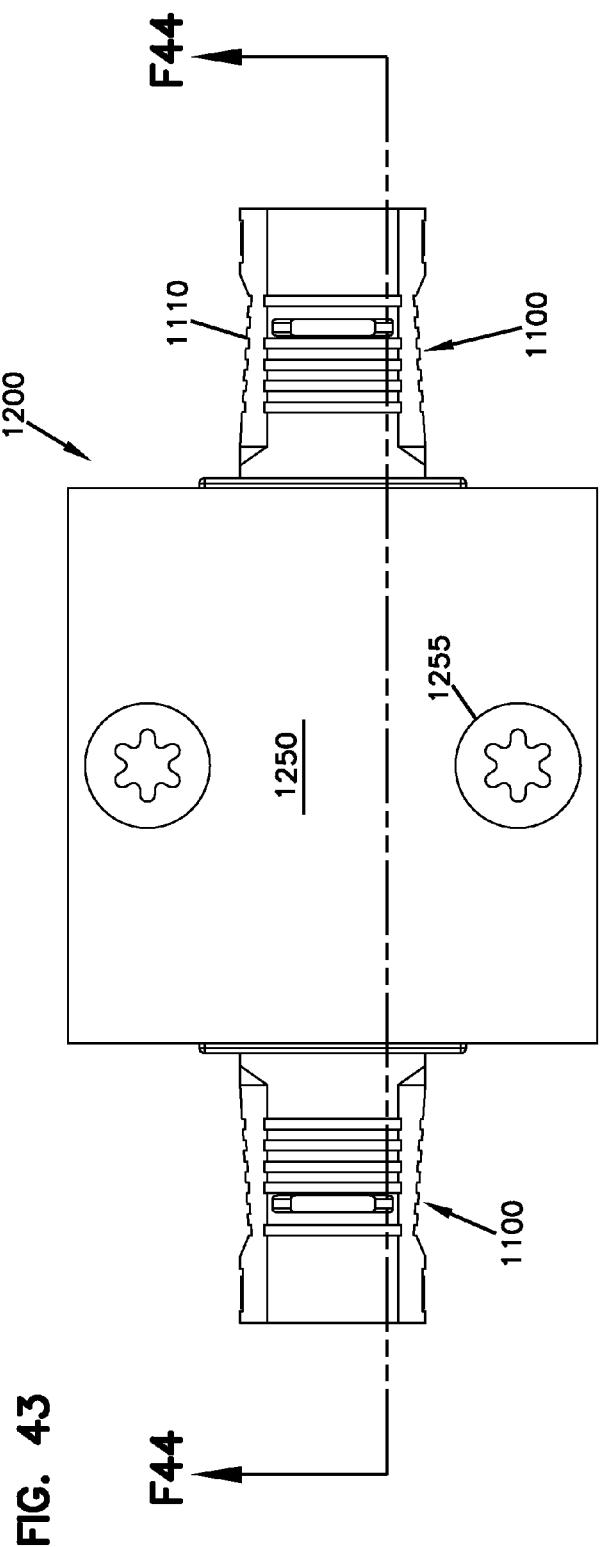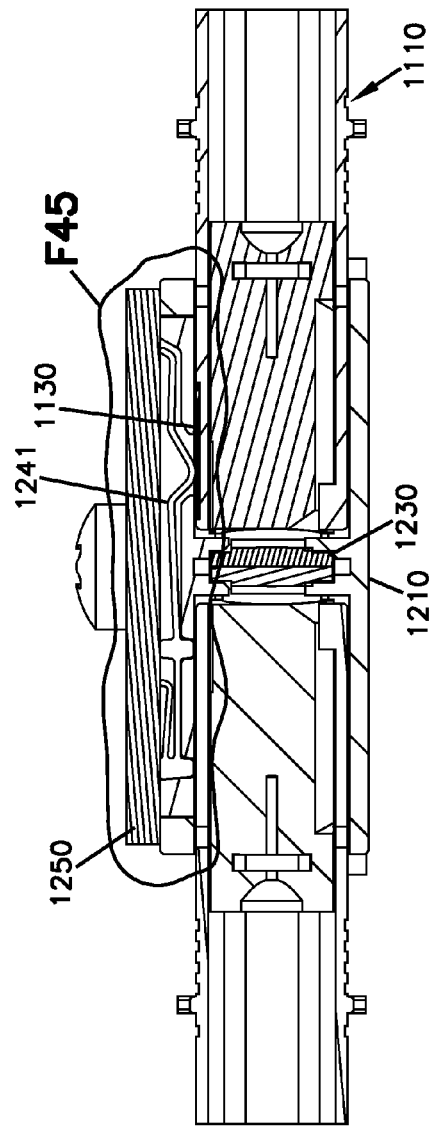
FIG. 43
FIG. 44

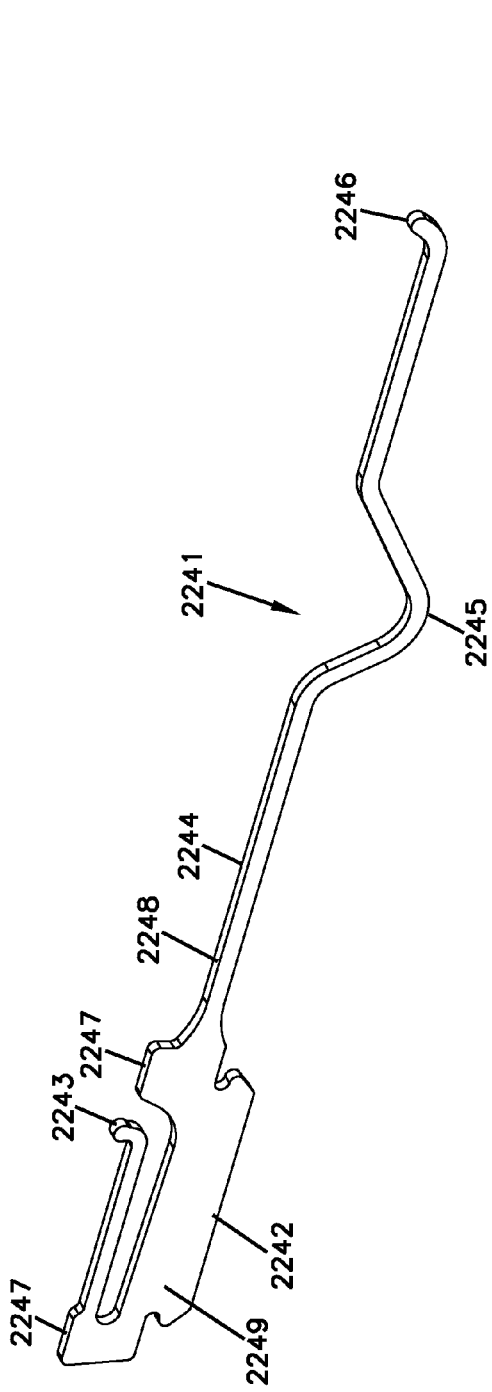
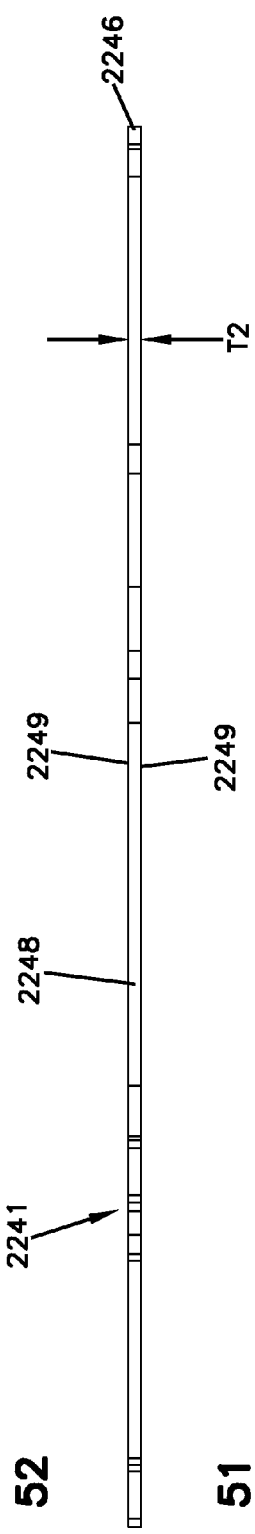
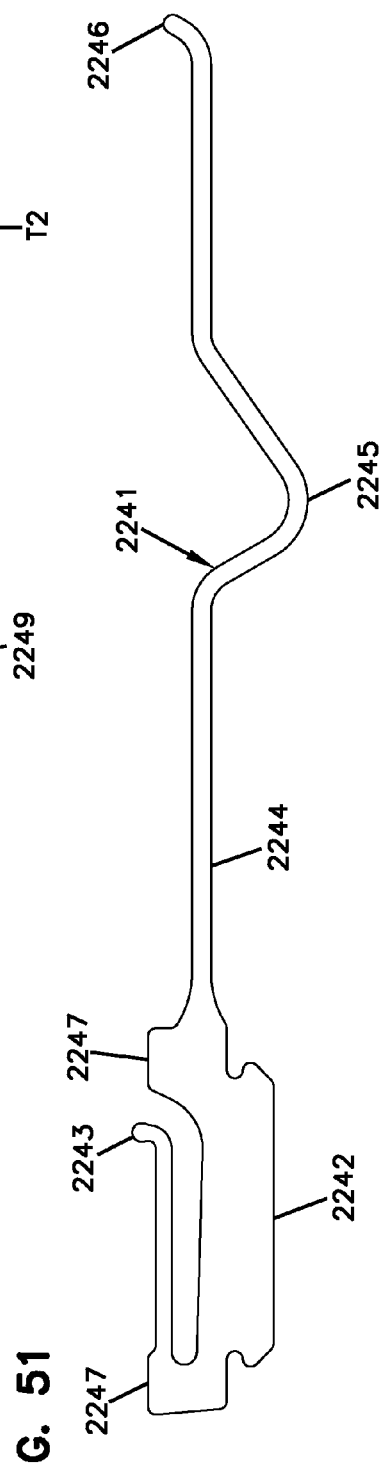
FIG. 50
FIG. 52
FIG. 51

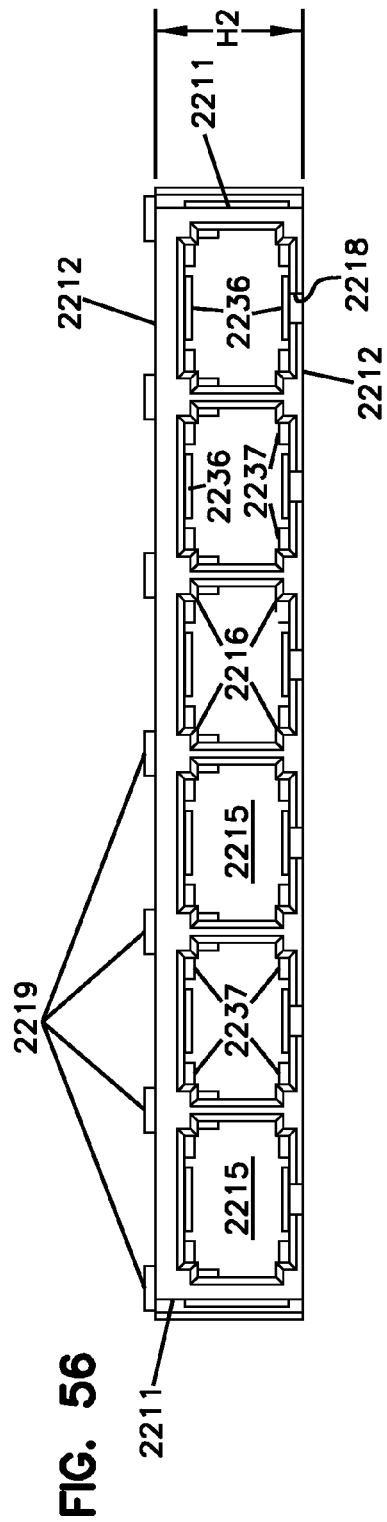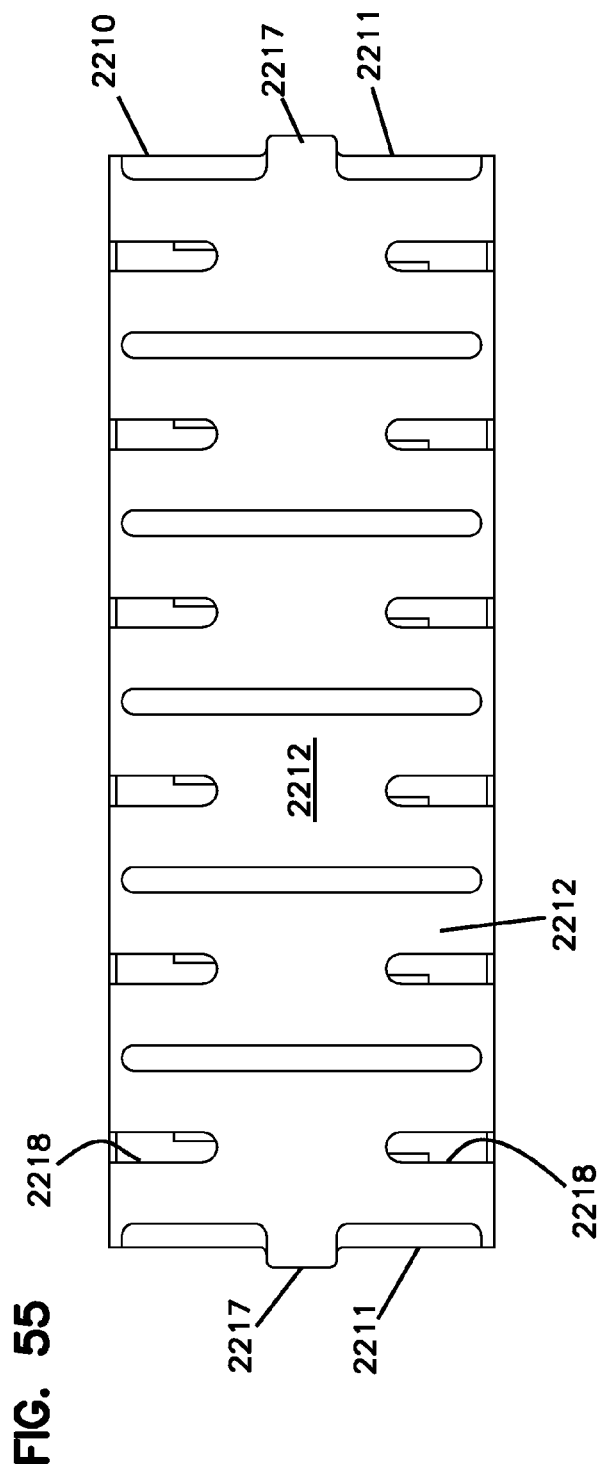

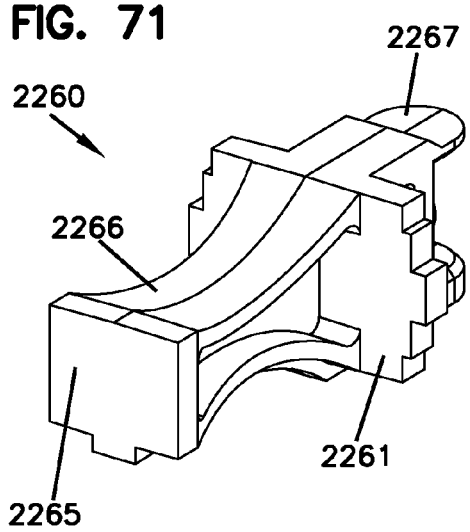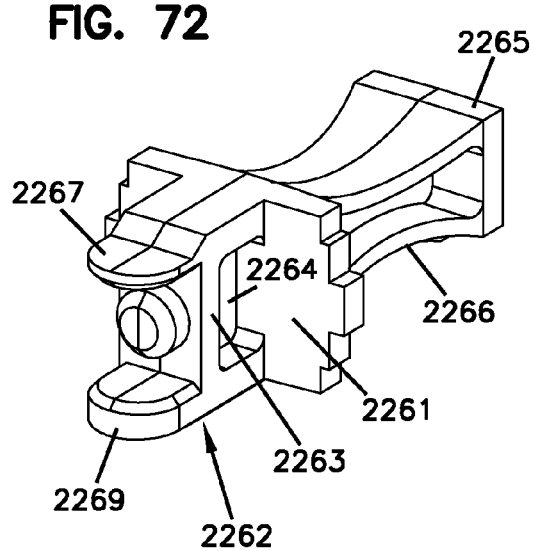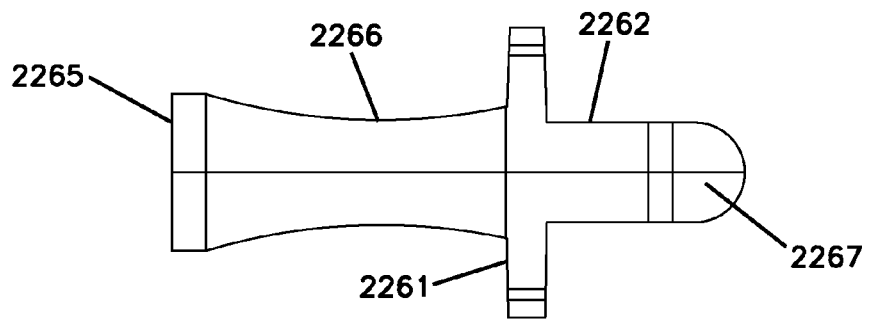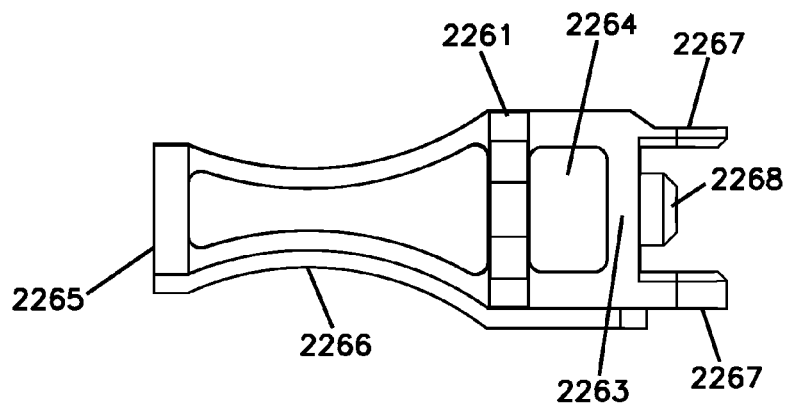

US 9,244,229 B2

MANAGED FIBER CONNECTIVITY SYSTEMS

CROSS REFERENCE TO RELATED APPLICATIONS

This application is a divisional of application Ser. No. 13/446,607, filed Apr. 13, 2012, now U.S. Pat. No. 8,757,895, which application claims the benefit of provisional application Ser. No. 61/476,032, filed Apr. 15, 2011, and titled "Managed Fiber Connectivity Systems," which applications are incorporated herein by reference in their entirety.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to communications connector assemblies and connector arrangements that provide physical layer management capabilities. In accordance with certain aspects, the disclosure relates to fiber optic connector assemblies and connector arrangements.

One aspect of the present disclosure relates to a communications panel systems and methods including one or more connector arrangements and connector assemblies implemented as SC-type fiber optic connections.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 4-45 illustrate an example implementation of a connector system including a first example coupler assembly and fiber optic connectors having PLI functionality as well as PLM functionality;

FIGS. 46-69 illustrate an example implementation of a connector system including a second example coupler assembly and fiber optic connectors having PLI functionality as well as PLM functionality.

FIGS. 71-77 show an example implementation of a dust cap suitable for use with any of the adapter housings disclosed herein.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
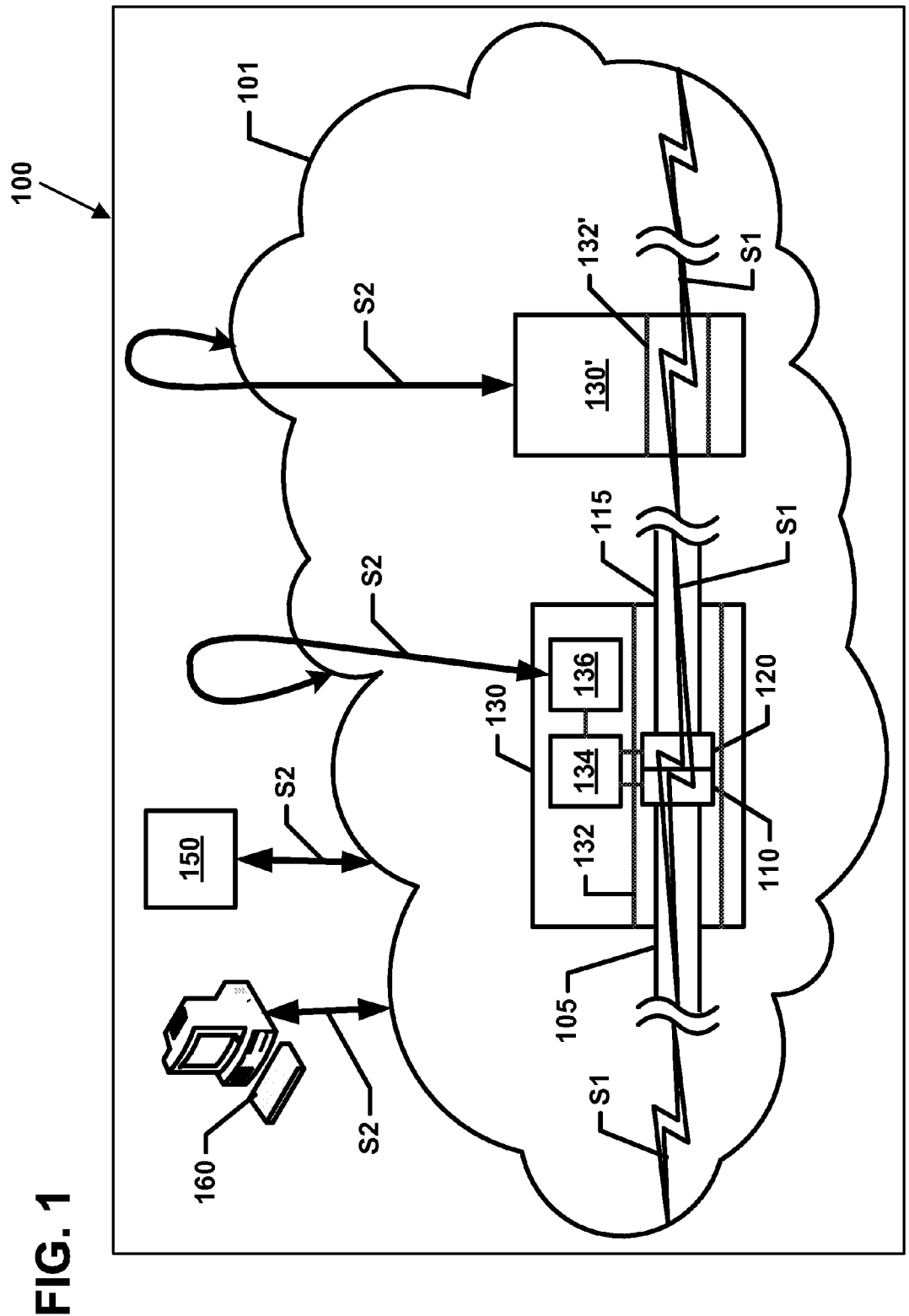
FIG. 1 is a block diagram of a portion of an example communications and data management system in accordance with aspects of the present disclosure.

FIG. 1 is a diagram of a portion of an example communications and data management system 100. The example system 100 shown in FIG. 1 includes a part of a communications network 101 along which communications signals S1 pass. In one example implementation, the network 101 can include an Internet Protocol network. In other implementations, however, the communications network 101 may include other types of networks.

The communications network 101 includes interconnected network components (e.g., connector assemblies, inter-networking devices, internet working devices, servers, outlets, and end user equipment (e.g., computers)). In one example implementation, communications signals S1 pass from a computer, to a wall outlet, to a port of communication panel, to a first port of an inter-networking device, out another port of the inter-networking device, to a port of the same or another communications panel, to a rack mounted server. In other implementations, the communications signals S1 may follow other paths within the communications network 101.

The portion of the communications network 101 shown in FIG. 1 includes first and second connector assemblies 130, 130' at which communications signals S1 pass from one portion of the communications network 101 to another portion of the communications network 101. Non-limiting examples of connector assemblies 130, 130' include, for example, rack-mounted connector assemblies (e.g., patch panels, distribution units, and media converters for fiber and copper physical communication media), wall-mounted connector assemblies (e.g., boxes, jacks, outlets, and media converters for fiber and copper physical communication media), and inter-networking devices (e.g., switches, routers, hubs, repeaters, gateways, and access points).

In the example shown, the first connector assembly 130 defines at least one port 132 configured to communicatively couple at least a first media segment (e.g., cable) 105 to at least a second media segment (e.g., cable) 115 to enable the communication signals S1 to pass between the media segments 105, 115. The at least one port 132 of the first connector assembly 130 may be directly connected to a port 132' of the second connector assembly 130'. As the term is used herein, the port 132 is directly connected to the port 132' when the communications signals S1 pass between the two ports 132, 132' without passing through an intermediate port. For example, plugging a first terminated end of a patch cable into the port 132 and a second terminated end of the patch cable into the port 132' directly connects the ports 132, 132'.

The port 132 of the first connector assembly 130 also may be indirectly connected to the port 132' of the second connector assembly 130'. As the term is used herein, the port 132 is indirectly connected to the port 132' when the communications signals S1 pass through an intermediate port when traveling between the ports 132, 132'. For example, in one implementation, the communications signals S1 may be routed over one media segment from the port 132 at the first connector assembly 130, to a port of a third connector assembly at which the media segment is coupled, to another media segment that is routed from the port of the third connector assembly to the port 132' of the second connector assembly 130'.

Non-limiting examples of media segments include optical cables, electrical cables, and hybrid cables. The media segments may be terminated with electrical plugs, electrical jacks, fiber optic connectors, fiber optic adapters, media converters, or other termination components. In the example shown, each media segment 105, 115 is terminated at a plug or connector 110, 120, respectively, which is configured to communicatively connect the media segments 105, 115. For example, in one implementation, the port 132 of the connector assembly 130 can be configured to align ferrules of two fiber optic connectors 110, 120. In another implementation, the port 132 of the connector assembly 130 can be configured to electrically connect an electrical plug with an electrical socket (e.g., a jack). In yet another implementation, the port 132 can include a media converter configured to connect an optical fiber to an electrical conductor.

In accordance with some aspects, the connector assembly 130 does not actively manage (e.g., is passive with respect to) the communications signals S1 passing through port 132. For example, in some implementations, the connector assembly 130 does not modify the communications signal S1 carried over the media segments 105, 115. Further, in some implementations, the connector assembly 130 does not read, store, or analyze the communications signal S1 carried over the media segments 105, 115.

In accordance with aspects of the disclosure, the communications and data management system 100 also provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the system. As the term is used herein, "PLM functionality" refers to the ability of a component or system to manipulate or to enable others to manipulate the physical components used to implement the physical layer of the system (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications system 101. In accordance with some aspects, physical layer information of the communications system 101 can include media information, device information, and location information.

As the term is used herein, "media information" refers to physical layer information pertaining to cables, plugs, connectors, and other such physical media. In accordance with some aspects, the media information is stored on or in the physical media, themselves. In accordance with other aspects, the media information can be stored at one or more data repositories for the communications system, either alternatively or in addition to the media, themselves.

Non-limiting examples of media information include a part number, a serial number, a plug or other connector type, a conductor or fiber type, a cable or fiber length, cable polarity, a cable or fiber pass-through capacity, a date of manufacture, a manufacturing lot number, information about one or more visual attributes of physical communication media (e.g., information about the color or shape of the physical communication media or an image of the physical communication media), and an insertion count (i.e., a record of the number of times the media segment has been connected to another media segment or network component). Media information also can include testing or media quality or performance information. The testing or media quality or performance information, for example, can be the results of testing that is performed when a particular segment of media is manufactured.

As the term is used herein, "device information" refers to physical layer information pertaining to the communications panels, inter-networking devices, media converters, computers, servers, wall outlets, and other physical communications devices to which the media segments attach. In accordance with some aspects, the device information is stored on or in the devices, themselves. In accordance with other aspects, the device information can be stored at one or more data repositories for the communications system, either alternatively or in addition to the devices, themselves. In accordance with still other aspects, the device information can be stored in the media segments attached thereto. Non-limiting examples of device information include a device identifier, a device type, port priority data (that associates a priority level with each port), and port updates (described in more detail herein).

As the term is used herein, "location information" refers to physical layer information pertaining to a physical layout of a building or buildings in which the network 101 is deployed. Location information also can include information indicating where each communications device, media segment, network component, or other component is physically located within the building. In accordance with some aspects, the location information of each system component is stored on or in the respective component. In accordance with other aspects, the location information can be stored at one or more data repositories for the communications system, either alternatively or in addition to the system components, themselves.

In accordance with some aspects, one or more of the components of the communications network 101 are configured to store physical layer information pertaining to the component as will be disclosed in more detail herein. In FIG. 1, the connectors 110, 120, the media segments 105, 115, and/or the connector assemblies 130, 130' may store physical layer information. For example, in FIG. 1, each connector 110, 120 may store information pertaining to itself (e.g., type of connector, data of manufacture, etc.) and/or to the respective media segment 105, 115 (e.g., type of media, test results, etc.).

In another example implementation, the media segments 105, 115 or connectors 110, 120 may store media information that includes a count of the number of times that the media segment (or connector) has been inserted into port 132. In such an example, the count stored in or on the media segment is updated each time the segment (or plug or connector) is inserted into port 132. This insertion count value can be used, for example, for warranty purposes (e.g., to determine if the connector has been inserted more than the number of times specified in the warranty) or for security purposes (e.g., to detect unauthorized insertions of the physical communication media).

One or more of the components of the communications network 101 can read the physical layer information from one or more media segments retained thereat. In certain implementations, one or more network components includes a media reading interface that is configured to read physical layer information stored on or in the media segments or connectors attached thereto. For example, in one implementation, the connector assembly 130 includes a media reading interface 134 that can read media information stored on the media cables 105, 115 retained within the port 132. In another implementation, the media reading interface 134 can read media information stored on the connectors or plugs 110, 120 terminating the cables 105, 115, respectively.

In accordance with some aspects of the disclosure, the physical layer information read by a network component may be processed or stored at the component. For example, in certain implementations, the first connector assembly 130 shown in FIG. 1 is configured to read physical layer information stored on the connectors 110, 120 and/or on the media segments 105, 115 using media reading interface 134. Accordingly, in FIG. 1, the first connector assembly 130 may store not only physical layer information about itself (e.g., the total number of available ports at that assembly 130, the number of ports currently in use, etc.), but also physical layer information about the connectors 110, 120 inserted at the ports and/or about the media segments 105, 115 attached to the connectors 110, 120.

The physical layer information obtained by the media reading interface may be communicated (see PLI signals S2) over the network 101 for processing and/or storage. In accordance with some aspects, the communications network 101 includes a data network (e.g., see network 218 of FIG. 2) along which the physical layer information is communicated. At least some of the media segments and other components of the data network may be separate from those of the communications network 101 to which such physical layer information pertains. For example, in some implementations, the first connector assembly 130 may include a plurality of "normal" ports (e.g., fiber optic adapter ports) at which connectorized media segments (e.g., optical fibers) are coupled together to create a path for communications signals S1. The first connector assembly 130 also may include one or more PLI ports 136 at which the physical layer information (see PLI signals S2) are passed to components of the data network (e.g., to one or more aggregation points 150 and/or to one or more computer systems 160).

In other implementations, however, the physical layer information may be communicated over the communications network 101 just like any other signal, while at the same time not affecting the communication signals S1 that pass through the connector assembly 130 on the normal ports 132. Indeed, in some implementations, the physical layer information may be communicated as one or more of the communication signals S1 that pass through the normal ports 132 of the connector assemblies 130, 130'. For example, in one implementation, a media segment may be routed between the PLI port 136 and one of the "normal" ports 132. In another implementation, the media segment may be routed between the PLI port 136 and a "normal" port of another connector assembly. In such implementations, the physical layer information may be passed along the communications network 101 to other components of the communications network 101 (e.g., to another connector assembly, to one or more aggregation points 150 and/or to one or more computer systems 160). By using the network 101 to communicate physical layer information pertaining to it, an entirely separate data network need not be provided and maintained in order to communicate such physical layer information.

For example, in the implementation shown in FIG. 1, each connector assembly 130 includes at least one PLI port 136 that is separate from the "normal" ports 132 of the connector assembly 130. Physical layer information is communicated between the connector assembly 130 and the communications network 101 through the PLI port 136. Components of the communications network 101 may be connected to one or more aggregation devices 150 and/or to one or more computing systems 160. In the example shown in FIG. 1, the connector assembly 130 is connected to a representative aggregation device 150, a representative computing system 160, and to other components of the network 101 (see looped arrows) via the PLI port 136.

In some implementations, some types of physical layer information pertaining to media segments can be obtained by the connector assembly 130 from a user at the connector assembly 130 via a user interface (e.g., a keypad, a scanner, a touch screen, buttons, etc.). For example, physical layer information pertaining to media that is not configured to store such information can be entered manually into the connector assembly 130 by the user. In certain implementations, the connector assembly 130 can provide the physical layer information obtained from the user to other devices or systems that are coupled to the communications network 101 and/or a separate data network.

In other implementations, some or all physical layer information can be obtained by the connector assembly 130 from other devices or systems that are coupled to the communications network 101 and/or a separate data network. For example, physical layer information pertaining to media that is not configured to store such information can be entered manually into another device or system (e.g., at the connector assembly 130, at the computer 160, or at the aggregation point 150) that is coupled to the network 101 and/or a separate data network.

In some implementations, some types of non-physical layer information (e.g., network information) also can be obtained by one network component (e.g., a connector assembly 130, an aggregation point 150, or a computer 160) from other devices or systems that are coupled to the communications network 101 and/or a separate data network. For example, the connector assembly 130 may pull non-physical layer information from one or more components of the network 101. In other implementations, the non-physical layer information can be obtained by the connector assembly 130 from a user at the connector assembly 130.

In some implementations, the connector assembly 130 is configured to modify (e.g., add, delete, and/or change) the physical layer information stored in or on the segment of physical communication media 105, 115 (i.e., or the associated connectors 110, 120). For example, in some implementations, the media information stored in or on the segment of physical communication media 105, 115 can be updated to include the results of testing that is performed when a segment of physical media is installed or otherwise checked. In other implementations, such testing information is supplied to the aggregation point 150 for storage and/or processing. The modification of the physical layer information does not affect the communications signals S1 passing through the connector assembly 130.

Figure 2:
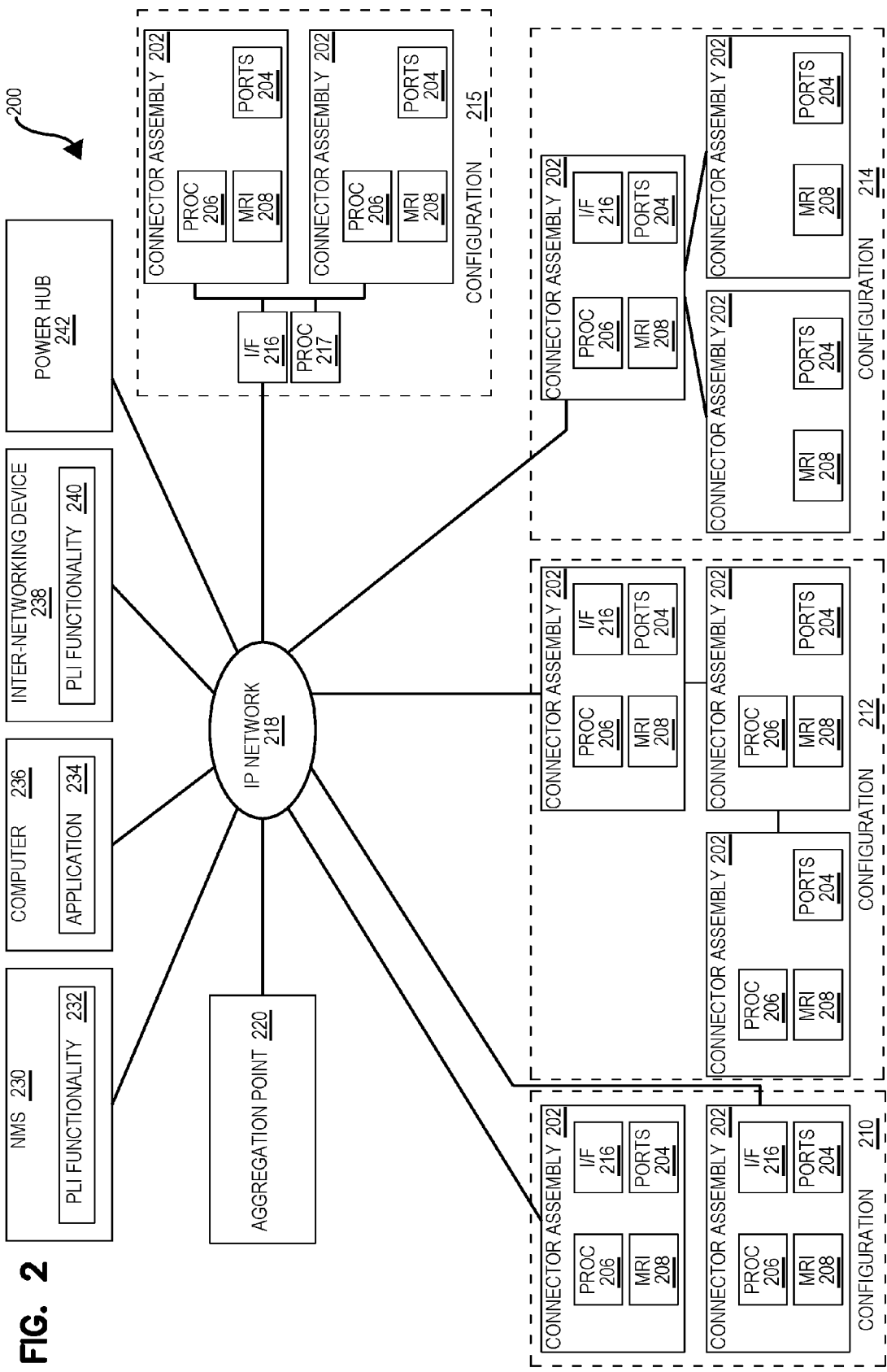
FIG. 2 is a block diagram of one embodiment of a communications management system that includes PLI functionality as well as PLM functionality in accordance with aspects of the present disclosure.

FIG. 2 is a block diagram of one example implementation of a communications management system 200 that includes PLI functionality as well as PLM functionality. The management system 200 comprises a plurality of connector assemblies 202. The management system 200 includes one or more connector assemblies 202 connected to an IP network 218. The connector assemblies 202 shown in FIG. 2 illustrate various example implementations of the connector assemblies 130, 30' of FIG. 1.

Each connector assembly 202 includes one or more ports 204, each of which is used to connect two or more segments of physical communication media to one another (e.g., to implement a portion of a logical communication link for communication signals S1 of FIG. 1). At least some of the connector assemblies 202 are designed for use with segments of physical communication media that have physical layer information stored in or on them. The physical layer information is stored in or on the segment of physical communication media in a manner that enables the stored information, when the segment is attached to a port 204, to be read by a programmable processor 206 associated with the connector assembly 202.

Each programmable processor 206 is configured to execute software or firmware that causes the programmable processor 206 to carry out various functions described below. Each programmable processor 206 also includes suitable memory (not shown) that is coupled to the programmable processor 206 for storing program instructions and data. In general, the programmable processor 206 determines if a physical communication media segment is attached to a port 204 with which that processor 206 is associated and, if one is, to read the identifier and attribute information stored in or on the attached physical communication media segment (if the segment includes such information stored therein or thereon) using the associated media reading interface 208.

In some implementations, each of the ports 204 of the connector assemblies 202 comprises a respective media reading interface 208 via which the respective programmable processor 206 is able to determine if a physical communication media segment is attached to that port 204 and, if one is, to read the physical layer information stored in or on the attached segment (if such media information is stored therein or thereon). In other implementations, a single media reading interface 208 may correspond to two or more ports 204. The programmable processor 206 associated with each connector assembly 202 is communicatively coupled to each of the media reading interfaces 208 using a suitable bus or other interconnect (not shown).

In FIG. 2, four example types of connector assembly configurations 210, 212, 214, and 215 are shown. In the first connector assembly configuration 210 shown in FIG. 2, each connector assembly 202 includes its own respective programmable processor 206 and its own respective network interface 216 that is used to communicatively couple that connector assembly 202 to an Internet Protocol (IP) network 218. In some implementations, the ports 204 of the connector assemblies 202 also connect to the IP network 218. In other implementations, however, only the network interfaces 216 couple to the IP network 218.

In the second type of connector assembly configuration 212, a group of connector assemblies 202 are physically located near each other (e.g., in a rack, rack system, or equipment closet). Each of the connector assemblies 202 in the group includes its own respective programmable processor 206. However, in the second connector assembly configuration 212, some of the connector assemblies 202 (referred to here as "interfaced connector assemblies") include their own respective network interfaces 216 while some of the connector assemblies 202 (referred to here as "non-interfaced connector assemblies") do not. The non-interfaced connector assemblies 202 are communicatively coupled to one or more of the interfaced connector assemblies 202 in the group via local connections. In this way, the non-interfaced connector assemblies 202 are communicatively coupled to the IP network 218 via the network interface 216 included in one or more of the interfaced connector assemblies 202 in the group. In the second type of connector assembly configuration 212, the total number of network interfaces 216 used to couple the connector assemblies 202 to the IP network 218 can be reduced. Moreover, in the particular implementation shown in FIG. 2, the non-interfaced connector assemblies 202 are connected to the interfaced connector assembly 202 using a daisy chain topology (though other topologies can be used in other implementations and embodiments).

In the third type of connector assembly configuration 214, a group of connector assemblies 202 are physically located near each other (e.g., within a rack, rack system, or equipment closet). Some of the connector assemblies 202 in the group (also referred to here as "master" connector assemblies 202) include both their own programmable processors 206 and network interfaces 216, while some of the connector assemblies 202 (also referred to here as "slave" connector assemblies 202) do not include their own programmable processors 206 or network interfaces 216. Each of the slave connector assemblies 202 is communicatively coupled to one or more of the master connector assemblies 202 in the group via one or more local connections. The programmable processor 206 in each of the master connector assemblies 202 is able to carry out the PLM functions for both the master connector assembly 202 of which it is a part and any slave connector assemblies 202 to which the master connector assembly 202 is connected via the local connections. As a result, the cost associated with the slave connector assemblies 202 can be reduced. In the particular implementation shown in FIG. 2, the slave connector assemblies 202 are connected to a master connector assembly 202 in a star topology (though other topologies can be used in other implementations and embodiments).

In the fourth type of connector assembly configuration 215, a group of connector assemblies (e.g., distribution modules) 202 are housed within a common chassis or other enclosure. Each of the connector assemblies 202 in the configuration 215 includes their own programmable processors 206. In the context of this configuration 215, the programmable processors 206 in the connector assemblies 202 are "slave" processors 206. Each of the slave programmable processors 206 in the group is communicatively coupled to a common "master" programmable processor 217 (e.g., over a backplane included in the chassis or enclosure). The master programmable processor 217 is coupled to a network interface 216 that is used to communicatively couple the master programmable processor 217 to the IP network 218.

In the fourth configuration 215, each slave programmable processor 206 is configured to manage the media reading interfaces 208 to determine if physical communication media segments are attached to the port 204 and to read the physical layer information stored in or on the attached physical communication media segments (if the attached segments have such information stored therein or thereon). The physical layer information is communicated from the slave programmable processor 206 in each of the connector assemblies 202 in the chassis to the master processor 217. The master processor 217 is configured to handle the processing associated with communicating the physical layer information read from by the slave processors 206 to devices that are coupled to the IP network 218.

In accordance with some aspects, the communications management system 200 includes functionality that enables the physical layer information captured by the connector assemblies 202 to be used by application-layer functionality outside of the traditional physical-layer management application domain. That is, the physical layer information is not retained in a PLM "island" used only for PLM purposes but is instead made available to other applications. For example, in the particular implementation shown in FIG. 2, the management system 200 includes an aggregation point 220 that is communicatively coupled to the connector assemblies 202 via the IP network 218.

The aggregation point 220 includes functionality that obtains physical layer information from the connector assemblies 202 (and other devices) and stores the physical layer information in a data store. The aggregation point 220 can be used to receive physical layer information from various types of connector assemblies 202 that have functionality for automatically reading information stored in or on the segment of physical communication media. Also, the aggregation point 220 and aggregation functionality 224 can be used to receive physical layer information from other types of devices that have functionality for automatically reading information stored in or on the segment of physical communication media. Examples of such devices include end-user devices—such as computers, peripherals (e.g., printers, copiers, storage devices, and scanners), and IP telephones—that include functionality for automatically reading information stored in or on the segment of physical communication media.

The aggregation point 220 also can be used to obtain other types of physical layer information. For example, in this implementation, the aggregation point 220 also obtains information about physical communication media segments that is not otherwise automatically communicated to an aggregation point 220. This information can be provided to the aggregation point 220, for example, by manually entering such information into a file (e.g., a spreadsheet) and then uploading the file to the aggregation point 220 (e.g., using a web browser) in connection with the initial installation of each of the various items. Such information can also, for example, be directly entered using a user interface provided by the aggregation point 220 (e.g., using a web browser).

The aggregation point 220 also includes functionality that provides an interface for external devices or entities to access the physical layer information maintained by the aggregation point 220. This access can include retrieving information from the aggregation point 220 as well as supplying information to the aggregation point 220. In this implementation, the aggregation point 220 is implemented as "middleware" that is able to provide such external devices and entities with transparent and convenient access to the PLI maintained by the access point 220. Because the aggregation point 220 aggregates PLI from the relevant devices on the IP network 218 and provides external devices and entities with access to such PLI, the external devices and entities do not need to individually interact with all of the devices in the IP network 218 that provide PLI, nor do such devices need to have the capacity to respond to requests from such external devices and entities.

For example, as shown in FIG. 2, a network management system (NMS) 230 includes PLI functionality 232 that is configured to retrieve physical layer information from the aggregation point 220 and provide it to the other parts of the NMS 230 for use thereby. The NMS 230 uses the retrieved physical layer information to perform one or more network management functions. In certain implementations, the NMS 230 communicates with the aggregation point 220 over the IP network 218. In other implementations, the NMS 230 may be directly connected to the aggregation point 220.

As shown in FIG. 2, an application 234 executing on a computer 236 also can use the API implemented by the aggregation point 220 to access the PLI information maintained by the aggregation point 220 (e.g., to retrieve such information from the aggregation point 220 and/or to supply such information to the aggregation point 220). The computer 236 is coupled to the IP network 218 and accesses the aggregation point 220 over the IP network 218.

In the example shown in FIG. 2, one or more inter-networking devices 238 used to implement the IP network 218 include physical layer information (PLI) functionality 240. The PLI functionality 240 of the inter-networking device 238 is configured to retrieve physical layer information from the aggregation point 220 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device.

The aggregation point 220 can be implemented on a standalone network node (e.g., a standalone computer running appropriate software) or can be integrated along with other network functionality (e.g., integrated with an element management system or network management system or other network server or network element). Moreover, the functionality of the aggregation point 220 can be distribute across many nodes and devices in the network and/or implemented, for example, in a hierarchical manner (e.g., with many levels of aggregation points). The IP network 218 can include one or more local area networks and/or wide area networks (e.g., the Internet). As a result, the aggregation point 220, NMS 230, and computer 236 need not be located at the same site as each other or at the same site as the connector assemblies 202 or the inter-networking devices 238.

Also, power can be supplied to the connector assemblies 202 using conventional "Power over Ethernet" techniques specified in the IEEE 802.3af standard, which is hereby incorporated herein by reference. In such an implementation, a power hub 242 or other power supplying device (located near or incorporated into an inter-networking device that is coupled to each connector assembly 202) injects DC power onto one or more power cables (e.g., a power wire included in a copper twisted-pair cable) used to connect each connector assembly 202 to the IP network 218.

Figure 3:
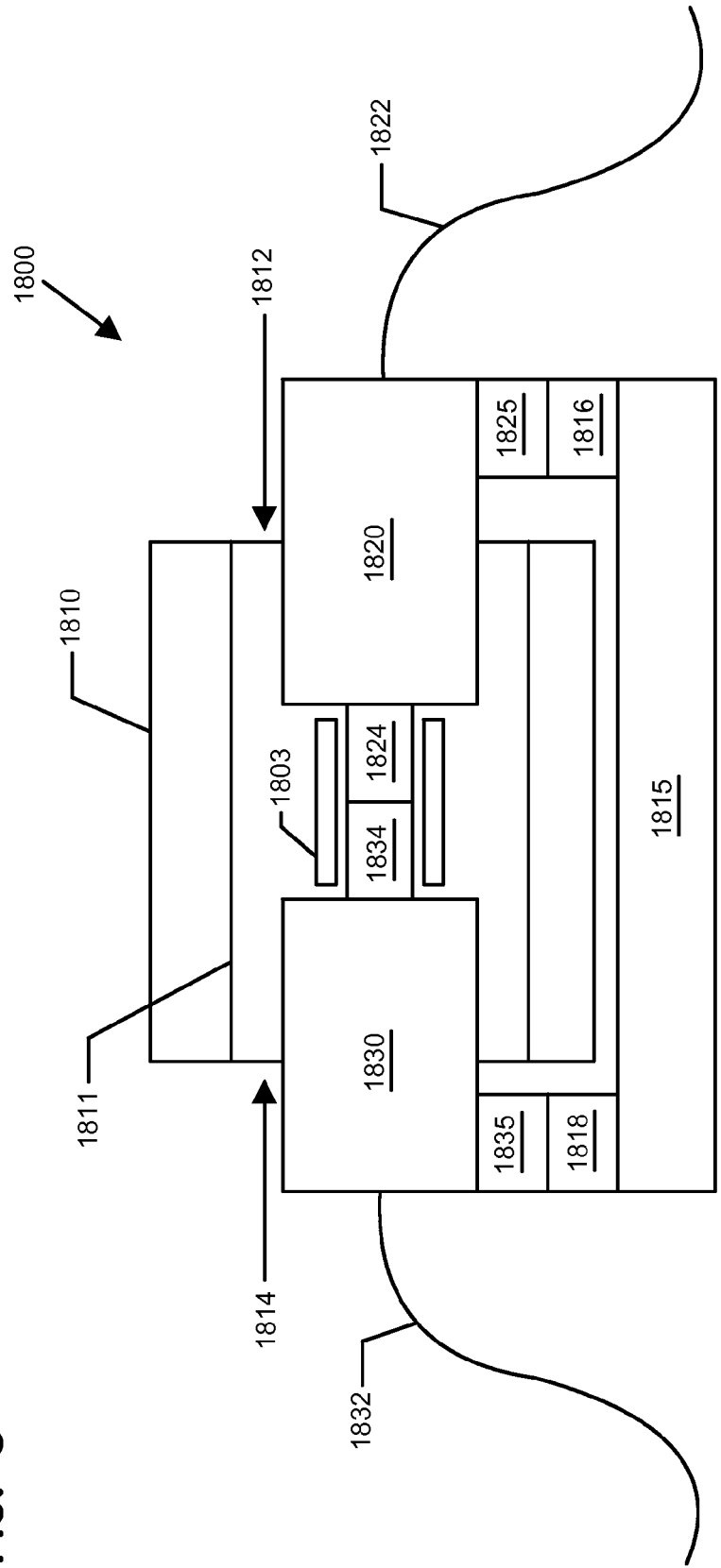
FIG. 3 is a block diagram of one high-level example of a coupler assembly and media reading interface that are suitable for use in the management system of FIG. 2 in accordance with aspects of the present disclosure.
Figure 4:
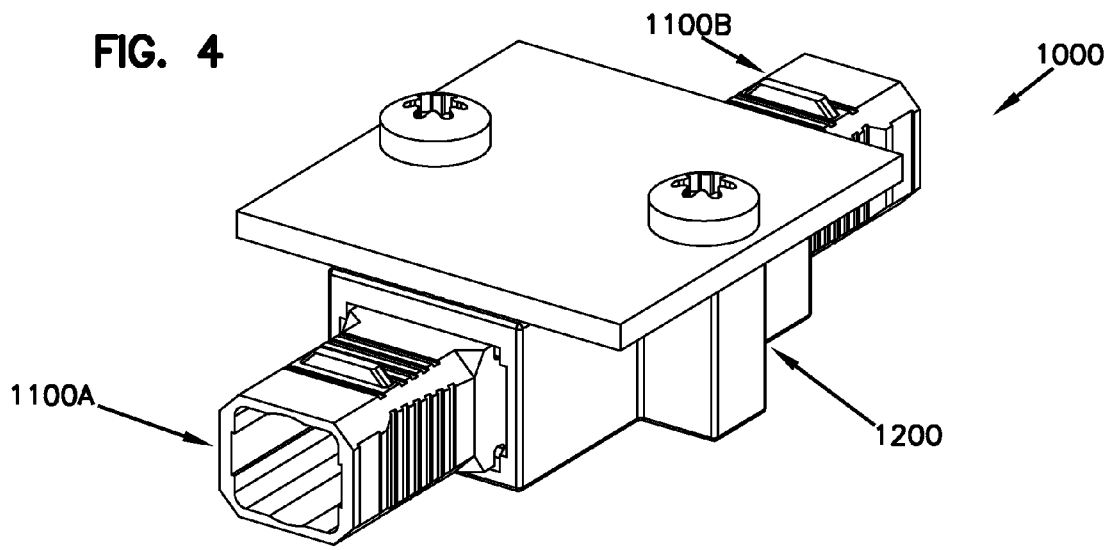
Figure 21:
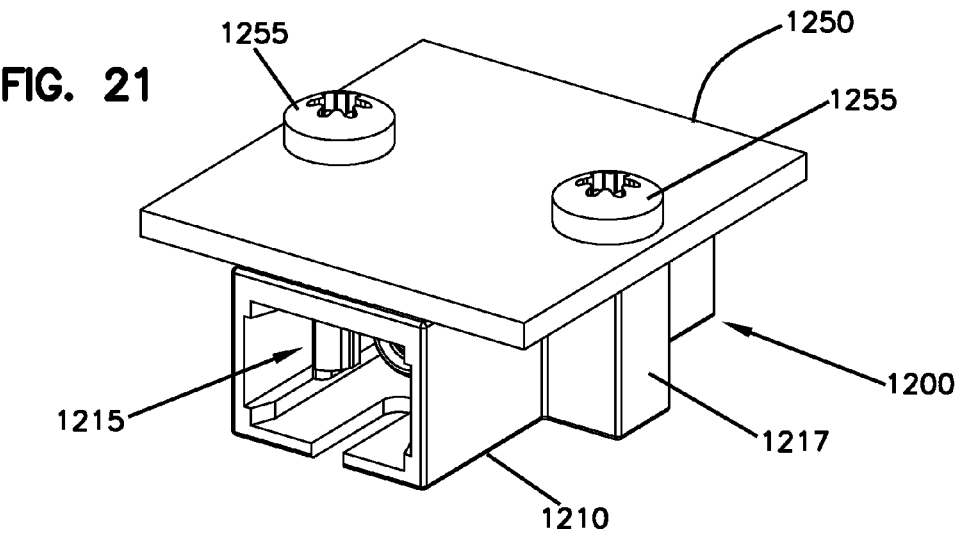
Figure 23:
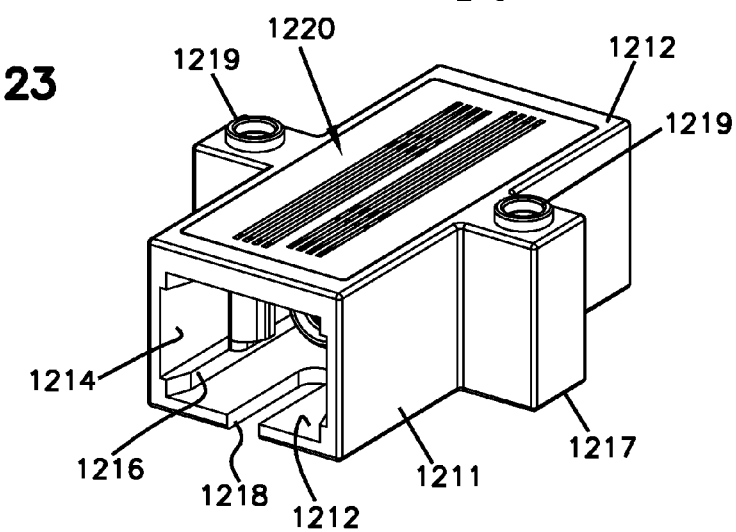
Figure 5:
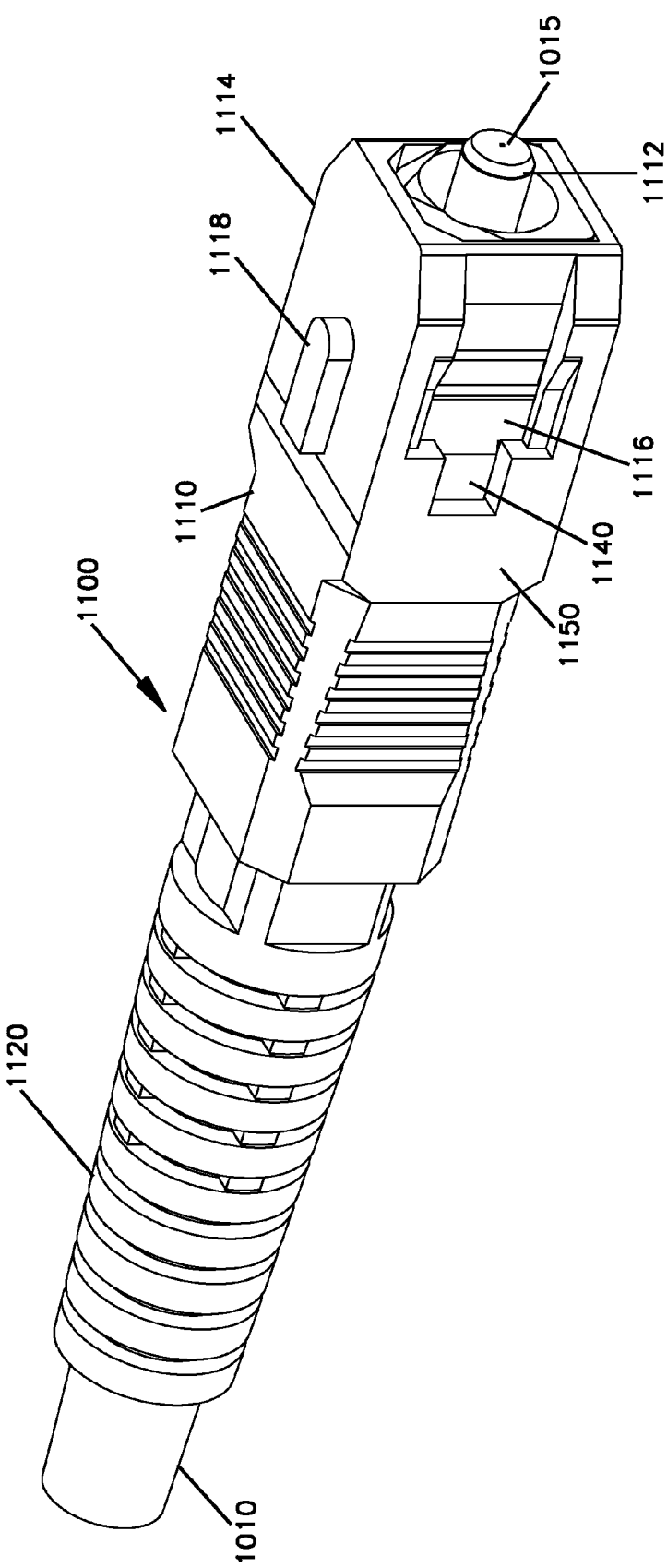

FIG. 3 is a schematic diagram of one example connection system 1800 including a connector assembly 1810 configured to collect physical layer information from at least one segment of physical communications media. The example connector assembly 1810 of FIG. 3 is configured to connect segments of optical physical communications media in a physical layer management system. The connector assembly 1810 includes a fiber optic adapter defining at least one connection opening 1811 having a first port end 1812 and a second port end 1814. A sleeve (e.g., a split sleeve) 1803 is arranged within the connection opening 1811 of the adapter 1810 between the first and second port ends 1812, 1814. Each port end 1812, 1814 is configured to receive a connector arrangement as will be described in more detail herein.

A first example segment of optical physical communication media includes a first optical fiber 1822 terminated by a first connector arrangement 1820. A second example segment of optical physical communication media includes a second optical fiber 1832 terminated by a second connector arrangement 1830. The first connector arrangement 1820 is plugged into the first port end 1812 and the second connector arrangement 1830 is plugged into the second port end 1814. Each fiber connector arrangement 1820, 1830 includes a ferrule 1824, 1834 through which optical signals from the optical fiber 1822, 1832, respectively, pass.

The ferrules 1824, 1834 of the connector arrangements 1820, 1830 are aligned by the sleeve 1803 when the connector arrangements 1820, 1830 are inserted into the connection opening 1811 of the adapter 1810. Aligning the ferrules 1824, 1834 provides optical coupling between the optical fibers 1822, 1832. In some implementations, each segment of optical physical communication media (e.g., each optical fiber 1822, 1832) carries communication signals (e.g., communications signals S1 of FIG. 1). The aligned ferrules 1824, 1834 of the connector arrangements 1820, 1830 create an optical path along which the communication signals (e.g., signals S1 of FIG. 1) may be carried.

In some implementations, the first connector arrangement 1820 may include a storage device 1825 that is configured to store physical layer information (e.g., an identifier and/or attribute information) pertaining to the segment of physical communications media (e.g., the first connector arrangement 1820 and/or the fiber optic cable 1822 terminated thereby). In some implementations, the connector arrangement 1830 also includes a storage device 1835 that is configured to store information (e.g., an identifier and/or attribute information) pertaining to the second connector arrangement 1830 and/or the second optic cable 1832 terminated thereby.

In one implementation, each of the storage devices 1825, 1835 is implemented using an EEPROM (e.g., a PCB surface-mount EEPROM). In other implementations, the storage devices 1825, 1835 are implemented using other non-volatile memory device. Each storage device 1825, 1835 is arranged and configured so that it does not interfere or interact with the communications signals communicated over the media segments 1822, 1832.

In accordance with some aspects, the adapter 1810 is coupled to at least a first media reading interface 1816. In certain implementations, the adapter 1810 also is coupled to at least a second media interface 1818. In some implementations, the adapter 1810 is coupled to multiple media reading interfaces. In certain implementations, the adapter 1810 includes a media reading interface for each port end defined by the adapter 1810. In other implementations, the adapter 1810 includes a media reading interface for each connection opening 1811 defined by the adapter 1810. In still other implementations, the adapter 1810 includes a media reading interface for each connector arrangement that the adapter 1810 is configured to receive. In still other implementations, the adapter 1810 includes a media reading interface for only a portion of the connector arrangement that the adapter 1810 is configured to receive.

In some implementations, at least the first media reading interface 1816 is mounted to a printed circuit board 1815. In the example shown, the first media reading interface 1816 of the printed circuit board 1815 is associated with the first port end 1812 of the adapter 1810. In some implementations, the printed circuit board 1815 also can include the second media reading interface 1818. In one such implementation, the second media reading interface 1818 is associated with the second port end 1814 of the adapter 1810.

The printed circuit board 1815 of the connector assembly 1810 can be communicatively connected to one or more programmable processors (e.g., processors 216 of FIG. 2) and/or to one or more network interfaces (e.g., network interfaces 216 of FIG. 2). The network interface may be configured to send the physical layer information (e.g., see signals S2 of FIG. 1) to a physical layer management network (e.g., see communications network 101 of FIG. 1 or IP network 218 of FIG. 2). In one implementation, one or more such processors and interfaces can be arranged as components on the printed circuit board 1815. In another implementation, one or more such processor and interfaces can be arranged on separate circuit boards that are coupled together. For example, the printed circuit board 1815 can couple to other circuit boards via a card edge type connection, a connector-to-connector type connection, a cable connection, etc.

When the first connector arrangement 1820 is received in the first port end 1812 of the adapter 1810, the first media reading interface 1816 is configured to enable reading (e.g., by the processor) of the information stored in the storage device 1825. The information read from the first connector arrangement 1820 can be transferred through the printed circuit board 1815 to a physical layer management network, e.g., network 101 of FIG. 1, network 218 of FIG. 2, etc. When the second connector arrangement 1830 is received in the second port end 1814 of the adapter 1810, the second media reading interface 1818 is configured to enable reading (e.g., by the processor) of the information stored in the storage device 1835. The information read from the second connector arrangement 1830 can be transferred through the printed circuit board 1815 or another circuit board to the physical layer management network.

In some such implementations, the storage devices 1825, 1835 and the media reading interfaces 1816, 1818 each comprise three (3) leads—a power lead, a ground lead, and a data lead. The three leads of the storage devices 1825, 1835 come into electrical contact with three (3) corresponding leads of the media reading interfaces 1816, 1818 when the corresponding media segment is inserted in the corresponding port. In certain example implementations, a two-line interface is used with a simple charge pump. In still other implementations, additional leads can be provided (e.g., for potential future applications). Accordingly, the storage devices 1825, 1835 and the media reading interfaces 1816, 1818 may each include four (4) leads, five (5) leads, six (6) leads, etc.

FIGS. 4-45 illustrate an example implementation of a connector system 1000 that can be utilized on a connector assembly (e.g., a communications panel) having PLI functionality as well as PLM functionality. One example connector assembly on which the connector system 1000 can be implemented is a bladed chassis (see FIG. 70). The connector system 1000 includes at least one example communications coupler assembly 1200 and at least two connector arrangements 1100.

The communications coupler assembly 1200 is configured to be mounted to a connector assembly, such as a communications blade or a communications panel. One or more connector arrangements 1100, which each terminate a segment of communications media 1010 (FIG. 5), are configured to communicatively couple to other segments of physical communications media at the coupler assembly 1200 (e.g., see FIGS.

43-45). Accordingly, communications data signals carried by a media segment 1010 terminated by a first connector arrangement 1100 can be propagated to another media segment (e.g., terminated by a second connector arrangement 1100) through the communications coupler assembly 1200.

In accordance with some aspects, each communications coupler assembly 1200 is configured to form a single link between segments of physical communications media. For example, each communications coupler assembly 1200 can define a single passage at which a first connector arrangement 1100A is coupled to a second connector arrangement 1100B (see FIG. 4). In accordance with other aspects, however, each communications coupler assembly 1200 is configured to form two or more links between segments of physical communications media (e.g., see FIGS. 46-69).

In accordance with some aspects, each connector arrangement 1100 is configured to terminate a single segment of physical communications media. For example, each connector arrangement 1100 can include a single connector 1110 and boot 1150 that terminate a single optical fiber 1010 or a single electrical conductor. In one example implementation, each connector arrangement 1100 includes a single SC-type fiber optic connector 1110 that terminates a single optical fiber 1010 (see FIG. 5). In other implementations, the connector 1110 can be an LC-type, an ST-type, an FC-type, an LX.5-type, etc.

In accordance with other aspects, each connector arrangement 1100 may includes two or more connectors 1110, each of which terminates a single segment of physical communications media. For example, each connector arrangement 1100 may define a duplex fiber optic connector arrangement including two connectors 1110, each of which terminates an optical fiber 1010. In accordance with still other aspects, each connector 1110 may terminate a plurality of physical media segments. In still other systems, other types of connector arrangements (e.g., electrical connector arrangements) can be secured to the communications coupler assembly 1200 or to a different type of coupler assembly.

An example implementation of connector arrangements 1100 is shown in FIGS. 5A and 5B. FIG. 5A is a front perspective view an example fiber optic connector arrangement 1100 including an SC-type connector 1110. The connector 1110 includes a connector body 1114 protecting a ferrule 1112, which retains an optical fiber 1015 of a media segment 1010. A boot 1120 is secured to the connector 1110 to provide bend protection to the optical fiber 1015. The housing 1114 defines two slots 1116 on opposite sides thereof and a key 1118 located on a side perpendicular to the sides containing the slots 1116. The key 1118 is configured to engage a keyway of coupler assembly 1200 to properly position the connector 1110 at a port of the coupler assembly 1200.

FIG. 5B is an exploded view of the connector arrangement 1100. In general, the housing 1114 includes an inner portion 1140 and an outer portion 1150 that is mounted to slide over the inner portion 1140 along a longitudinal axis of the ferrule 1112. The ferrule 1112, a guide 1160, and a hub 1167 are received within the inner housing portion 1140. The guide 1160 includes a key 1163 that is located on an outer surface of the guide 1160. The key 1163 is designed to fit into a slot 1149 defined in the inner housing portion 1140. When the key 1163 is located within the slot 1149, the guide 1160 is firmly locked into the inner housing portion 1140.

The optical fiber 1015 enters into the connector 1110 through the guide 1160. The guide 1160 has an input opening 1161 at one end to receive the optical fiber 1015 and a hub opening 1162 at its other end. The input opening 1161 of the guide 1160 has a smaller diameter than the hub opening 1162. Located within the guide 1160 is tubing 1165, which surrounds the outer diameter of the optical fiber 1015. Tubing 1165 aids in guiding the optical fiber 1015 into the ferrule 1112. Within the guide 1160 is a coil spring 1166, which surrounds the tubing 1165. The spring 1166 is operative in allowing the optical fiber 1015 a small amount of travel when tensioned.

The hub 1167 connects to the inner housing portion 1140. The hub 1167 fits within the guide 1160 through the input opening 1161 of the guide 1160. The hub 1167 is operative in retaining spring 1166 in the guide 1160. The hub 1167 receives the ferrule 1112, which firmly holds the optical fiber 1015 in place. In one example implementation, the hub 1167 has four tabs or keys 1168 spaced ninety degrees apart from each other.

Figure 11:
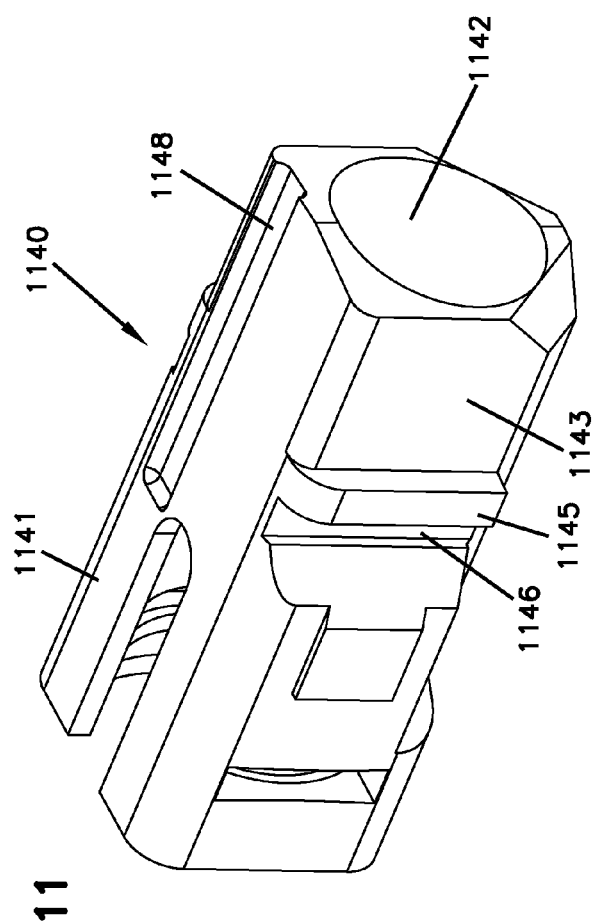
Figure 12:
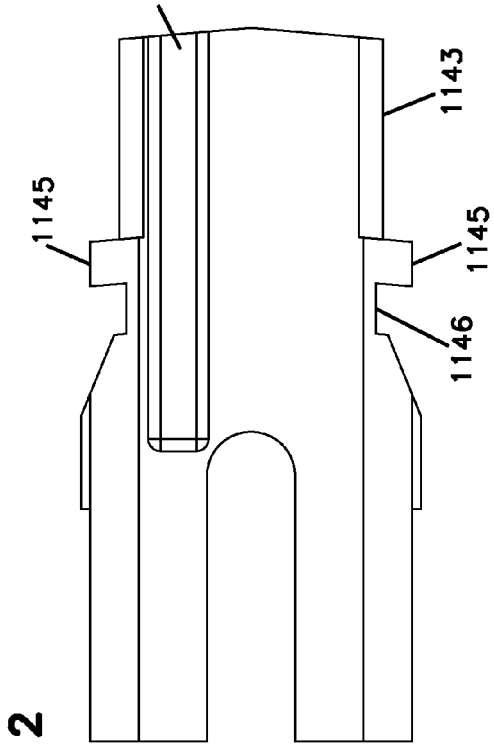
Figure 13:
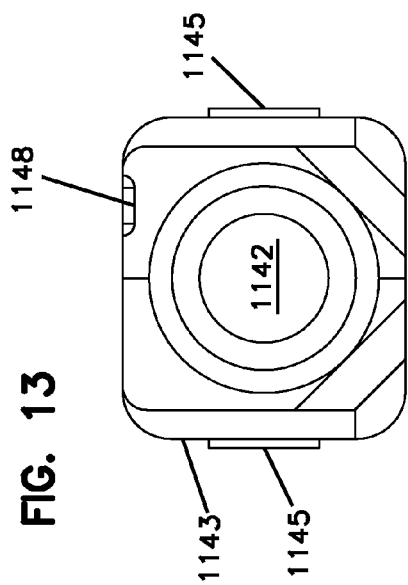

One example implementation of an inner portion 1140 is shown in FIGS. 11-13. The example inner portion 1140 includes a body 1141 configured to hold the ferrule 1112 within an axial bore 1142. Two sets of parallel ridges 1145 extend outwardly from opposite sides 1143 of the inner portion 1140. In some implementations, the ridges 1145 are generally perpendicular to the axial bore 1142. The ridges 1145 define detents 1146 on the opposite sides 1143. These ridges 1145 and detents 1146 enable the connector 1110 to be releasably locked to retaining clips of a coupler assembly (described in more detail herein).

Figure 14:
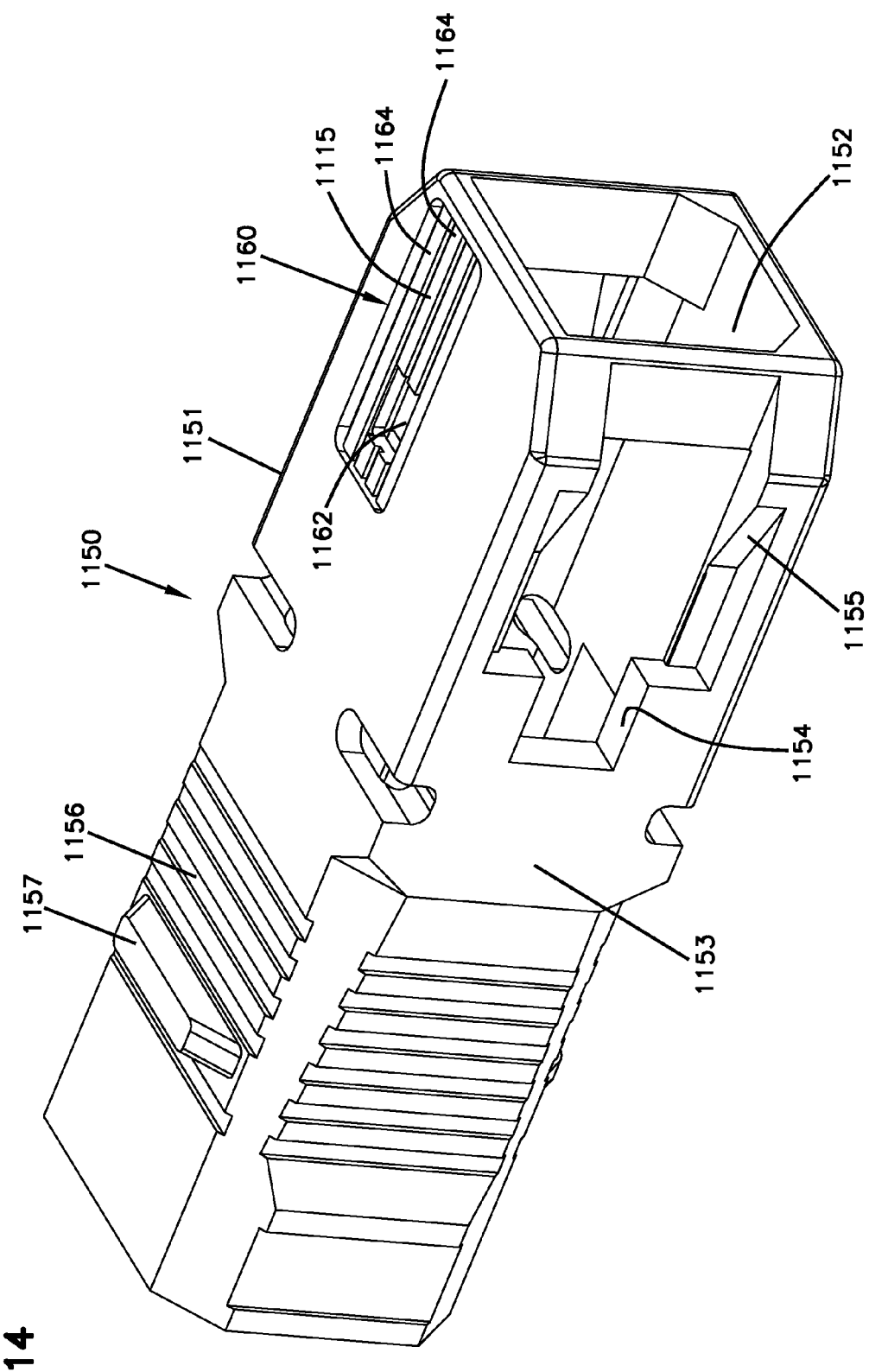
Figure 16:
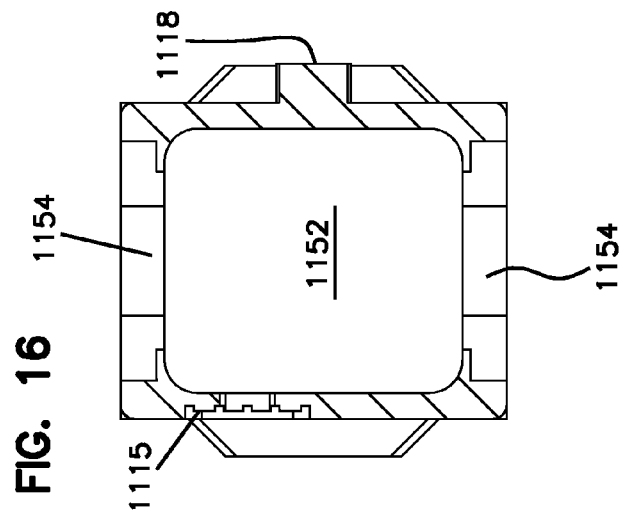
Figure 15:
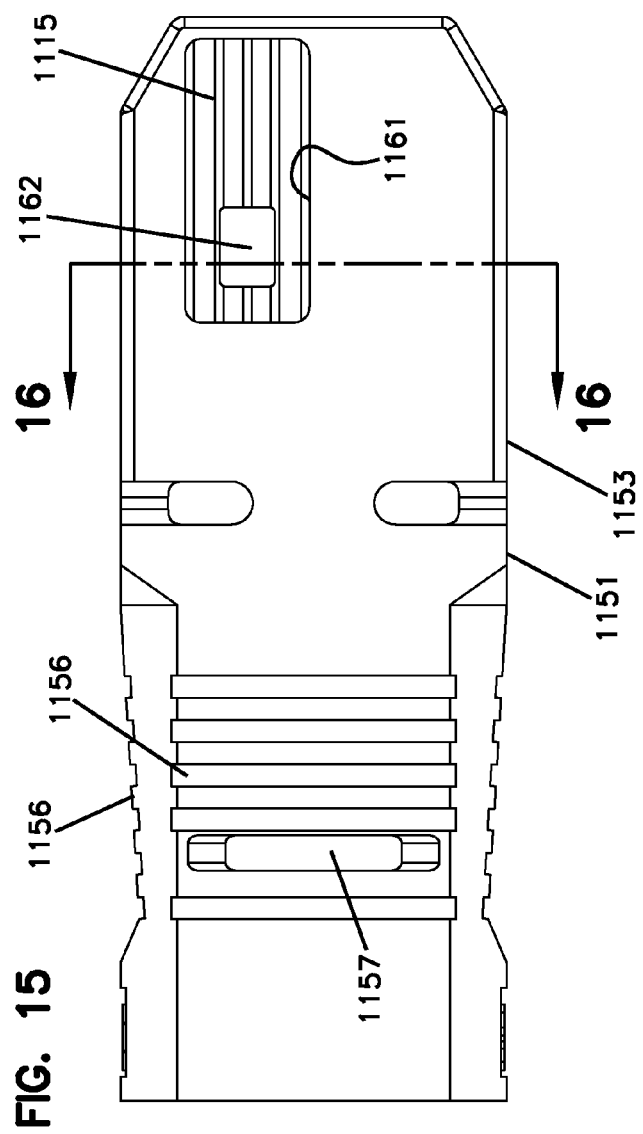

One example implementation of an outer portion 1150 is shown in FIGS. 14-16. The outer portion 1150 includes a body 1151 defining a through-passage 1152 that is sized and configured to receive the inner portion 1140. The outer housing portion 1150 defines an open front end through which the ferrule 112 extends. Opposite sides 1153 of the body 1151 define cut-outs 1154 that form slots 1116. When the inner portion 1140 is placed within the outer portion 1150, the raised ridges 1145 of the inner portion 1140 are exposed through slots 1116. Each of the side walls 1153 also defines a ramp or cam surface 1155 in a region of the cutout 1154 and positioned adjacent the respective ridge 1145. The key 1118 is formed on a different side of the outer portion 1150 from the cutouts 1154.

The outer portion 1150 also includes a knurled handle or other grip section 1156. In certain implementations, the grip section 1156 is provided at a rear of the outer portion 1150. In some implementations, the grip section 1156 extends over all of the sides of the body 1151. In other implementations, the grip section 1156 is formed on two opposite sides of the outer portion (e.g., opposite sides 1153). In the example shown, a ridge 1157 or other grip member may be provided at the grip section 1156.

Additional details regarding an example connector 1110 can be found in U.S. Pat. No. 5,317,663, issued May 31, 1994 to Beard et al., and titled "One-Piece SC Adapter," the disclosure of which is hereby incorporated herein by reference in its entirety.

Each connector arrangement 1100 is configured to store physical layer information. For example, a storage device 1130 may be installed on or in the connector body 1114 of the fiber optic connector 1110. One example storage device 1130 includes a printed circuit board 1131 (FIG. 8) on which memory circuitry can be arranged. Electrical contacts 1132 also may be arranged on the printed circuit board 1131 for interaction with a media reading interface of the communications coupler assembly 1200 (described in more detail herein). In one example implementation, the storage device 1130 includes an EEPROM circuit 1133 arranged on the printed circuit board 1131 (see (FIG. 10). In other implementations, however, the storage device 1130 can include any suitable type of non-volatile memory.

Figure 8:
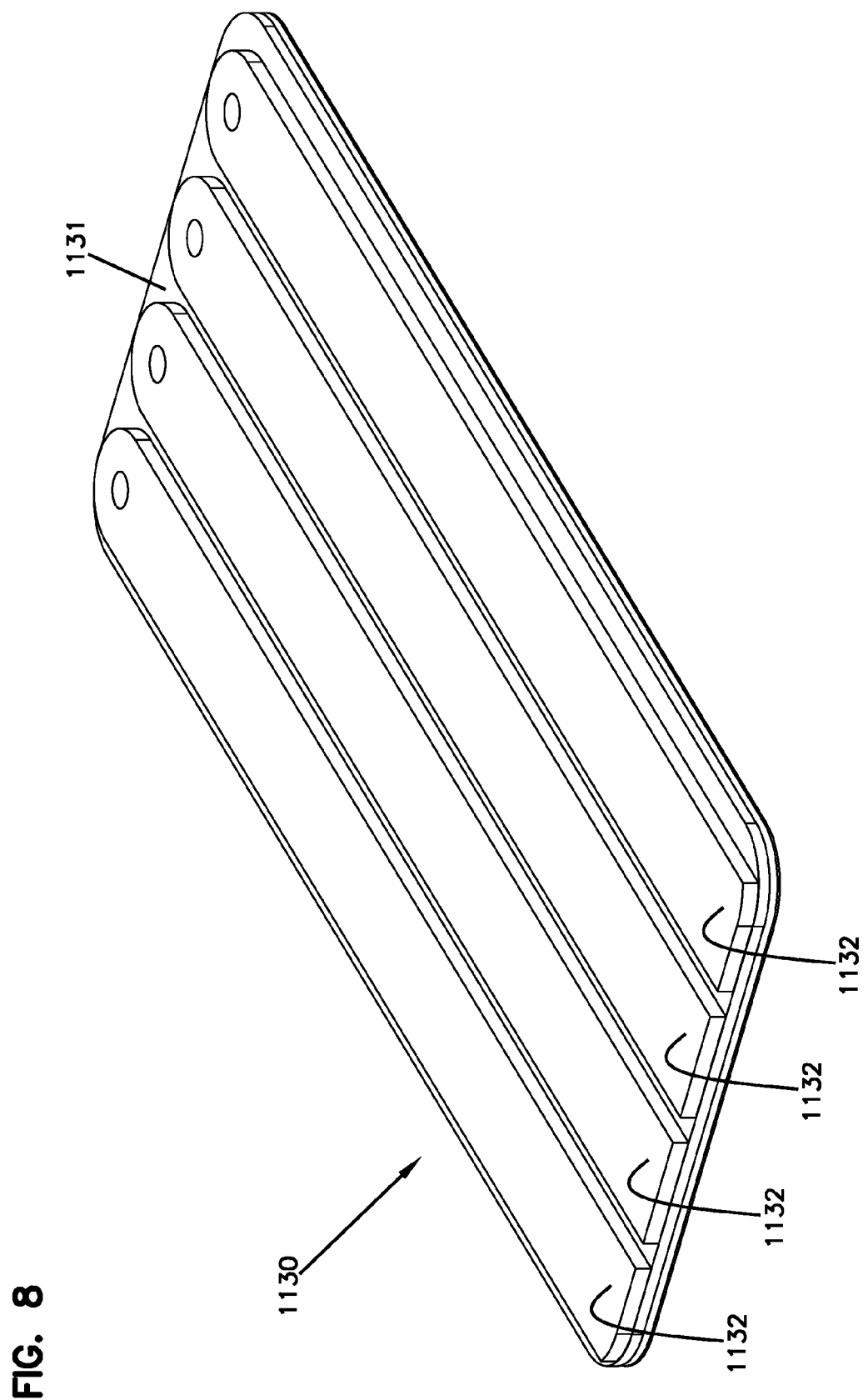

The storage device 1130 shown in FIGS. 8-10 includes generally planar contacts 1132 positioned on a generally planar circuit board 1131. Memory 1133 (FIG. 10) of the storage device 1130, which is located on the non-visible side of the board in FIG. 8, is accessed by engaging the tops of the contacts 1132 with one or more electrically conductive contact members of a media reading interface (e.g., contact member 1241 of FIG. 34). In certain implementations, the contact member 1241 slides or wipes across the contacts 1132 (see FIGS. 44-45).

In some implementations, the contacts 1132 have the same length. In other implementations, one or more of the contacts 1132 may have different lengths. In some implementations, the contacts 1132 have the same shape. For example, in some implementation, the contacts 1132 may be generally rounded at one or both ends of the contact members. In other implementations, one or more of the contacts 1132 may have different shapes. For example, in certain implementations, some of the contacts 1132 are straight and some of the contacts 1132 are generally L-shaped. In one example implementation, the L-shaped contacts may be longer than the rounded end contacts. In some implementations, the contacts 1132 may be positioned in a staggered configuration. In other implementations, the contacts 1132 may be laterally aligned.

As shown in FIGS. 7 and 14-16, the outer portion 1150 of the connector body 1114 may define a recessed section or cavity 1115 in which the storage device 1130 may be positioned. In some implementations, the cavity 1115 is provided on an opposite side of the outer portion 1150 from the key 1118. In another implementation, the cavity 1115 may be provided on the same side as the key 118. In other implementations, the cavity 1115 may be provided on the inner portion 1140 or elsewhere on the connector body 1114. In some implementations, the cavity 1115 is formed at a front, center location of the connector side opposite the key 1118. In other implementations, the cavity 1115 is formed at a front location offset from the center (e.g., see FIG. 15). For example, FIG. 17 shows an example storage device 1130 mounted offset from a longitudinal axis L of the connector 1110.

In some implementations, the cavity 1115 has a stepped configuration 1160 to facilitate positioning of the storage device 1130. In the example shown, the cavity 1115 is formed by a depression 1161 in a side of the outer portion 1150. The depression 1161 is generally sized and configured to receive the printed circuit board 1131 of the storage device 1130. For example, the depression 1161 may be sufficiently deep to enable electrical contacts 1132 provided on the circuit board 1131 to be generally flush with the side of the outer portion 1150 (see FIG. 6). In certain implementations, a well 1162 may be formed at one location in the depression 1161. The well 1162 is sufficiently deep to accommodate an EEPROM circuit 1133 coupled to one side of the circuit board 1131.

In certain implementations, one or more ridges 1164 are provided in the depression 1161 to facilitate mounting the storage device 1130 within the cavity 1115. For example, in some implementations, the ridges 1164 may increase the surface area over which an adhesive may be applied to secure the storage device 1130 within the cavity 1115. In the example shown, the ridges 1164 are rectangularly shaped (see FIGS. 14-16). In other implementations, however, the ridges 1164 may form bumps, peaks, or some other texture within the depression 1161 to increase the surface area over which adhesive is applied.

The inner portion 1140 of the connector body 1114 is configured to accommodate at least part of the cavity 1115 defined in the outer portion 1150. For example, the inner portion 1140 may defines a channel 1148 that aligns with the cavity 1115 when the inner portion 1140 is mounted within the outer portion 1150. In some implementations, the channel 1148 is sized to receive the portion of the outer body 1150 defining the well 1162 within the cavity 1115. In the example shown in FIGS. 11-13, the channel 1148 is formed at a location offset from a center axis of the inner portion 1140. The channel 1148 is sufficiently long to accommodate movement of the well 1162 when the outer portion 1150 is moved relative to the inner portion 1140.

FIGS. 17-20 show the storage device 1130 installed on an example connector 1110. In some implementations, a cover can be positioned over the storage device 1130 to enclose the storage device 1130 within the cavity 1115 of the connector 1110. In other implementations, the storage device 1130 is left uncovered and exposed. As shown in FIG. 18, the storage device 1130 may be mounted flush with an external surface of the connector 1110. In some implementations, the storage device 1130 is positioned offset from a front of the connector 1110 so that the front of the connector 1110 forms a deflection surface 1159 (see FIG. 18). In other implementations, the storage device 1130 may be positioned to extend over or through the front section 1159 of the connector 1110.

Figure 20:
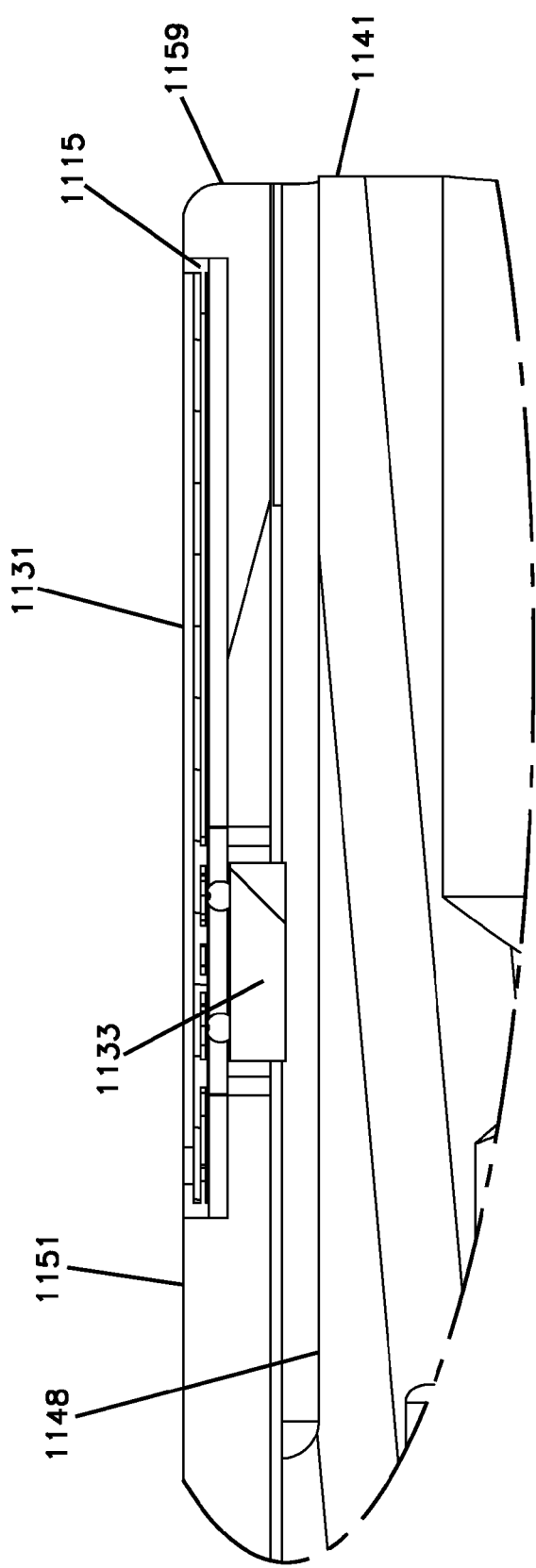

FIGS. 19 and 20 show how the storage device 1130 affects the interaction between the inner portion 1140 and the outer portion 1150 of the connector housing 1114. At least the memory 1133 positioned in the well 1162 of the cavity 1115 protrudes from the outer portion 1150 of the connector housing 1114 towards the inner portion 1140. The memory 1133 aligns with and extends into the channel 1148 defined by the inner portion 1140 of the connector housing 1114. The well 1162 slides within the channel 1148 as the outer portion 1150 is moved axially relative to the inner portion 1140 of the connector housing 1114. In certain implementations, the section of the outer housing portion 1150 defining the entire cavity 1115 protrudes inwardly and is accommodated by the channel 1148.

FIGS. 21-33 show one example implementation of a communications coupler assembly 1200 implemented as a fiber optic adapter. The example communications coupler assembly 1200 includes an adapter housing 1210 defining one or more passages 1215 configured to align and interface two or more fiber optic connectors 1110 (e.g., see FIG. 4). In other example implementations, however, one or more passages 1215 can be configured to communicatively couple together a fiber optic connector 1110 with a media converter (not shown) to convert the optical data signals into electrical data signals, wireless data signals, or other such data signals. In still other implementations, the communications coupler assembly 1200 can include an electrical termination block that is configured to receive punch-down wires, electrical plugs (e.g., for electrical jacks), or other types of electrical connectors.

The example adapter housing 1210 shown in FIGS. 23-27 is formed from opposing side walls 1211 interconnected by first and second end walls 1212. The side walls 1211 and end walls 1212 each extend between a front end and a rear end. The adapter housing 1210 defines one or more axial passages 1215 extending between the front and rear ends. Each end of each passage 1215 defines a port that is configured to receive a connector 1110. In the example shown, the adapter housing 1210 defines a single axial passage 1215. In other implementations, however, the adapter housing 1210 may define one, two, three, six, eight, ten, twelve, sixteen, or even more axial passages 1215. Sleeves (e.g., split sleeves) 1206 are positioned within the axial passages 1215 to receive and align the ferrules 1112 of fiber optic connectors 1110 (see FIG. 22).

One or more ports leading to the axial passage 1215 are formed at the front and rear of the adapter housing 1210. One or more guides 1216 may be defined at an interior of adapter housing 1210. The guides 1216 extend longitudinally along the interior corners of the axial passage 1215. The guides 1216 cooperate with the outer surface of a fiber optic connector housing 1114 to receive the connector 1110 within the axial passage 1215. In certain embodiments, the guides 1216 may define ramped entry surfaces to facilitate insertion of the connector housing 1114 within the adapter passage 1215. One of the end walls 1212 of the adapter housing 1210 defines at least one keyway 1218 sized and shaped to receive a corresponding key 1118 of the SC-type fiber optic connector 1110 (see FIG. 5). In certain implementations, a keyway 1218 is defined in the end wall 1212 at both ports (see FIG. 24).

Flanges 1217 extend outwardly from the side walls 1211 of the adapter housing 1210. The flanges 1217 aid in supporting the adapter housing 1210 on or against a planar surface, such as that of a bulkhead. In some implementations, one or both side walls 1211 of the adapter housing 1210 also include a flexible cantilever arm defining outwardly protruding tabs that are configured to cooperate with the flanges 1217 to capture the adapter housing 1210 against a bulkhead. In other implementations, the side walls 1211 of the adapter housing 1210 define solid surfaces. In still other implementations, recesses may be provided in the side walls 1211 to permit the use of alternative fasteners, such as a flexible clip.

In some implementations, the flanges 1217 are sufficiently long to accommodate fastener openings 1219. In certain implementations, an annular wall may be provided on one end of the flanges 1217 to demarcate the fastener openings 1219. In some implementations, fasteners (e.g., screws, snaps, nails, bolts, rivets, etc.) may be inserted into the fastener openings 1219 to secure the adapter housing 1210 to a surface. In other implementations, fasteners 1255 may be inserted into the fastener openings 1219 to secure a circuit board 1250 or other structure to the adapter housing 1210. In certain implementations, the circuit board fasteners 1255 may extend completely through the flanges 1217 to secure the circuit board 1250 to one end of the adapter housing 1210 and to secure the other end of the adapter housing 1210 to another surface.

A ferrule alignment arrangement 1230 is located in the axial passage 1215 of the adapter housing 1210. One example ferrule alignment arrangement 1230 is shown in FIG. 28. The ferrule alignment arrangement 1230 includes a sleeve mount arrangement 1231 and a ferrule sleeve 1206, which is configured to be inserted within the sleeve mount arrangement 1231. The sleeve mount arrangement 1231 defines an axial bore 1234 in which the ferrule sleeve 1206 may be positioned. In certain embodiments, the sleeve 1206 may also include a slit for allowing the sleeve 1206 to compress, elastically reducing its diameter during insertion into the axial bore 1234. The slit also may enable the sleeve 1206 to expand to receive a ferrule 1112 of a connector 1110.

In some implementations, the sleeve mount arrangement 1231 includes a first piece 1232 and a second piece 1233. In the example shown in FIG. 28, the pieces 1231, 1232 include alignment structures 1238. In other implementations, however, the sleeve mount arrangement 1231 can be formed as a single-piece. Each piece 1232, 1233 of the sleeve mount arrangement 1231 includes resilient fingers 1235 defining latching hooks 1236. The latching hooks 1236 are configured to cooperate with the housing 1114 of the SC-type connector 1110 to releasably latch the connectors 1110 to the adapter housing 1210.

When a first connector 1110 is fully inserted into the adapter housing 1210 at one of the ports, the flexible latching hooks 1236 of the sleeve mount arrangement 1231 engage the slots 1116 defined in the outer portion 1150 of the connector housing 1114 to releasably hold connector 1110 at the adapter port. For example, the latching hooks 1236 may flex over ridges 1145 and snap into the detents 1146 of the inner portion 1140 of the connector housing 1114. When properly positioned within the axial passage 1215, the connector ferrule 1112 is received within the ferrule sleeve 1206 inside the sleeve mount 1230. When a second connector 1110 is inserted into the adapter housing 1210 at the opposing port, an optical connection is formed between the optical fiber 1015 of the first connector 1110 and the optical fiber of the second connector 1110 through the abutting contact faces of the ferrules 1112 within the ferrule sleeve 1206.

When removing one of the fiber optic connectors 1110, the slidable outer portion 1150 of the connector housing 1114 is slid axially relative to the inner portion 1140 of the connector housing 1114 away from the opposing connector until the flexible latching hooks 1236 of the adapter housing 1210 are released from the slots 1116 defined on the outer portion 1150 of the connector housing 1114.

In some implementations, at least a portion of the ferrule alignment arrangement 1230 is formed as a single piece with the adapter housing 1210. For example, in some implementations, one of the end walls 1212 of the adapter housing 1210 defines an opening 1213 leading to the axial passage 1215. The opening 1213 in the end wall 1212 may enable an injection molding machine access to the axial passage to form the ferrule alignment arrangement 1230. In other implementations, the ferrule alignment arrangement 1230 is formed separately from the adapter housing 1210 and subsequently inserted into the axial passage 1215 through the opening 1213. In still other implementations, neither of the end walls 1212 defines an opening 1213. For example, the ferrule alignment arrangement 1230 may be inserted into the axial passage 1215 through one of the ports.

A cover element 1220 may be coupled to the end wall 1212 of certain types of adapter housing 1210 to close the opening 1213. One example cover element 1220 is shown in FIGS. 29-33. In some implementations, the cover panel 1220 is configured to seat on upper guides 1216 of the adapter housing 1210. For example, a lower surface of the cover panel 1220 may define ribs 1222 that seat on the guides 1216 when the cover panel 1220 is coupled to the adapter housing 1210. In certain implementations, the cover panel 1220 is ultrasonically welded or otherwise secured to the end wall 1212. In some implementations, the cover panel 1220 also includes lower flanges 1223 that define a recess 1224 in which a portion of the sleeve mount arrangement 1231 may be received (see FIG. 41). Another example cover element is disclosed in U.S. Pat. No. 5,317,663, which is incorporated by reference above.

Figure 22:
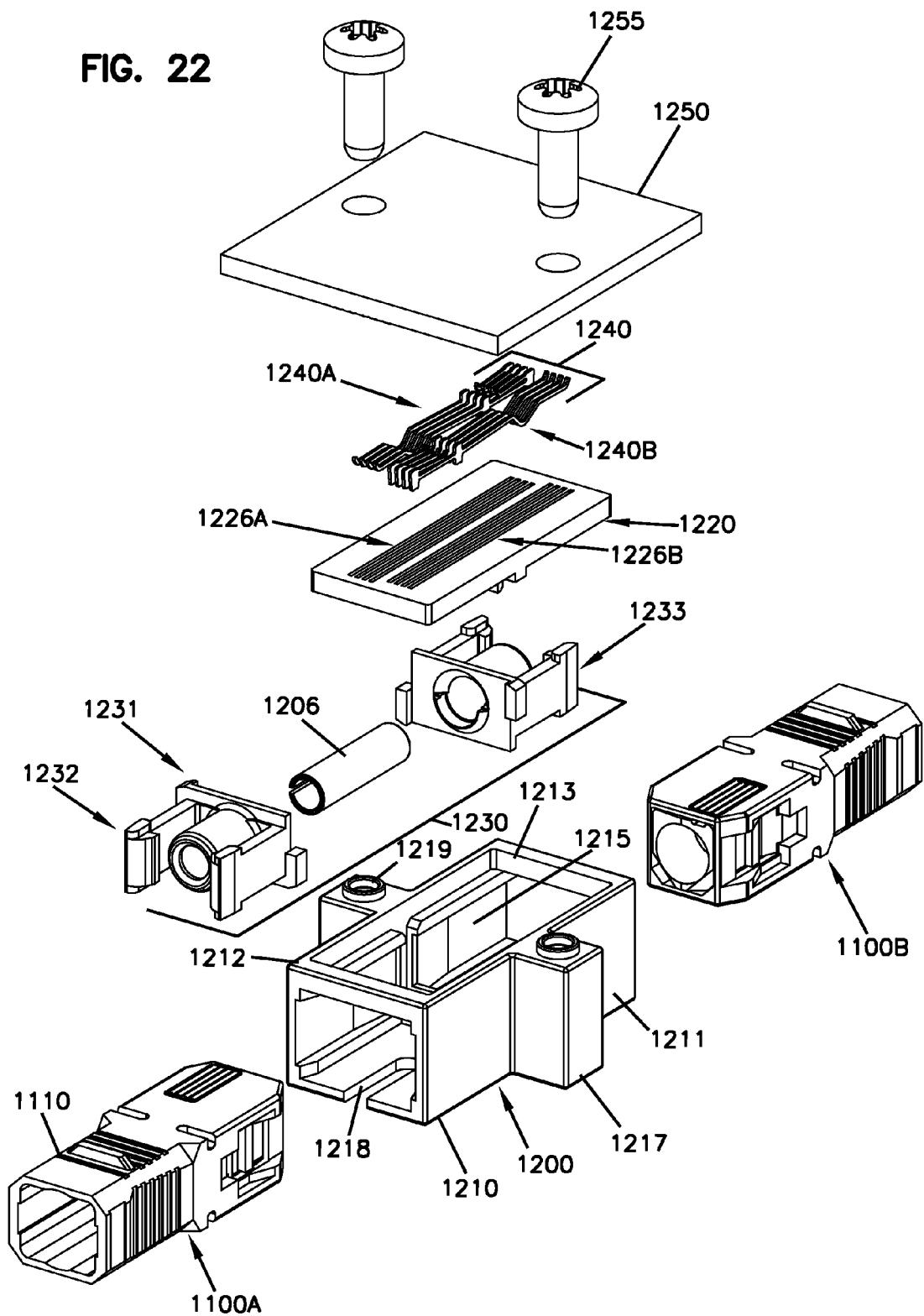
Figure 24:
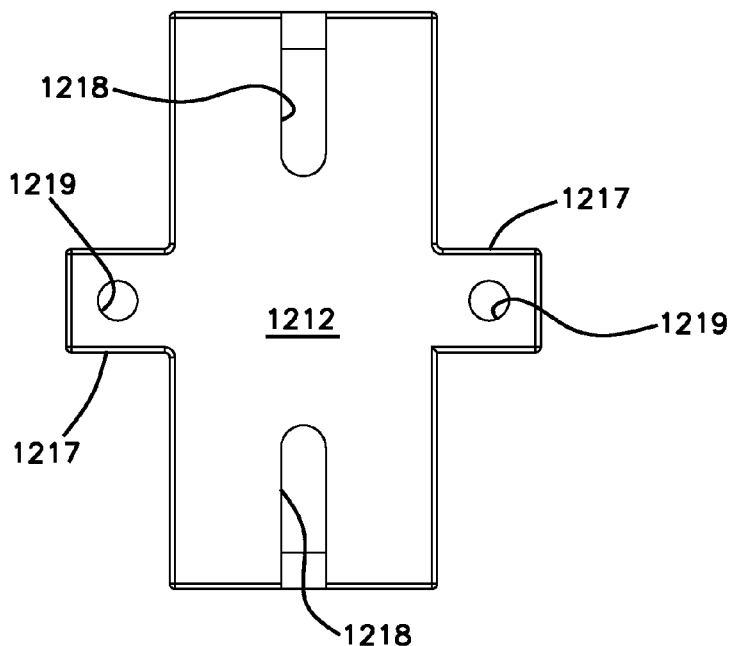
Figure 25:
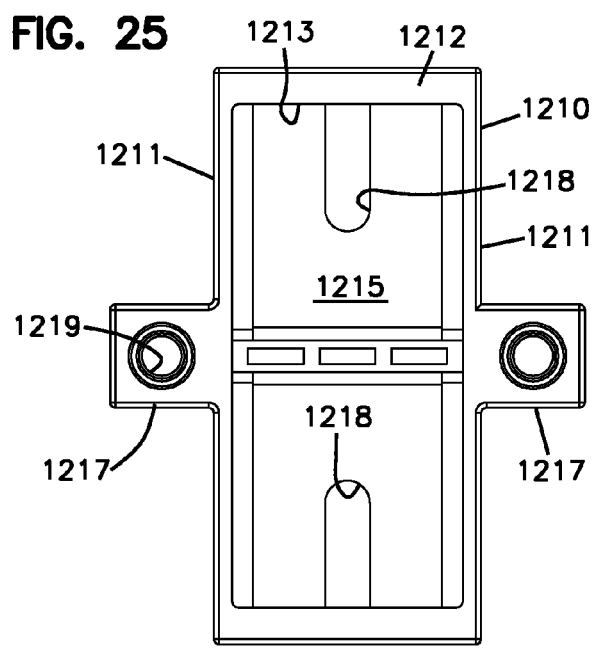
Figure 26:
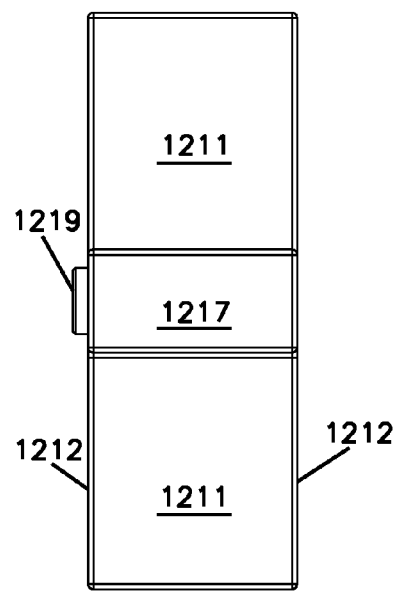
Figure 27:
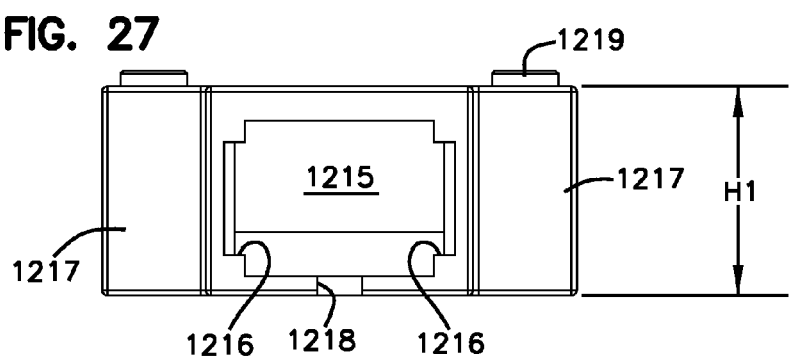

The coupler assembly 1200 includes one or more media reading interfaces 1240 (see FIG. 22). Each media reading interface 1240 is configured to acquire the physical layer information from the storage device 1130 of a fiber optic connector 1110 plugged into the fiber optic adapter 1210. For example, in one implementation, the adapter housing 1210 can hold or retain a media reading interface 1240 for each passage 1215. In another implementation, the adapter housing 1210 can hold or retain a media reading interface 1240 for each port of each passage 1215. In still other implementations, the adapter housing 1210 can include a media reading interface 1240 associated with each set of passages 1215 that accommodate a connector arrangement 1100. For example, the adapter 1210 shown in FIG. 22 includes a first media reading interface 1240A associated with the front port of the passage 1215 and a second media reading interface 1240B associated with the rear port of the passage 1215. In other implementations, the adapter housing 1210 can include any desired combination of front and rear media reading interfaces 1240.

In certain implementations, the orientation of the first media reading interface 1240A is flipped 180° from the orientation of the second media reading interface 1240B. In some implementations, the first media reading interface 1240A is laterally offset from the second media reading interface 1240B. For example, the first and second media reading interfaces 1240A, 1240B may be positioned side-by-side. In other implementations, the first and second media reading interfaces 1240A, 1240B may be axially aligned. In some implementations, the first and second media reading interfaces 1240A, 1240B may be laterally aligned. In other implementations, the first media reading interfaces 1240A may be offset towards the front of the adapter housing 1210 and the second media reading interface 1240B may be offset towards the rear of the adapter housing 1210.

Figure 34:
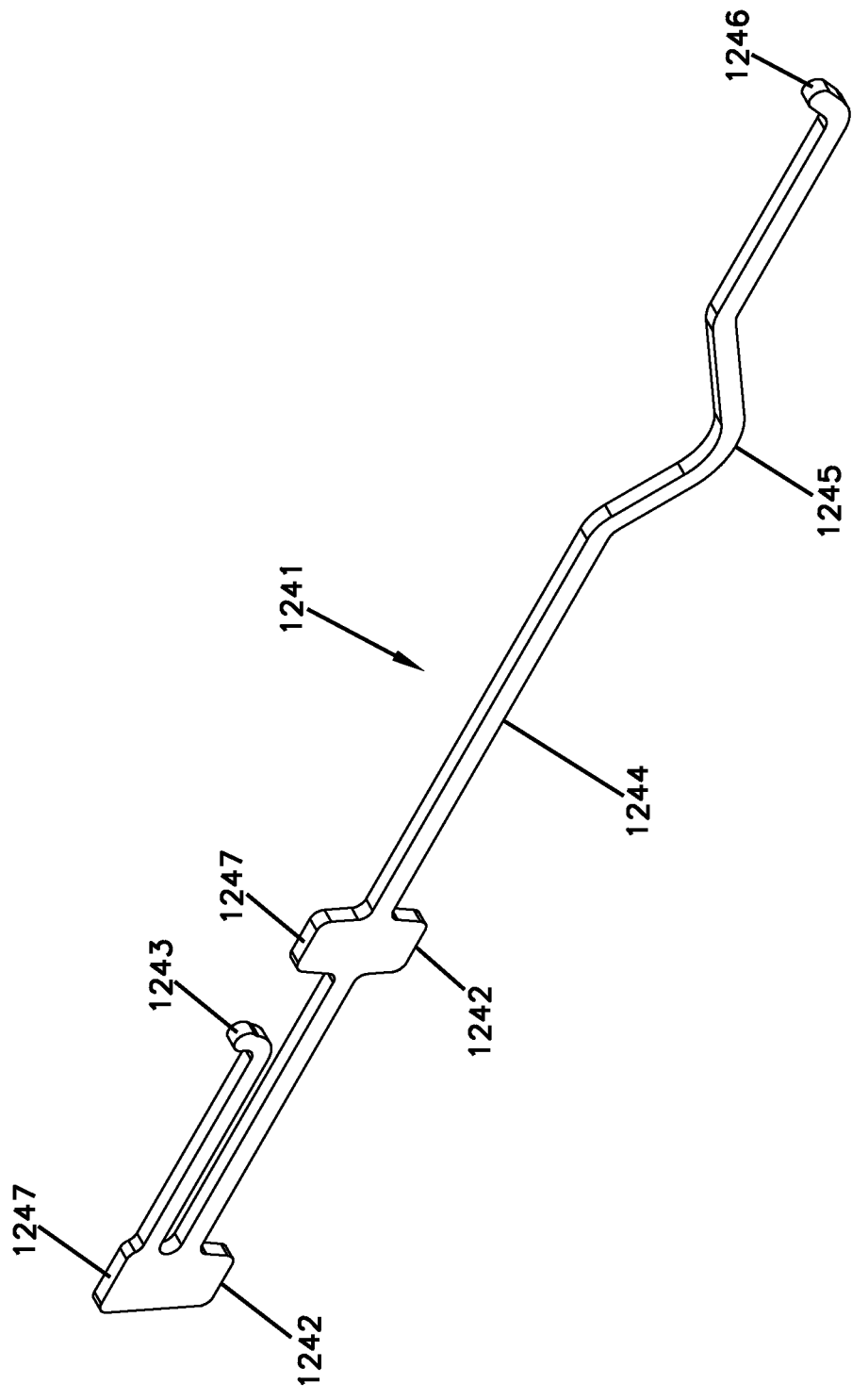

In general, each media reading interface 1240 is formed from one or more contact members 1241 (e.g., see FIGS. 34-36). In some implementations, the media reading interface 1240 includes at least a first contact member 1241 that transfers power, at least a second contact member 1241 that transfers data, and at least a third contact member 1241 that provides grounding. In one implementation, the media reading interface 1240 includes a fourth contact member. In other implementations, the media reading interface 1240 include greater or fewer contact members 1241.

In certain implementations, the cover panel 1220 defines slots 1225 configured to receive one or more contact members 1241. When a connector 1110 with a storage device 1130 is inserted into one of the ports of the adapter housing 1210, the contacts 1132 of the storage device 1130 are configured to align with the slots 1225 defined in the adapter housing 1210. Accordingly, the media reading interface contact members 1241 held within the slots 1225 align with the contacts 1132 of the connector storage device 1130.

Figure 61:
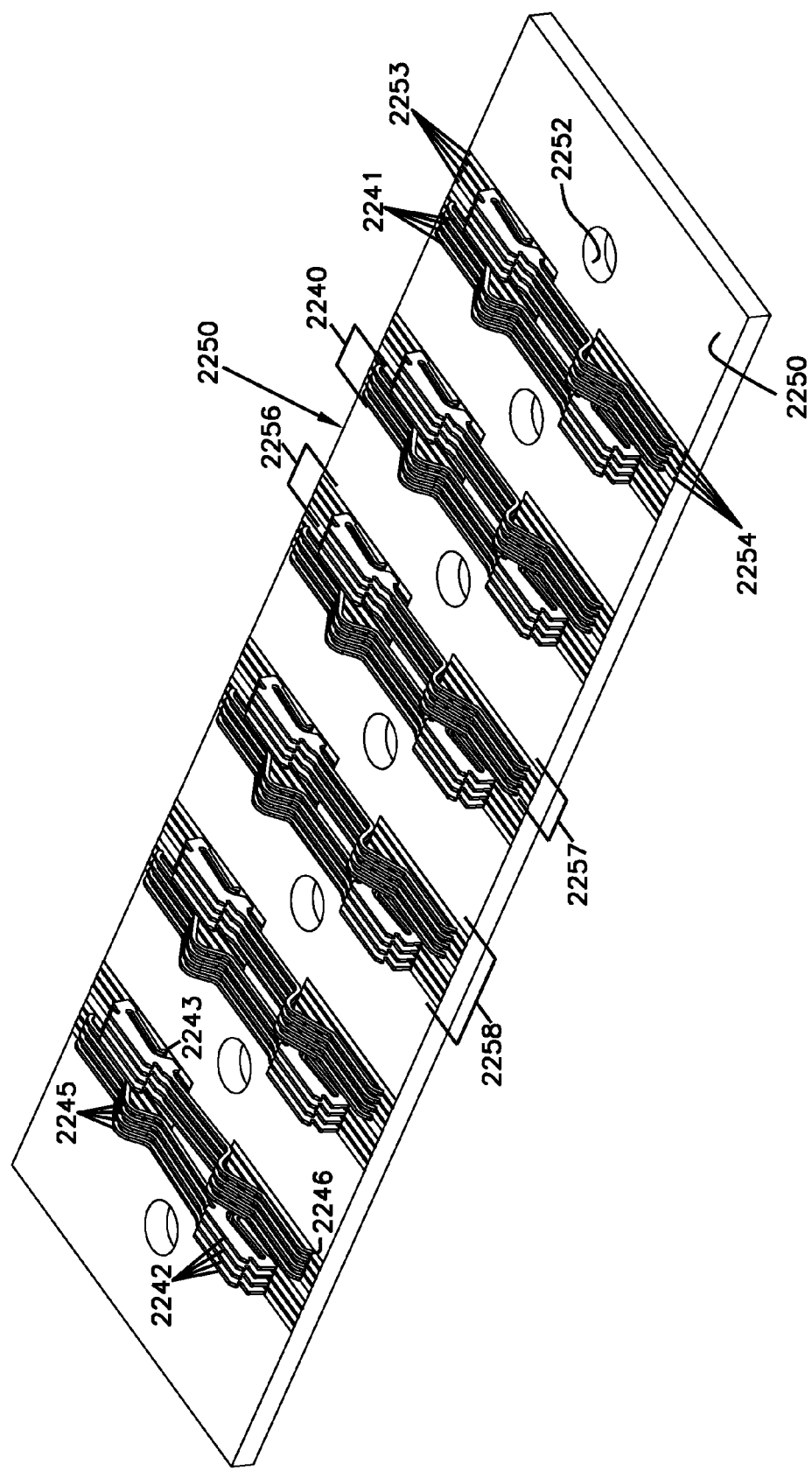

In some implementations, each contact member 1241 is retained within a separate slot 1225 of the cover panel 1220. For example, in the implementation shown in FIG. 22, each media reading interface 1240 includes four contact members 1241 that are held in a set 1226 (FIG. 29) of four slots 1225. The slots 1225 position the contact members 1241 in alignment with the contact pads 1132 of a connector storage device 1130 mounted to a connector 1110 received at the adapter housing 1210. The slots 1225 in each set 1226 are separated by intermediate walls 1229 (FIGS. 29 and 61). In other implementations, all of the contact members 1241 in a single media reading interface 1240 may be retained in a single slot.

At least a portion of each slot 1225 extends through a body 1221 of the cover element 1220 to the axial passage 1215 of the adapter housing 1210. In some implementations, the entirety of each slot 1225 extends through the cover body 1221 from top to bottom. In other implementations, only portions of the slot 1225 extend from the top to the bottom of the cover body 1221. For example, each slot 1225 may define a recess in the top surface of the body 1221 in which the contact members can be positioned. Openings 1227, 1228 defined in a bottom of the cover body 1221 enable portions of the contact members 1241 to extend into a respective adapter passageway 1215.

In some implementations, the cover element 1220 is sufficiently thick to enable the media reading interfaces 1240 to be substantially positioned in the cover element 1220. In some implementations, the material height of the cover element 1220 is at least 0.76 mm (0.03 inches). Indeed, in some implementations, the material height of the cover element 1220 is at least 1.02 mm (0.04 inches). In certain implementations, the material height of the cover element 1220 is at least 1.27 mm (0.05 inches). In some implementations, a height H1 (FIG. 27) of the adapter housing 1210 is at least 9.4 mm. In certain implementations, the height H1 of the adapter housing 1210 is at least 10 mm. Indeed, in certain implementations, the height H1 is at least 10.2 mm. In one example implementation, the height H1 is about 10.3 mm. In one example implementation, the height H1 is about 10.4 mm. In one example implementation, the height H1 is about 10.5 mm. In one example implementation, the height H1 is about 10.6 mm. In one example implementation, the height H1 is about 10.7 mm.

In some implementations, the contact members 1241 of a single media reading interface 1240 are positioned in a staggered configuration. For example, alternating ones of the contact members 1241 are moved axially forward or axially rearward. In some implementations, the slots 1225 accommodating the staggered contact members 1241 also are staggered (e.g., in a front to rear direction). In other implementations, however, the slots 1225 may have a common length. In still other implementations, the front and rear ends of the contact members 1241 of a single media reading interface 1240 are transversely aligned within similarly transversely aligned slots 1225.

In some implementations, the cover panel 1220 may define a first slot set 1226A sized to receive the first media reading interface 1240A and a second slot set 1226B sized to receive the second media reading interface 1240B. The first slot set 1226A is laterally offset from the second slot set 1226B (see FIG. 29). In other implementations, the first and second slot sets 1226A, 1226B may be axially aligned. In the example shown, the first slot set 1226A is axially offset towards the front of the adapter housing 1210 relative to the second slot set 1226B. In other implementations, however, the slots sets 1226A, 1226B may be laterally aligned.

As shown in FIG. 29, each set 1226 of slots 1225 accommodating one media reading interface 1240 has a width W1 and each slot 1225 has a width W2. Intermediate walls 1229, which separate the slots 1225 of each set 1226, each have a width W3. In general, the width W1 of each set 1226 of slots 1225 is about the width of a storage device 1130 of a connector 1110 configured to be received at the adapter housing 1210. In some implementations, the width W1 of each set 1226 of slots 1225 is less than 3.35 mm (0.13 inches). Indeed, in some implementations, the width W1 of each set 1226 of slots 1225 is less than about 3.1 mm (0.12 inches). In certain implementations, the width W1 of each set 1226 of slots 1225 is no more than about 2.5 mm (0.10 inches). In one example implementation, the width W1 of each set 1226 of slots 1225 is no more than 2.2 mm (0.09 inches). In one example implementation, the width W1 of each set 1226 of slots 1225 is about 2 mm (0.08 inches). In one example implementation, the width W1 of each set 1226 of slots 1225 is about 2.1 mm (0.081 inches).

In certain implementations, the width W3 of the intermediate walls 1229 is smaller than the width W2 of the slots 1225. In some implementations, the width W2 of each slot 1225 is within the range of about 0.25 mm (0.010 inches) to about 0.64 mm (0.025 inches). Indeed, in some implementations, the width W2 of each slot 1225 is within the range of about 0.28 mm (0.011 inches) to about 0.48 mm (0.019 inches). In one implementation, the width W2 of each slot 1225 is about 0.3 mm (0.012 inches). In one implementation, the width W2 of each slot 1225 is about 0.28 mm (0.011 inches). In one implementation, the width W2 of each slot 1225 is about 0.33 mm (0.013 inches). In some implementations, the width W3 of each intermediate wall 1229 is within the range of about 0.13 mm (0.005) inches to about 0.36 mm (0.014 inches). In one implementation, the width W3 of each intermediate wall 1229 is about 0.28 mm (0.011 inches). In another implementation, the width W3 of each intermediate wall 1229 is about 0.15 mm (0.006 inches).

In some implementations, the adapter housing 1210 has more sets 1226 of slots 1225 than media reading interfaces 1240. For example, in some implementations, each adapter housing 1210 defines a set 1226 of slots 1225 at each port of each passage 1215 and one media reading interface 1240 per passage. In other implementations, however, the adapter housing 1210 may have the same number of slot sets 1226 and media reading interfaces 1241. For example, in certain implementations, each adapter housing 1210 may defines a set 1226 of slots 1225 at only one port of each passage 1215 or may include a media reading interface 1240 at each port. In other implementations, the adapter housing 1210 may define a set 1226 of slots 1225 at each port of alternate passages 1215.

As shown in FIG. 22, the media reading interfaces 1240 are positioned in the slots 1225 of the cover element 1220 to connect a storage device 1130 of a connector 1110 received at the adapter housing 1210 with a circuit board 1250 coupled to the adapter housing 1210. For example, a circuit board 1250 may be secured (e.g., via fasteners 1255) to the adapter housing 1210 so as to extend over the slots 1225 of the cover element 1220. For ease in understanding, only a portion of the circuit board 1250 is shown in FIG. 22. It is to be understood that the circuit board 1250 electrically connects to a data processor and/or to a network interface (e.g., the processor 217 and network interface 216 of FIG. 2). It is further to be understood that multiple communications coupler housings 1210 can be connected to the printed circuit board 1250 within a connector assembly (e.g., a communications panel). A processor coupled to the circuit board 1250 can access the memory 1133 of each connector arrangement 1100 coupled to the adapter housing 1210 through corresponding ones of the contact members 1241, 1131.

Each media reading interface 1240 held by the cover panel 1220 extends between the circuit board 1250 and a respective axial passage 1215 of the adapter housing 1210. Portions of each contact member 1241 engage tracings and contacts 1252 on the circuit board 1250. Other portions of the contact members 1241 engage the electrical contacts 1132 of the storage members 1130 attached to any connector arrangements 1100 plugged into the adapter housing 1210.

One example type of contact member 1241 is shown in FIGS. 34-36. Each contact member 1241 includes at least three moveable (e.g., flexible) contact sections 1243, 1245, and 1246 defining contact surfaces. The flexibility of the contact sections 1243, 1245, and 1246 provides tolerance for differences in spacing between the contact member 1241 and the respective printed circuit board 1250 when the coupler assembly 1200 is manufactured. Certain types of contact members 1251 also include at least one stationary contact 1247 having a contact surface. The example contact shown in FIG. 34 includes two stationary contact surfaces 1247. In the example shown, the first moveable contact section 1243 is located between the two stationary contacts 1247.

The first moveable contact section 1243 is configured to extend through the slot 1225 and engage the circuit board 1250. The stationary contacts 1247 also are configured to extend through the slot 1225 to engage the circuit board 1250. The ability of the first contact section 1243 to flex relative to the stationary contact 1247 provides tolerance for placement of the contact member 1241 relative to the circuit board 1250. The second moveable contact section 1245 is configured to extend into the axial passage 1215 of the adapter housing 1210 and engage a connector 1110 at a port thereof. If a storage device 1130 is installed on the connector 1110, then the second contact surface 1245 is configured to engage the contact pads 1132 of the storage device 1130.

The third moveable contact surface 1246 is configured to selectively extend through the slot 1225 and engage the circuit board 1250. For example, the third contact surface 1246 may be configured to engage the circuit board 1250 when a connector 1110 is inserted into a passage 1215 corresponding with the contact member 1241. Certain types of contact members 1241 also include a resilient section 1244. The resilient section 1244 is configured to transfer force applied to second moveable contact section 1245 to the third moveable contact surface 1246. For example, the resilient section 1244 transfers a force pushing the second section 1245 towards the slot 1225 to the third section 1246, thereby pushing the third contact surface 1246 upwardly through the slot 1225 (e.g., toward the circuit board 1250).

In some implementations, the resilient section 1244 defines a thin, linear section of the contact 1241. In other implementations, the resilient section 1244 may define a series of curves, folds, and/or bends. For example, in one implementation, the resilient section may define a partial arc. In some implementations, the resilient section 1244 has sufficient resiliency to lift and swipe the third moveable contact surface 1246 against the printed circuit board 1250 (see FIGS. 43-45).

The example contact member 1241 is configured to seat in one of the slots 1225 of the adapter housing 1210. For example, the contact member 1241 includes one or more bases 1242 that are configured to seat in one or more openings 1228 defined in the cover body 1221 (see FIG. 42). The bases 1242 aid in securing the contact member 1241 within the slot 1225 of the cover element 1220. In some implementations, the bases 1242 define contours, hooks, or other attachment features that aid in retaining the contact member 1241 to the cover body 1221.

In some implementations, the body of the contact member 1241 extends between a first and second end. In the example shown in FIG. 42, one of the bases 1242 is located at the first end and the third contact section 1246 is located at the second end. The contact member 1241 also extends between a top and a bottom. In some implementations, the contact surfaces of the first and third contact sections 1243, 1246 face the top of the contact member 1241 and the contact surface of the second contact section 1245 faces the bottom of the contact member 1241. In the example shown, the first and third contact sections 1243, 1246 extend at least partially towards the top of the contact member 1241 and the second contact section 1245 extends towards the bottom of the contact member 1241. As used herein, the terms "top" and "bottom" are not meant to imply a proper orientation of the contact member 1241 or that the top of the contact member 1241 must be located above the bottom of the connector 1241. Rather, the terms are used for ease in understanding and are assigned relative to the viewing plane of FIGS. 34 and 35.

The contact member 1241 defines a body having a circumferential edge 1248 (FIG. 36) extending between planar major sides 1249 (FIG. 35). Portions of the planar surfaces 1249 of the contact member 1241 may increase and/or decrease in width. For example, in certain implementations, each of the contact surfaces of the contact sections 1243, 1245, 1246 are rounded or otherwise contoured. For example, in FIG. 34, the first and third contact sections 1243, 1246 define bulbous tips and the second contact section 1245 defines an arced section extending from a linear section of the contact member 1241.

In certain implementations, the edge 1248 defines the contact surface of each contact section 1243, 1245, 1246, 1247 (see FIG. 36). In some implementations, the edge 1248 has a substantially continuous thickness T (FIG. 36). In various implementations, the thickness T ranges from about 0.05 inches to about 0.005 inches. In certain implementations, the thickness T is less than about 0.02 inches. In some implementation, the thickness T is less than about 0.012 inches. In another implementation, the thickness T is about 0.01 inches. In another implementation, the thickness T is about 0.009 inches. In another implementation, the thickness T is about 0.008 inches. In another implementation, the thickness T is about 0.007 inches. In another implementation, the thickness T is about 0.006 inches. In other implementations, the thickness T may vary across the body of the contact member 1241.

In one implementation, the contact member 1241 is formed monolithically (e.g., from a continuous sheet of metal or other material). For example, in some implementations, the contact member 1241 may be manufactured by cutting a planar sheet of metal or other material. In other implementations, the contact member 1241 may be manufactured by etching a planar sheet of metal or other material. In other implementations, the contact member 1241 may be manufactured by laser trimming a planar sheet of metal or other material. In still other implementations, the contact member 1241 may be manufactured by stamping a planar sheet of metal or other material. In still other implementations, the contact member 1241 may be formed from wire or coil stock.

The contact member 1241 shown and described herein is formed from a single piece. In other implementations, however, two or more separate pieces may operate together to perform the functions of the contact member 1241. For example, a first piece may form the first moveable contact section 1243 and a second piece may from the third moveable contact section 1246. Either of the pieces may form the second moveable contact section 1245. Insertion of a connector 1110 into a respective port of the adapter housing 1210 may push one of the pieces into electrical contact with the other of the pieces to electrically connect the first and second contact sections 1243, 1246.

In accordance with some aspects, the media reading interfaces 1240 of the coupler assembly 1200 are configured to detect when a connector arrangement 1100 is plugged into a port of the adapter housing 1210. For example, the contact members 1241 of a media reading interface 1240 can function as presence detection sensors or trigger switches. In some implementations, the contact members 1241 of a media reading interface 1240 are configured to form a complete circuit with the circuit board 1250 only when a connector 1110 is inserted within a respective passage 1215.

For example, at least a portion of each contact member 1241 may be configured to contact the circuit board 1250 only after being pushed toward the circuit board 1250 by a connector 1110. In other example implementations, portions of the contact members 1241 can be configured to complete a circuit until the connector 1110 pushes the contact member portions away from the circuit board 1250 or from a shorting rod. In accordance with other aspects, however, some implementations of the contact members 1241 may be configured to form a complete circuit with the circuit board 1250 regardless of whether a connector 1110 is received in a passage 1215.

Figure 37:
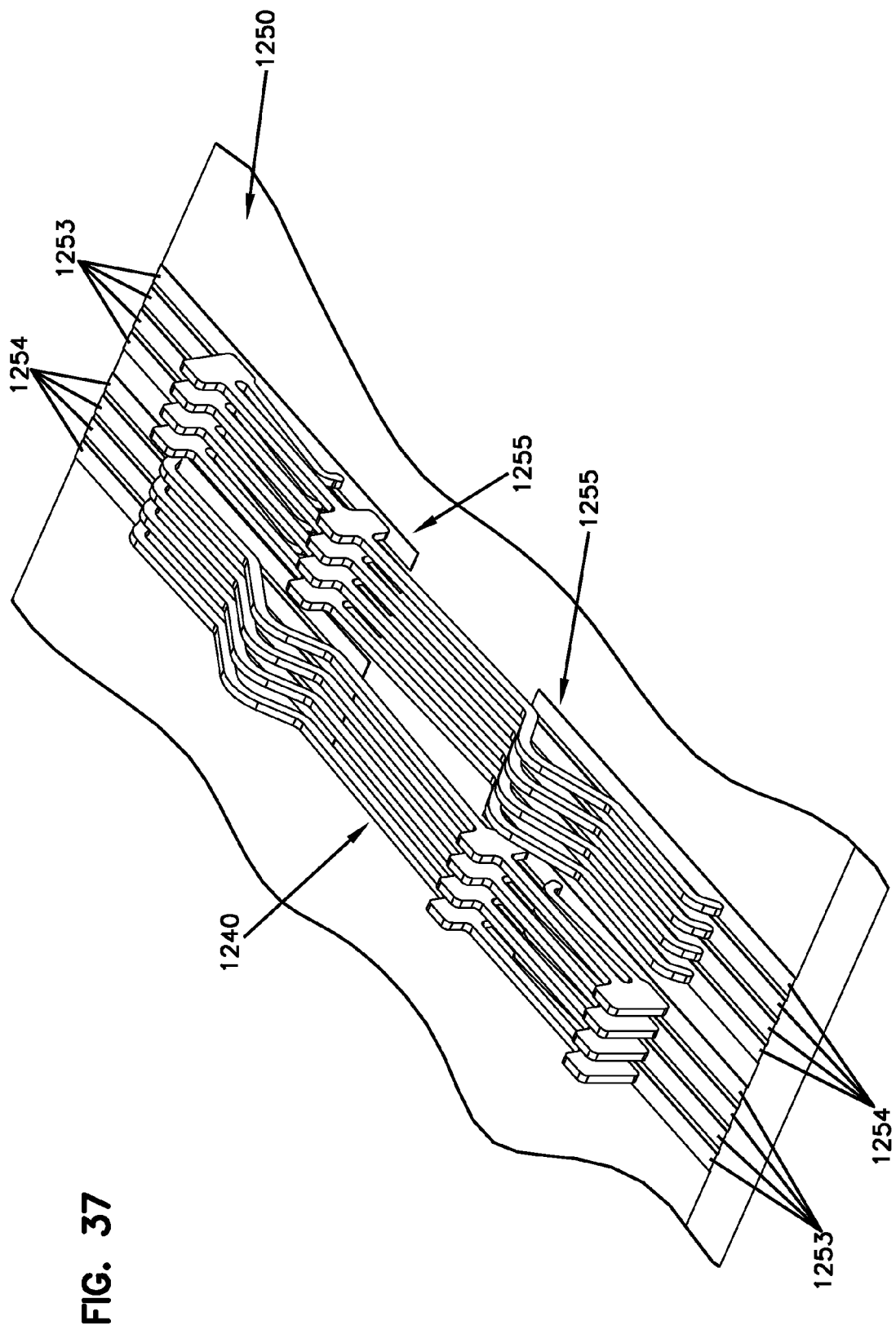

FIGS. 37-39 show portions of one example implementation of a circuit board 1250. The same or similar circuit boards 1250 are suitable for use in any of the coupler assemblies described herein. The example circuit board 1250 includes a plurality of first contact pads 1253 and a plurality of second contact pads 1254 spaced from the first contact pads 1253. In certain implementations, each of the first contact pads 1253 is longitudinally aligned with one of the second contact pads 1254 to form a landing pair 1255. In other implementations, however, the first and second contact pads 1253, 1254 may be longitudinally offset from each other.

In certain implementations, the first contact pads 1253 are laterally aligned with each other and the second contact pads 1254 are laterally aligned with each other. In other implementations, however, the first contact pads 1253 may be laterally offset or staggered from each other and/or the second contact pads 1254 may be laterally offset of staggered from each other.

Each contact member 1241 of a media reading interface 1240 extends across one landing pair 1255. In the example shown, the first moveable contact surface 1243 of each contact member 1241 touches one of the first contact pads 1253. In certain implementations, the stationary contacts 1257 also touch the first contact pads 1253. The third moveable contact surface 1246 of each contact member 1241 is configured to selectively touch the second contact pad 1254 that forms a landing pair 1255 with the first contact pad 1253. Touching the third contact surface 1246 of a contact member 1241 to the second contact pad 1254 completes a circuit between the first and second contact pads 1253, 1254.

FIGS. 40-45 illustrate the effect of inserting a fiber optic connector 1110 into a port of an adapter housing 1210 including a first media reading interface 1240 positioned at the port. The adapter housing 1210 includes a cover element that extends along a circuit board 1250 coupled to the adapter housing 1210. The first media reading interface 1240 includes at least a first contact member 1241 positioned in a slot 1225 of the cover element 1220. Portions of the first contact member 1241 extend towards the passage 1215 and portions of the first contact member 1241 extend towards the circuit board 1250.

Figure 40:
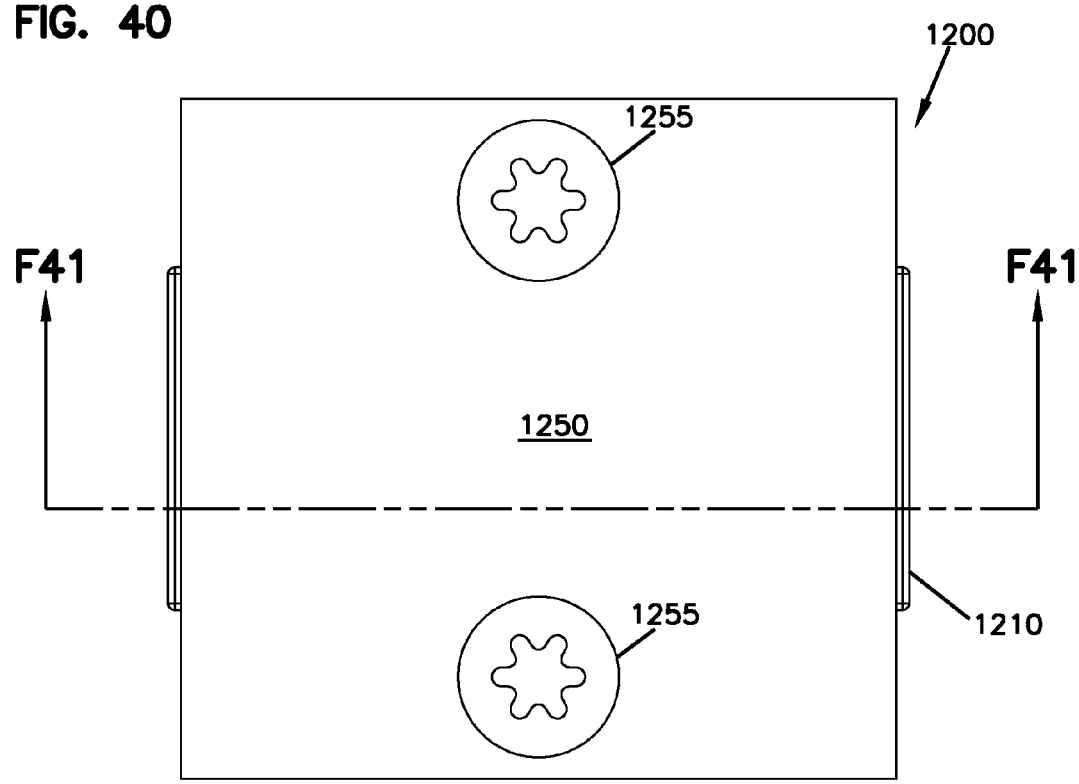
Figure 41:
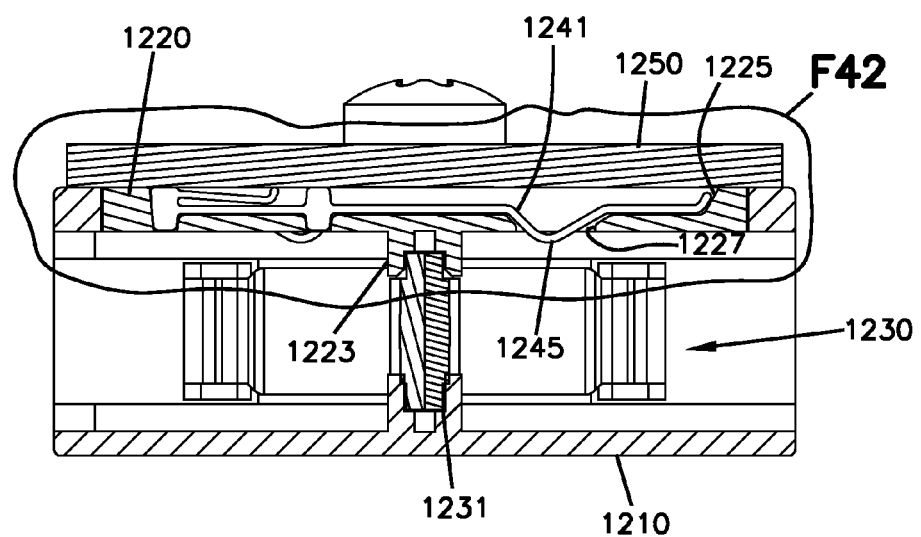
Figure 42:
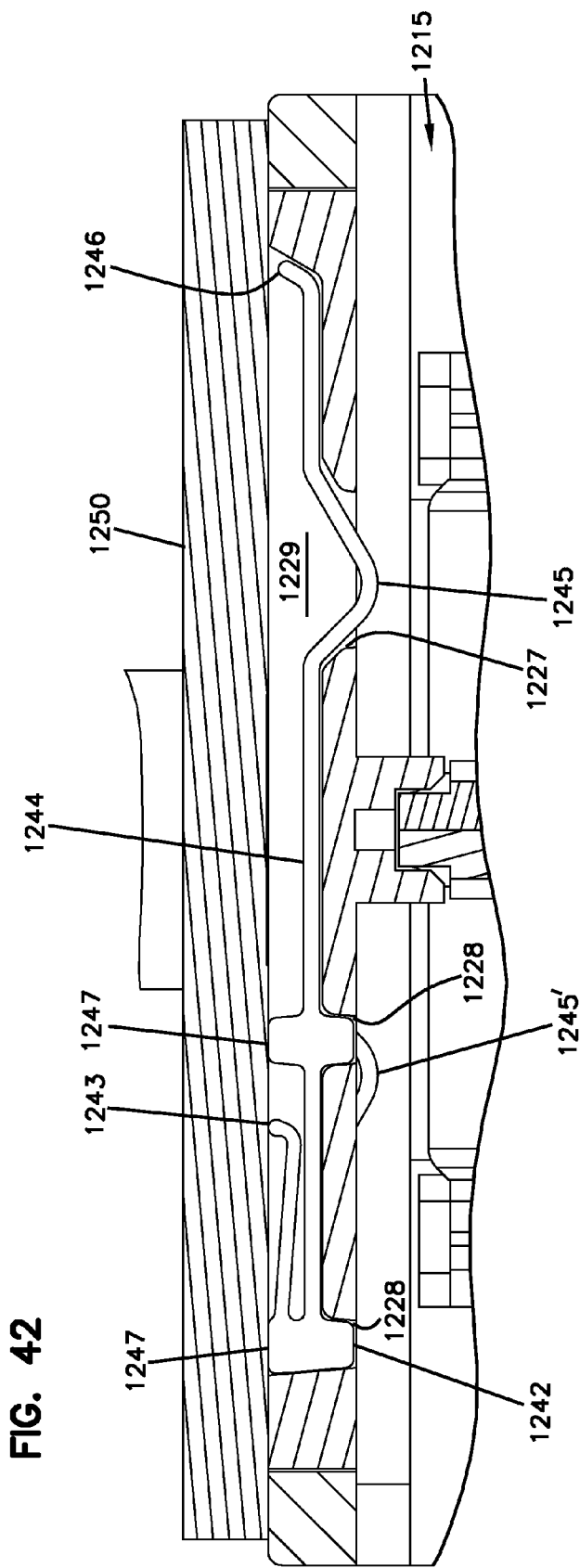

In FIGS. 40-42, no connectors 1110 are coupled to the adapter housing 1210. The contact members 1241 of each media reading interface 1240 are positioned in the slots 1225 of the cover element 1220. The bases 1242 of the contact members 1241 secure the contact members 1241 to the slots 1225 (e.g., by snapping into holes 1228). The first moveable contact surface 1243 extends through the cover element 1220 and engages one of the first contact pads 1253 of the circuit board 1250. The stationary contacts 1247 also extend through the cover element 1220 and engage the first contact pad 1253 of the circuit board 1250. The second moveable contact surface 1245 extends through the opening 1228 in the cover element 1220 and into the passage 1215 of the adapter housing 1210. The third moveable contact surface 1246 is spaced from the second contact pad 1254 of the circuit board 1250. For example, the third moveable contact surface 1246 may rest against a ledge defined in the slot 1225.

In some implementations, each media reading interface 1240 includes at least three contact members 1241. Each contact member 1241 is positioned in a separate slot 1225 of the cover element 1220. Adjacent slots 1225 are separated by intermediate walls 1229. In certain implementations, each media reading interface 1240 includes four contact members 1241. In other implementations, however, each media reading interface 1240 may include greater or fewer contact members 1241. In the cross-sections shown in FIGS. 42 and 45, only the first contact members 1241 of each media reading interface 1240 is visible. An intermediate wall 1229 blocks the other contact members 1241 of the first media reading interface 1240 from view. In addition, even portions of the other contact members 1241 that extend past the intermediate walls 1229 cannot be seen in FIGS. 42 and 45 since the other contact members 1241 laterally align with the first contact member 1241.

In some implementations, a second media reading interface also is positioned in the cover element 1220. In the example shown in FIGS. 40-45, the second media reading interface extends along a majority of the length of the first media reading interface 1240. However, contact members of the second media reading interface are oriented 180° relative to the contact members 1241 of the first media reading interface 1240. Accordingly, in FIG. 42, the second contact surface 1245' of a first contact member of the second media reading interface is visible extending into the passageway 1215 of the adapter housing 1210. The second contact surfaces of other contact members of the second media reading interface are hidden from view behind the second contact surface of the first contact member of the second media reading interface.

Figure 45:
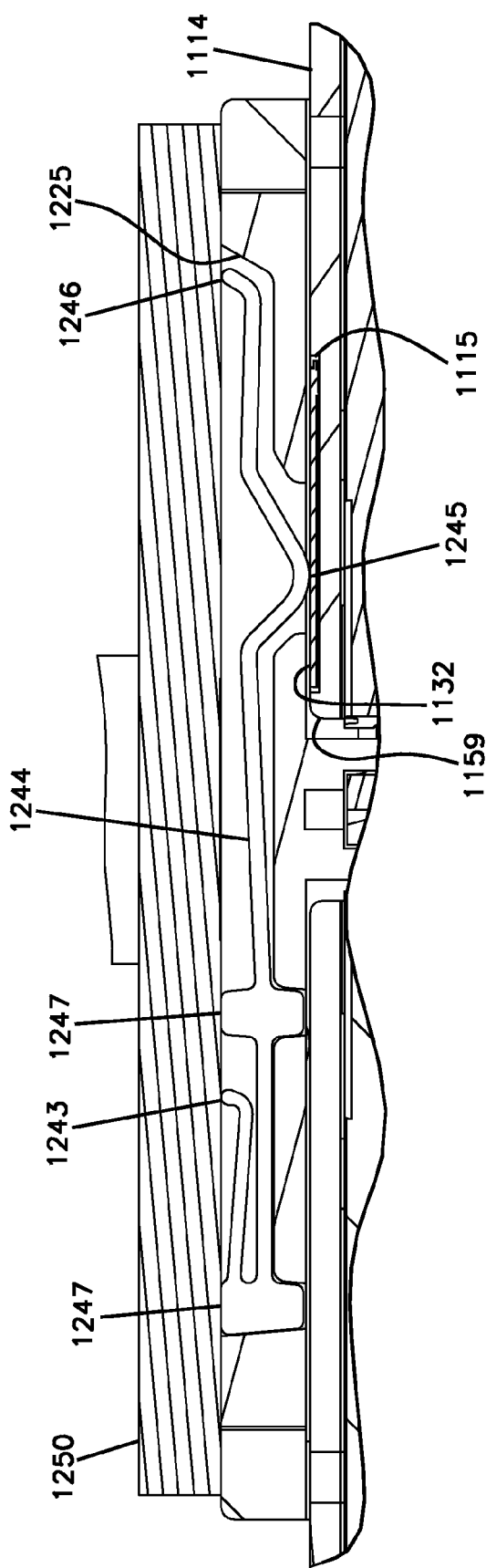

As shown in FIGS. 43-45, inserting a connector 1110 into an adapter passage 1215 causes the deflection surface 1159 of a connector 1110 to slide within the passage 1215 towards the second moveable contact surface 1245. Continuing to insert the connector 1110 causes the deflection surface 1159 to engage and push the second moveable contact surface 1245 out of the passage 1215. Pushing the second moveable contact surface 1245 out of the passage 1215 pushes the third moveable contact surface 1246 away from the ledge toward the circuit board 1250. In certain implementations, pushing the third moveable contact surface 1246 away from the ledge causes the third contact surface 1246 to engage (e.g., touch or wipe across) the second contact pad 1254 of the circuit board 1250. Accordingly, the presence of the connector 1110 in the passage 1215 may be detected when the deflection surface 1159 of the connector 1110 engages the contact member 1241.

In some implementations, the connector 1110 does not include a storage device 1130. For example, the connector 1110 may be an existing connector that does not store physical layer information. In other implementations, the connector 1110 may be part of a duplex connector arrangement in which the other connector 1110 holds the storage device 1130. In other implementations, however, the connector 1110 may include a storage device 1130. In such implementations, the second contact surface 1245 of the contact member 1241 slides or wipes across the surface of the contacts 1132 of the storage device 1130 during insertion of the connector 1110 (see FIGS. 44-45).

In some implementations, the storage device 1130 is spaced from the deflection edge 1159 of the connector 1110. When the connector 1110 is inserted into the passage 1215, the deflection edge 1159 engages and pushes the second moveable contact surface 1245 against the circuit board 1250 before the second moveable contact surface 1245 engages the contacts 1132 of the connector storage device 1130. Accordingly, the presence of the connector 1110 within the passage 1215 may be detected before the memory 1133 of the storage device 1130 can be accessed.

In other implementations, at least a portion of the storage device 1130 is accessible through a recess in the deflection surface 1159. In such implementations, the second contact surface 1245 of at least one the contact member 1241 touches the storage device contacts 1132 as the third moveable contact surface 1246 is being deflected against the circuit board 1250. Accordingly, the presence of the connector 1110 within the passage 1215 may be detected at approximately the same time that the memory 1133 of the connector storage device 1130 can be accessed.

As discussed above, a processor (e.g., processor 217 of FIG. 2) or other such equipment also can be electrically coupled to the printed circuit board 1250. Accordingly, the processor can communicate with the memory circuitry 1133 on the connector storage device 1130 via the contact members 1241 and the printed circuit board 1250. In accordance with some aspects, the processor is configured to obtain physical layer information from the connector storage device 1130. In accordance with other aspects, the processor is configured to write (e.g., new or revised) physical layer information to the connector storage device 1130. In accordance with other aspects, the processor is configured to delete physical layer information from the connector storage device 1130. In still other implementations, the processor detects the presence or absence of a connector 1110 in each passage 1215.

Removing the connector 1110 from the passage 1215 releases the second moveable contact portion 1245 of the contact member 1241, thereby allowing the third moveable contact portion 1246 to move back to the initial position (see FIG. 42). Dropping the third moveable contact portion 1246 disengages the third contact surface 1246 from the circuit board 1250, thereby interrupting the circuit created by the contact member 1241. Interrupting the circuit enables a processor connected to the circuit board 1250 to determine that the connector 1110 has been removed from the passage 1215.

In accordance with some implementations, dust caps 2260 can be used to protect passages 1215 of the adapter housings 1210 when connector arrangements 1100 or other physical media segments are not received within the passages 1215. For example, a dust cap 2260 can be configured to fit within a front entrance or a rear entrance of each adapter passage 1215. The dust caps 2260 are configured to inhibit the ingress of dust, dirt, or other contaminants into the passage 1215. In accordance with some implementations, the dust caps 2260 are configured not to trigger the presence sensor/switch of the adapter 1210. One non-limiting example of a dust cap 2260 is shown in FIGS. 71-77 and discussed in more detail herein.

FIGS. 46-69 illustrate an example implementation of a second connector system 2000 that can be utilized on a connector assembly (e.g., a communications panel) having PLI functionality as well as PLM functionality. One example connector assembly on which the connector system 2000 can be implemented is a bladed chassis (see FIG. 70). The connector system 2000 includes at least one example communications coupler assembly 2200 that may be used with the connector arrangements 1100 described herein. Communications data signals carried by a media segment 1010 terminated by a first connector arrangement 1100 can be propagated to another media segment (e.g., terminated by a second connector arrangement 1100) through the communications coupler assembly 2200.

Figure 46:
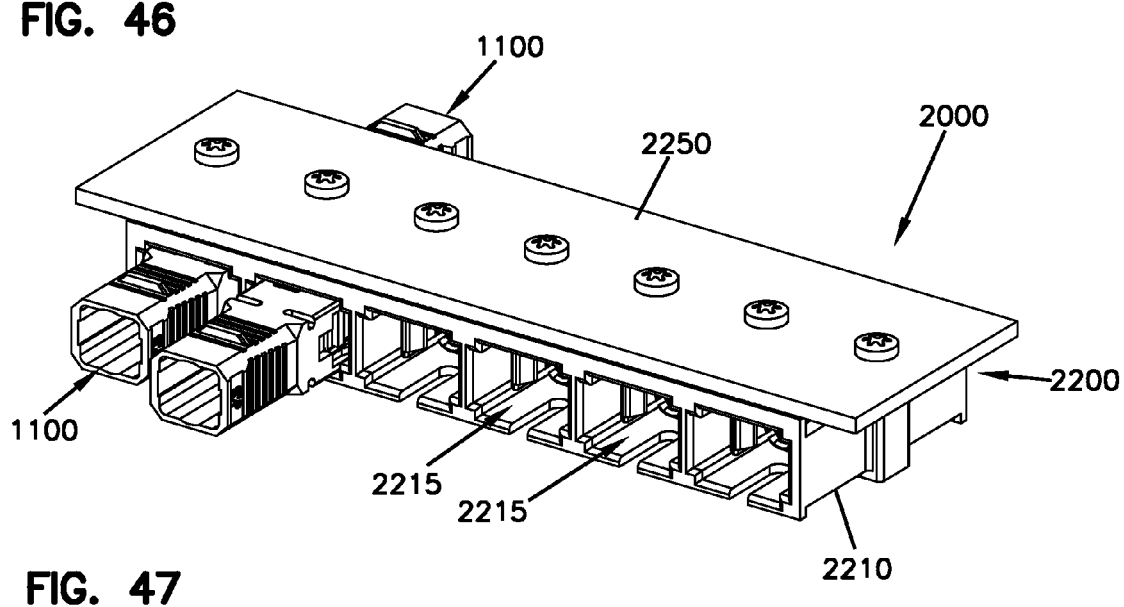
Figure 47:
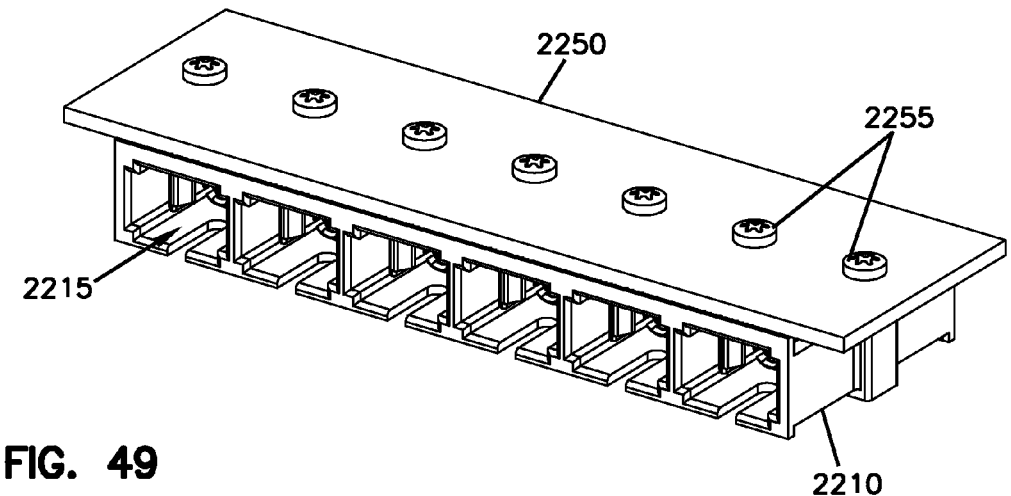
Figure 48:
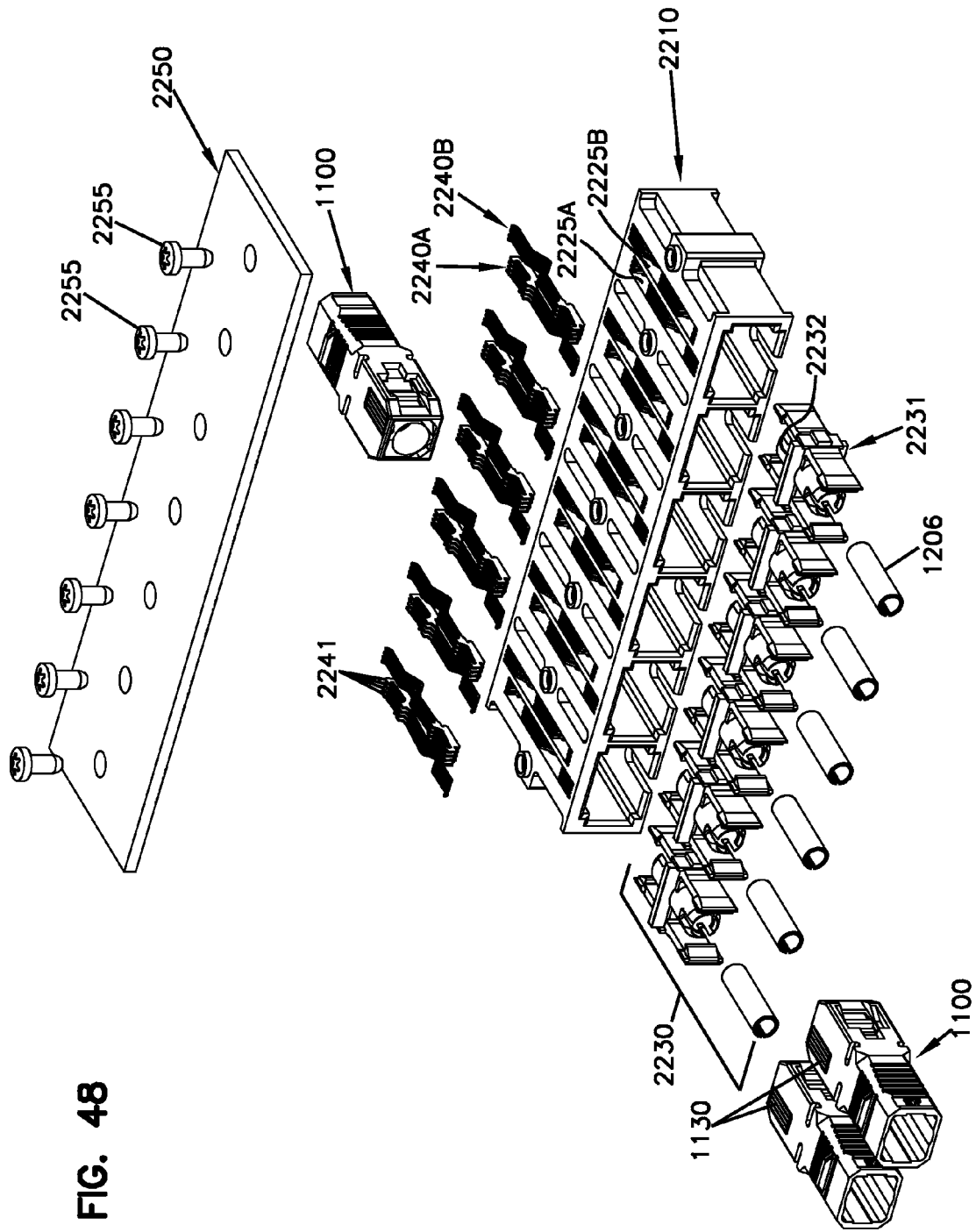

FIGS. 46-48 show one example implementation of a communications coupler assembly 2200. The example communications coupler assembly 2200 includes an adapter housing 2210 defining one or more passages 2215. In the example shown, the adapter housing 2210 defines six axial passages 2215. In other implementations, however, the adapter housing 2210 may define greater or fewer (e.g., one, two, three, four, eight, ten, twelve, sixteen) axial passages 2215. As shown in FIG. 48, a ferrule alignment arrangement 2230 is located in each axial passage 2215 of the adapter housing 2210. One example ferrule alignment arrangement 2230 includes the sleeve mount arrangement 1231 and the ferrule sleeve 1206 described above (see FIG. 48).

The ferrule alignment arrangement 2230 in each passage 2215 is configured to align and interface two fiber optic connectors 1110 (e.g., see FIG. 46). In other example implementations, however, one or more passages 2215 may enclose structure to communicatively couple together a fiber optic connector 1110 with a media converter (not shown) to convert the optical data signals into electrical data signals, wireless data signals, or other such data signals. In still other implementations, the communications coupler assembly 2200 can include an electrical termination block that is configured to receive punch-down wires, electrical plugs (e.g., for electrical jacks), or other types of electrical connectors.

The communications coupler 2200 also includes a circuit board 2250 coupled to the adapter housing 2210. For ease in understanding, only a portion of the circuit board 2250 is shown in FIGS. 46-48. It is to be understood that the circuit board 2250 electrically connects to a data processor and/or to a network interface (e.g., the processor 217 and network interface 216 of FIG. 2). It is further to be understood that multiple communications coupler housings 2210 can be connected to the circuit board 2250 within a connector assembly (e.g., a communications panel).

Figure 49:
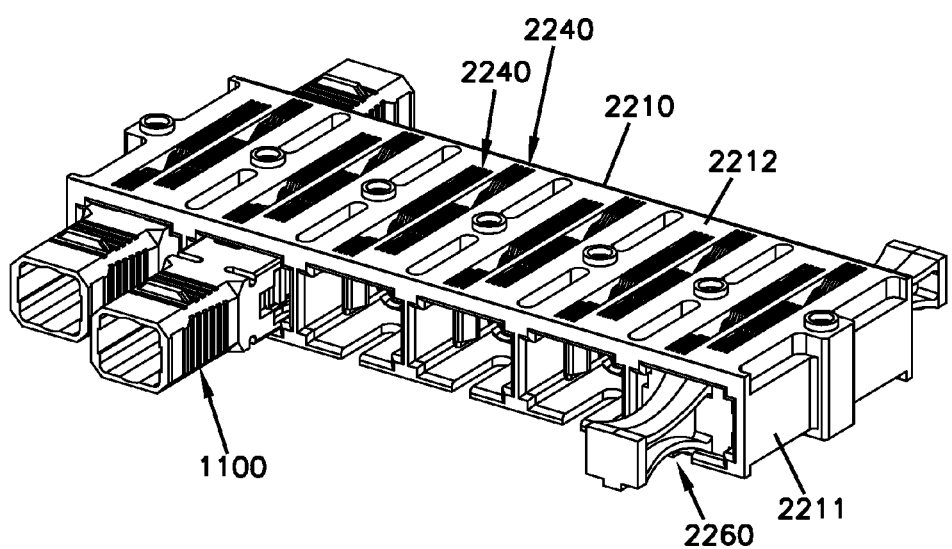

FIGS. 48 and 49 illustrate an example adapter housing 2210 defining multiple axial passages 2215. The adapter housing 2210 has opposing side walls 2211 interconnected by first and second end walls 2212. The side walls 2211 and the end walls 2212 extend between a front end and a rear end of the adapter housing 2210. The axial passages 2215 of the adapter housing 2210 extend between the front and rear ends. Each end of each axial passage 2215 defines a port that is configured to receive a connector 1110.

The coupler assembly 2200 also includes one or more media reading interfaces 2240 coupled to the adapter housing 2210 (see FIG. 48). Each media reading interface 2240 is configured to acquire the physical layer information from the storage device 1130 of a fiber optic connector 1110 plugged into the fiber optic adapter 2210. For example, each media reading interface 2240 may couple the storage device 1130 of a fiber optic connector 1110 to a processor via the circuit board 2250 as will be described in more detail herein.

In one implementation, the adapter housing 2210 holds or retains a media reading interface 2240 for each passage 2215. In another implementation, the adapter housing 2210 can hold or retain a media reading interface 2240 for each port of each passage 2215. In still other implementations, the adapter housing 2210 can include a media reading interface 2240 associated with each set of passages 2215 that accommodate a connector arrangement 1100. In other implementations, the adapter housing 2210 can include any desired combination of front and rear media reading interfaces 2240.

For example, the adapter 2210 shown in FIG. 48 includes a first media reading interface 2240A associated with the front port of the right-most passage 2215 and a second media reading interface 2240B associated with the rear port of the right-most passage 2215. In certain implementations, the orientation of the first media reading interface 2240A is flipped 180° from the orientation of the second media reading interface 2240B. In some implementations, the first media reading interface 2240A is laterally offset from the second media reading interface 2240B. For example, the first and second media reading interfaces 2240A, 2240B may be positioned side-by-side. In other implementations, the first and second media reading interfaces 2240A, 2240B may be axially aligned. In some implementations, the first and second media reading interfaces 2240A, 2240B may be laterally aligned. In other implementations, the first media reading interfaces 2240A may be axially offset towards the front of the adapter housing 2210 and the second media reading interface 2240B may be offset towards the rear of the adapter housing 2210.

In general, each media reading interface 2240 is formed from one or more contact members 2241. In some implementations, the media reading interface 2240 includes at least a first contact member 2241 that transfers power, at least a second contact member 2241 that transfers data, and at least a third contact member 2241 that provides grounding. In one implementation, the media reading interface 2240 includes a fourth contact member 2241. In other implementations, the media reading interface 2240 include greater or fewer contact members 2241.

FIGS. 50-52 show one example type of contact member 2241. Each contact member 2241 includes at least three moveable (e.g., flexible) contact sections 2243, 2245, and 2246 defining contact surfaces. The flexibility of the contact sections 2243, 2245, and 2246 provides tolerance for differences in spacing between the contact member 2241 and the printed circuit board 2250 when the coupler assembly 2200 is manufactured. Certain types of contact members 2241 also include at least one stationary contact 2247 having a contact surface. The example contact shown in FIG. 50 includes two stationary contact surfaces 2247. In the example shown, the first moveable contact section 2243 is located between the two stationary contacts 2247.

Certain types of contact members 2241 also include a resilient section 2244. The resilient section 2244 is configured to enable any force applied to the second moveable contact section 2245 to be applied to the third moveable contact surface 2246. In some implementations, the resilient section 2244 defines a thin, linear section of the contact 2241. In other implementations, the resilient section 2244 may define a series of curves, folds, and/or bends. For example, in one implementation, the resilient section may define a partial arc.

In some implementations, the contact member 2241 is configured to be secured to the adapter housing 2210. For example, the example contact member 2241 includes one or more bases 2242 that are configured to seat in one or more openings defined in a wall of the adapter housing 2210 as will be described in more detail here. In some implementations, the bases 2242 define contours, hooks, or other attachment features that aid in retaining the contact member 2241 to the adapter housing 2210 (e.g., in a press-fit manner).

In some implementations, the body of the contact member 2241 extends between a first and second end. In certain implementations, the base 2242 is located at the first end and the third contact section 2246 is located at the second end. In the example shown in FIG. 51, one of the stationary contacts 2247 is located at the first end. The contact member 2241 also extends between a top and a bottom. In some implementations, the contact surfaces of the first and third contact sections 2243, 2246 face the top of the contact member 2241 and the contact surface of the second contact section 2245 faces the bottom of the contact member 2241. In the example shown, the first and third contact sections 2243, 2246 extend at least partially towards the top of the contact member 2241 and the second contact section 2245 extends towards the bottom of the contact member 2241. As used herein, the terms "top" and "bottom" are not meant to imply a proper orientation of the contact member 2241 or that the top of the contact member 2241 must be located above the bottom of the connector 2241. Rather, the terms are used for ease in understanding and are assigned relative to the viewing plane of FIG. 51.

The contact member 2241 defines a body having a circumferential edge 2248 extending between planar major sides 2249 (FIG. 50). Portions of the planar surfaces 2249 of the contact member 2241 may increase and/or decrease in width. For example, in certain implementations, each of the contact surfaces of the contact sections 2243, 2245, 2246 are rounded or otherwise contoured. For example, in FIG. 50, the first and third contact sections 2243, 2246 define bulbous tips. Also, the base in FIG. 51 is significantly wider than the resilient section 2244.

In certain implementations, the edge 2248 defines the contact surface of each contact section 2243, 2245, 2246, 2247 (see FIG. 50). In some implementations, the edge 2248 has a substantially continuous thickness T2 (FIG. 52). In various implementations, the thickness T2 ranges from about 0.05 inches to about 0.005 inches. In certain implementations, the thickness T2 is less than about 0.02 inches. In some implementation, the thickness T2 is less than about 0.012 inches. In another implementation, the thickness T2 is about 0.01 inches. In another implementation, the thickness T2 is about 0.009 inches. In another implementation, the thickness T2 is about 0.008 inches. In another implementation, the thickness T2 is about 0.007 inches. In another implementation, the thickness T2 is about 0.006 inches. In other implementations, the thickness T2 may vary across the body of the contact member 2241.

In one implementation, the contact member 2241 is formed monolithically (e.g., from a continuous sheet of metal or other material). For example, in some implementations, the contact member 2241 may be manufactured by cutting a planar sheet of metal or other material. In other implementations, the contact member 2241 may be manufactured by etching a planar sheet of metal or other material. In other implementations, the contact member 2241 may be manufactured by laser trimming a planar sheet of metal or other material. In still other implementations, the contact member 2241 may be manufactured by stamping a planar sheet of metal or other material. In still other implementations, the contact member 2241 may be formed from wire or coil stock.

The contact member 2241 shown and described herein is formed from a single piece. In other implementations, however, two or more separate pieces may operate together to perform the functions of the contact member 2241. For example, a first piece may form the first moveable contact section 2243 and a second piece may from the third moveable contact section 2246. Either of the pieces may form the second moveable contact section 2245. In certain implementations, insertion of a connector 1110 into a respective port of the adapter housing 2210 may push one of the pieces into electrical contact with the other of the pieces to electrically connect the first and second contact sections 2243, 2246.

FIGS. 53-60 illustrate one example adapter housing 2210 defining multiple passages 2215. In some implementations, one or more of the end walls 2212 of the adapter housing 2210 define openings through which the ferrule alignment arrangements 2230 are inserted into the passageways 2215. In some such implementations, the adapter housing 2210 may include one or more cover elements closing the openings defined in the adapter housing 2210. The cover elements may be secured to the end wall 2212 (e.g., via adhesive, welding, latching, or snap-fit connection).

In other implementations, the ferrule alignment arrangements 2230 are inserted into the passageways 2215 through the ports. In some such implementations, the adapter housing 2210 may be monolithically formed. For example, certain types of adapter housings 2210 may be formed via injection-molding. The adapter housing 2210 may include one or more latching arrangements provided in the passageways 2215 to receive and secure the ferrule alignment arrangements 2230. In one implementation, one example latching arrangement may include a latching hook 2236 and at least one stop 2237. In the example shown in FIGS. 56 and 60, each latching arrangement includes a central latching hook 2236 positioned between two stops 2237. A recess 2238 (FIG. 59) is provided between the latching hook 2236 and the stops 2237. A latching nose 2232 of each ferrule alignment arrangements 2230 is configured to snap over the latching hook 2236 and into the recess 2238 when the ferrule alignment arrangements 2230 is slid into a respective passageway 2215 (see FIGS. 65-66). In some implementations, a latching arrangement may be provided at both the top and bottom of each passageway 2215.

Additional details regarding one example latching arrangement for use in securing a ferrule alignment arrangement within an adapter housing through one of the ports can be found in U.S. Pat. No. 7,377,697, the disclosure of which is incorporated by reference above.

Figure 53:
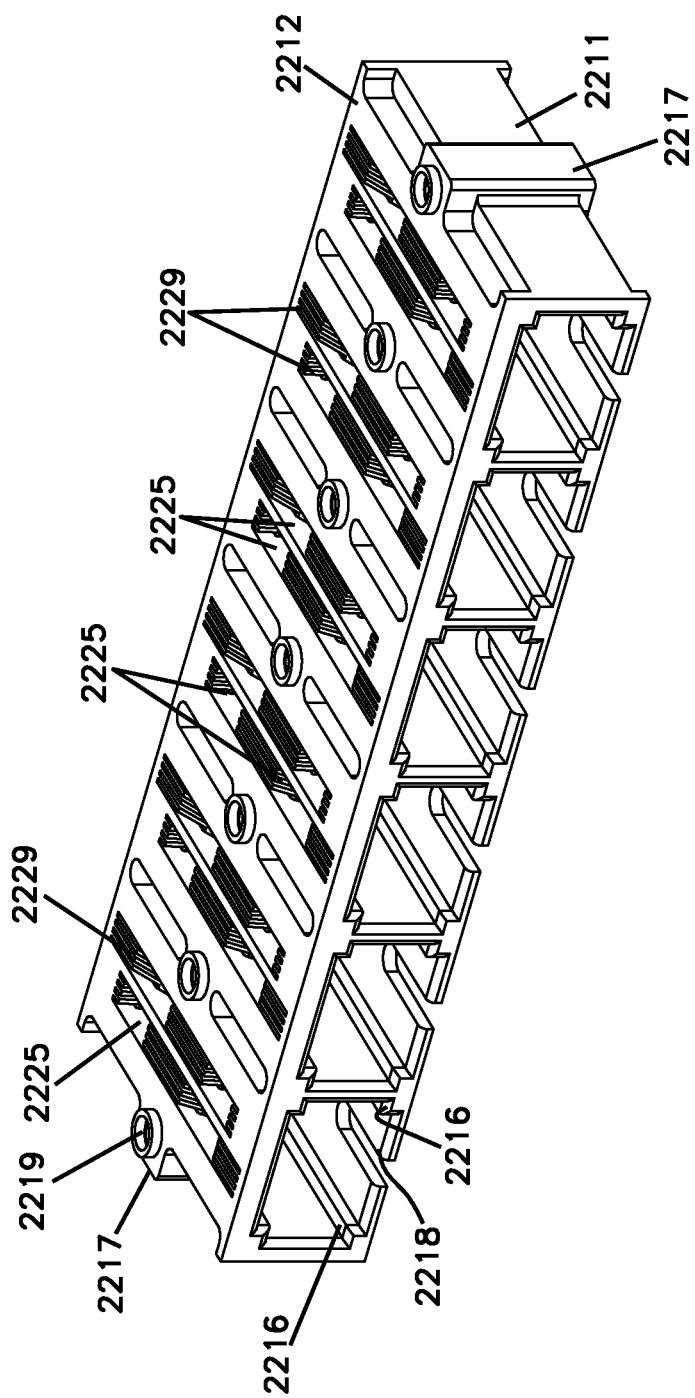
Figure 54:
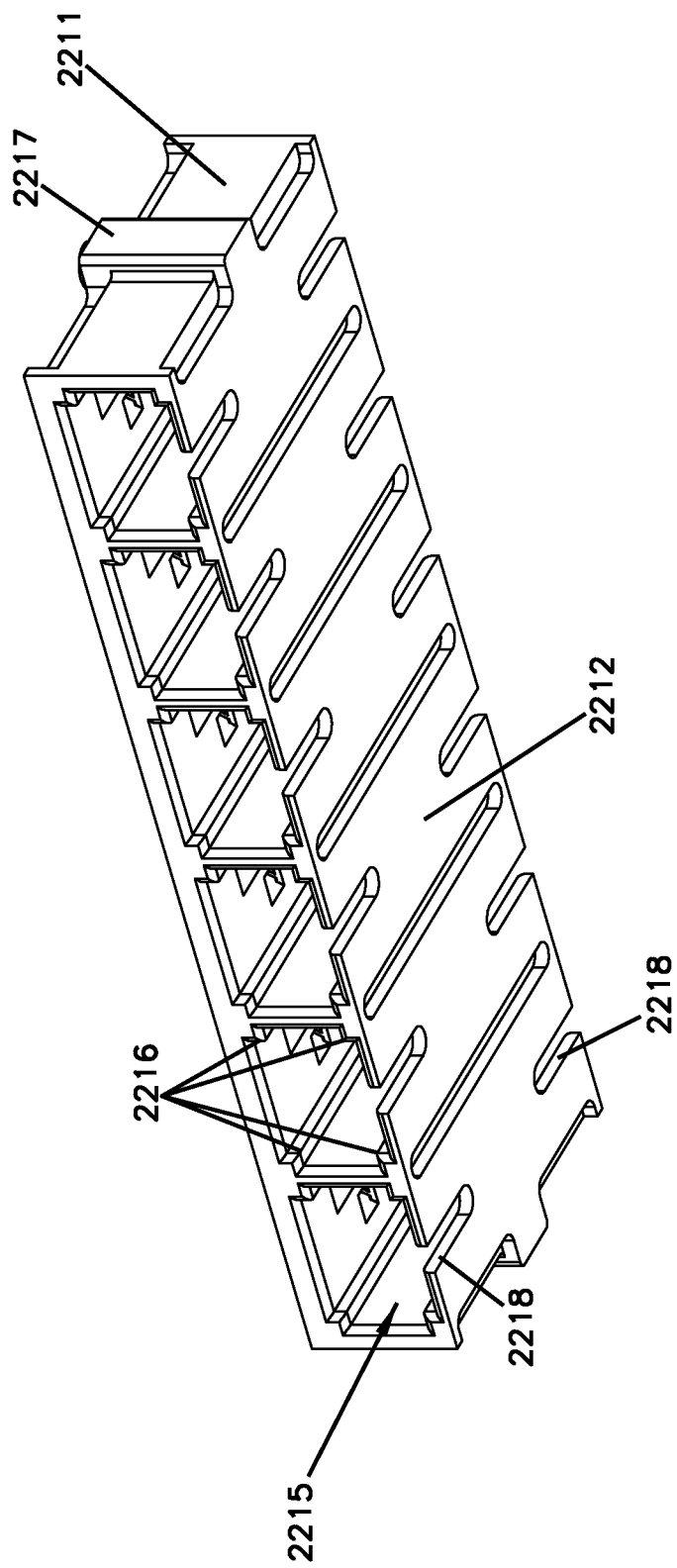

One or more guides 2216 may be formed in the passages 2215 of adapter housing 2210 (FIG. 53). The guides 2216 extend longitudinally along the interior corners of the axial passage 2215. The guides 2216 cooperate with the outer surface of a fiber optic connector housing 1114 to receive the connector 1110 within the axial passage 2215. In certain embodiments, the guides 2216 may define ramped entry surfaces to facilitate insertion of the connector housing 1114 within the adapter passage 2215. One of the end walls 2212 of the adapter housing 2210 defines at least one keyway 2218 for each passage 2215 sized and shaped to receive a corresponding key 1118 of the SC-type fiber optic connector 1110 (see FIG. 5). In certain implementations, a keyway 2218 is defined in the end wall 2212 at both ports of an axial passage 2215 (see FIG. 55).

One or more fastener openings 2219 extend through the adapter housing 2210 between the first and second end walls 2212. In certain implementations, an annular wall may be provided at one end of each fastener opening 2219 to demarcate the fastener openings 2219 (see FIG. 53). In some implementations, fasteners (e.g., screws, snaps, nails, bolts, rivets, etc.) may be inserted into the fastener openings 2219 to secure the adapter housing 2210 to a surface. In other implementations, fasteners 2255 may be inserted into the fastener openings 2219 to secure a circuit board 2250 or other structure to the adapter housing 2210. In certain implementations, the circuit board fasteners 2255 may extend completely through the adapter housing 2210 to secure the circuit board 2250 to one end of the adapter housing 2210 and to secure the other end of the adapter housing 2210 to another surface.

In some implementations, flanges 2217 extend outwardly from the side walls 2211 of the adapter housing 2210. The flanges 2217 may aid in supporting the adapter housing 2210 on or against a planar surface, such as that of a bulkhead. In some implementations, one or both side walls 2211 of the adapter housing 2210 also include a flexible cantilever arm defining outwardly protruding tabs that are configured to cooperate with the flanges 2217 to capture the adapter housing 2210 against a bulkhead. In other implementations, the side walls 2211 of the adapter housing 2210 define solid surfaces. In still other implementations, recesses may be provided in the side walls 2211 to permit the use of alternative fasteners, such as a flexible clip, to secure the adapter housing 2210 to a surface or module.

The adapter housing 2210 defines one or more openings or slots 2225 that lead to the axial passages 2215. Each slot 2225 is configured to receive one or more contact members 2241 of a media reading interface 2240. In some implementations, the first end wall 2212 is sufficiently thick to enable the media reading interfaces 2240 to be substantially positioned in the end wall 2212. For example, in some implementations, a material height of the first end wall 2212 is at least 0.76 mm (0.03 inches). Indeed, in some implementations, the material height of the first end wall 2212 is at least 1.02 mm (0.04 inches). In certain implementations, the material height of the first end wall 2212 is at least 1.27 mm (0.05 inches).

In some implementations, a height H2 (FIG. 56) of the adapter housing 2210 is at least 9.4 mm. In certain implementations, the height H2 of the adapter housing 2210 is at least 10 mm. Indeed, in certain implementations, the height H2 is at least 10.2 mm. In one example implementation, the height H2 is about 10.3 mm. In one example implementation, the height H2 is about 10.4 mm. In one example implementation, the height H2 is about 10.5 mm. In one example implementation, the height H2 is about 10.6 mm. In one example implementation, the height H2 is about 10.7 mm.

The slots 2225 position the contact members 2241 in alignment with the contact pads 1132 of a connector storage device 1130 mounted to a connector 1110 received at the adapter housing 2210. In certain implementations, at least a portion of each contact member 2241 extends into a respective channel 2215 to engage the electrical contacts 1132 of the storage member 1130 of any connector 1100 positioned in the passage 2215. Other portions of the contact members 2241 are configured to protrude outwardly through the slots 2225 to engage contacts and tracings on a printed circuit board 2250 as will be described in more detail herein.

In some implementations, the first end wall 2212 may define a first slot 2225A sized to receive the first media reading interface 2240A and a second slot 2225B sized to receive the second media reading interface 2240B. The first slot 2225A is laterally offset from the second slot 2225B (see FIG. 57). However, the slots 2225A, 2225B are sufficiently narrow that both slots 2225A, 2225B lead to the same axial passage 2215. In the example shown in FIG. 57, the first slot 2225A is axially offset towards the front of the adapter housing 2210 relative to the second slot 2225B. In other implementations, however, the slots 2225A, 2225B may be aligned.

Figure 57:
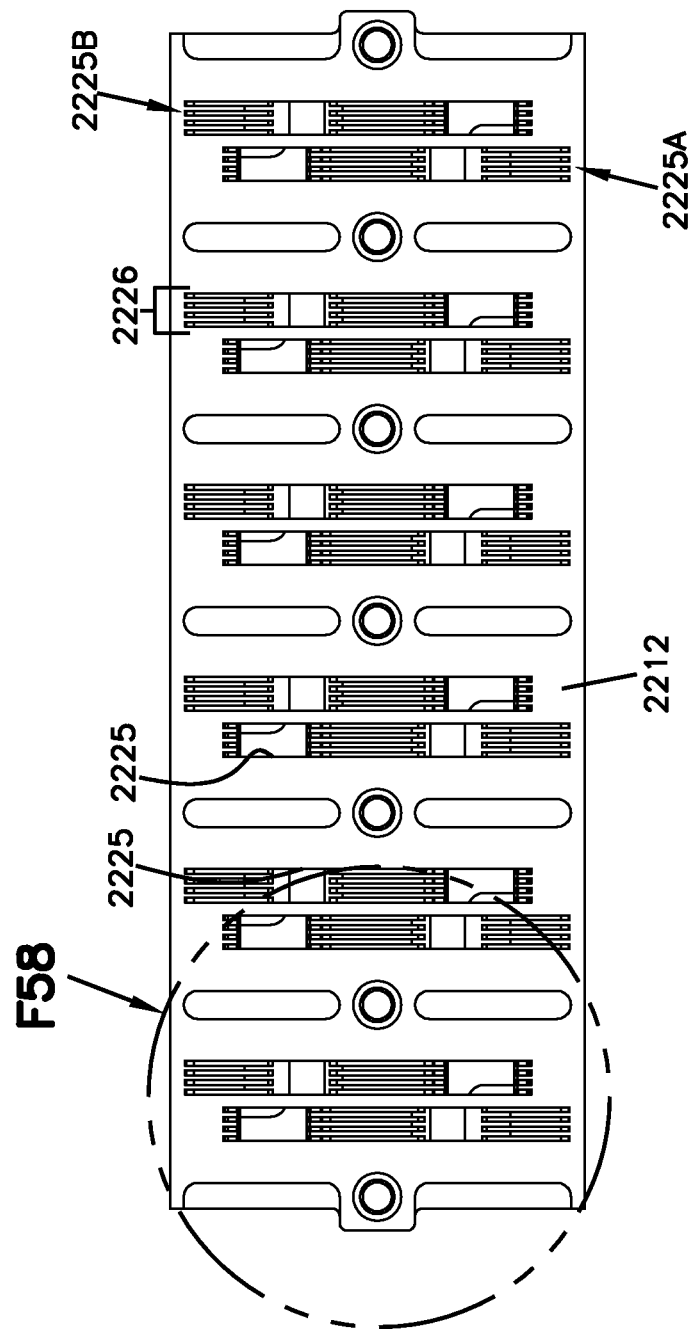
Figure 58:
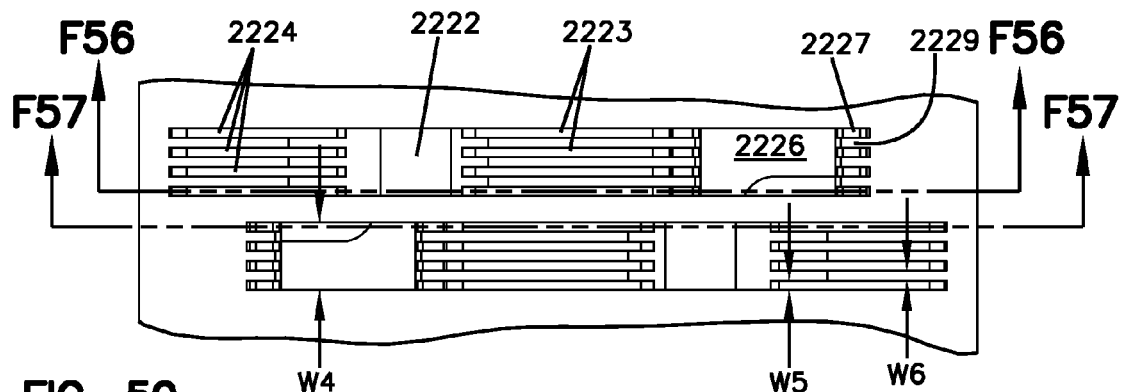

As shown in FIGS. 57 and 58, the slots 2225 extend at least part-way across the axial passages 2215 of the adapter housing 2210. In the example shown, each slot 2225 extends across a majority of the length of the passage 2215. Such a length enables each contact member 2241 to have a beam length that is a majority of the length of the passage 2215. The longer the beam length of the contact member 2241, the more the contact members 2241 can flex. In other implementations, each slot 2225 may extend a greater or lesser distance across the passage 2215.

In some implementations, each contact member 2241 is retained within a separate slot 2225 of the adapter housing 2210. For example, each media reading interface 2240 may includes four contact members 2241 that are held in a set of four slots 2225. In other implementations, two or more of the contact members 2241 are retained within the same slot 2225. For example, each contact member 2241 of a media reading interface 2240 may be retained in a single slot 2225 (see FIG. 49). In still other implementations, the contact members 2241 of two or more media reading interfaces 2240 may be retained within the same slot 2225.

In some implementations, the contacts 2241 of each media reading interface 2240 are aligned with each other. In other implementations, however, the contact members 2241 of a single media reading interface 2240 are positioned in a staggered configuration. In some such implementations, the slots 2225 accommodating the staggered contact members 2241 also are staggered (e.g., in a front to rear direction). In other such implementations, the slots 2225 of the adapter housing 2210 have a common length that is sufficiently long to accommodate the staggered contact members 2241.

Figure 59:
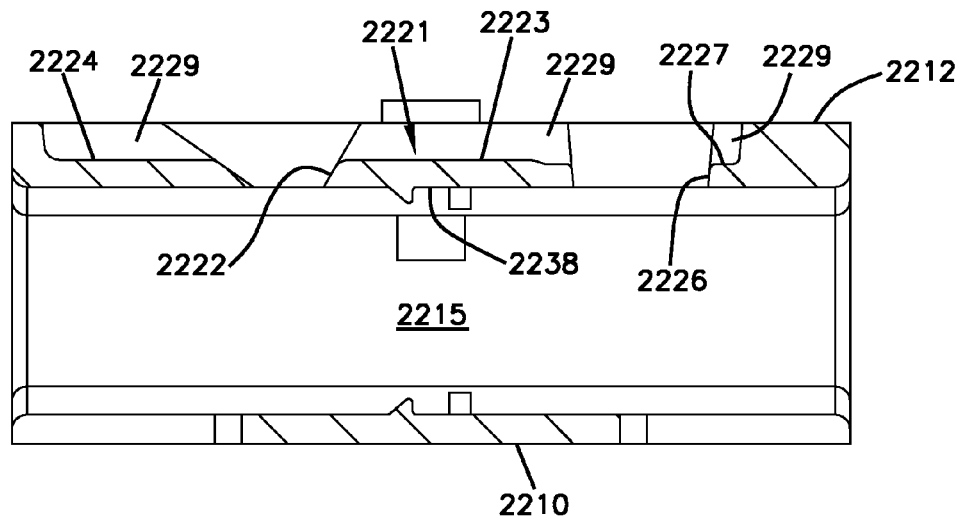
Figure 60:
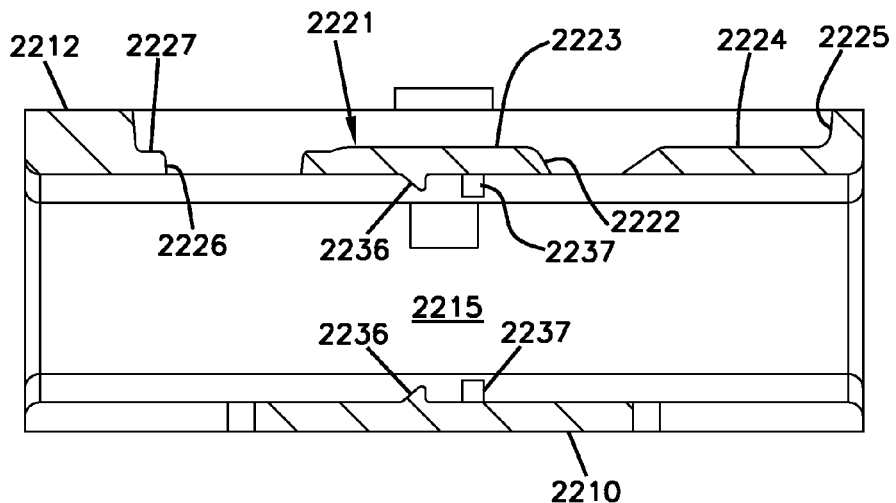

In some implementations, the entirety of each slot 2225 extends through the first end wall 2212 from top to bottom. In other implementations, however, only portions of the slot 2225 extend from the top to the bottom of the first end wall 2212. For example, an intermediate portion of each slot 2225 can extend through the exterior surface of the first end wall 2212 to a recessed surface 2221 (FIGS. 59 and 60). The recessed surface 2221 is configured to support at least a portion of at least one contact member 2241 of at least one media reading interface 2240.

At least a first opening 2222 is defined in the recessed surface 2221 to provide access to an axial passage 2215 of the adapter housing 2210. The first opening 2222 separates the recessed surface 2221 into a support surface 2223 and a ledge 2224. In certain implementations, a second opening 2226 is defined in the recessed surface 2221 to provide access to the axial passage 2215. The second opening 2226 separates the recessed surface 2221 into the support surface 2223 and a second ledge 2227.

One or more contact members 2241 may be provided in the slot 2225. The first opening 2222 is configured to provide the second moveable contact section 2245 of each contact member 2241 with access to the respective axial passage 2215 when the contact member 2241 is positioned in the slot 2225. The second opening 2226 is configured to receive the base 2242 of the contact member 2241 to aid in securing the contact member 2241 within the slot 2225. The resilient section 2244 of each contact member 2241 extends over the support surface 2223 and the third contact surface 2246 of each contact member 2241 extends over a respective ledge 2224 (see FIG. 66).

In some implementations, the first end wall 2212 of the adapter 2210 defines intermediate walls 2229 that extend between pairs of adjacent contact members 2241. The intermediate walls 2229 inhibit contact between adjacent contact members 2241. For example, the intermediate wall sections 2229 may inhibit contact between adjacent contact members 2241 during insertion and removal of a connector 1110 at a respective passage 2215 of the adapter housing 2210. In certain implementations, the intermediate walls 2229 extend fully between the adjacent contact members 2241. In other implementations, intermediate wall sections 2229 extend between portions of the adjacent contact members 2241.

In the example shown in FIGS. 58-59, each slot 2225 includes one or more intermediate wall sections 2229 configured to extend between each pair of adjacent contact members 2241. For example, in certain implementations, intermediate wall sections 2229 extends longitudinally from ends of the slots 2225 to separate the ends of each pair of adjacent contact members 2241. In some implementations, intermediate wall sections 2229 also may extend longitudinally along an intermediate portion of the slot 2225 to separate intermediate sections of adjacent contact members 2241. In the example shown, some intermediate wall sections 2229 are located to extend between the third moveable contact sections 2246 of adjacent pairs (see FIG. 66).

In some implementations, the adapter housing 2210 has more slots 2225 than media reading interfaces 2240. For example, in some implementations, each adapter housing 2210 defines a slot 2225 at each port of each passage 2215 and one media reading interface 2240 per passage. In other implementations, however, the adapter housing 2210 may have the same number of slots 2225 and media reading interfaces 2240. For example, in certain implementations, each adapter housing 2210 may defines a slot 2225 at only one port of each passage 2215 or may include a media reading interface 2240 at each port. In other implementations, the adapter housing 2210 may define a slot 2225 at each port of alternate passages 2215.

As shown in FIG. 48, each media reading interface 2240 positioned in a slot 2225 of the adapter housing 2210 is configured to connect a storage device 1130 of a connector 1110 received at the adapter housing 2210 with a circuit board 2250 coupled to the adapter housing 2210. For example, a circuit board 2250 may be secured (e.g., via fasteners 2255) to the adapter housing 2210 so as to extend over the slots 2225 of the adapter housing 2210. Each media reading interface 2240 positioned in the adapter housing 2210 extends generally between the circuit board 2250 and a respective axial passage 2215. Portions of each contact member 2241 are configured to engage tracings and contacts on the circuit board 2250. Other portions of the contact members 2241 are configured to engage the electrical contacts 1132 of the storage members 1130 attached to any connector arrangements 1100 plugged into the adapter housing 2210.

In accordance with some aspects, the media reading interfaces 2240 of the coupler assembly 2200 are configured to detect when a connector arrangement 1100 is plugged into a port of the adapter housing 2210. For example, the contact members 2241 of a media reading interface 2240 can function as presence detection sensors or trigger switches. In some implementations, the contact members 2241 of a media reading interface 2240 are configured to form a complete circuit with the circuit board 2250 only when a connector 1110 is inserted within a respective passage 2215.

For example, at least a portion of each contact member 2241 may be configured to contact the circuit board 2250 only after being pushed toward the circuit board 2250 by a connector 1110. In other example implementations, portions of the contact members 2241 can be configured to complete a circuit until the connector 1110 pushes the contact member portions away from the circuit board 2250 or from a shorting rod. In accordance with other aspects, however, some implementations of the contact members 2241 may be configured to form a complete circuit with the circuit board 2250 regardless of whether a connector 1110 is received in a passage 2215.

Figure 62:
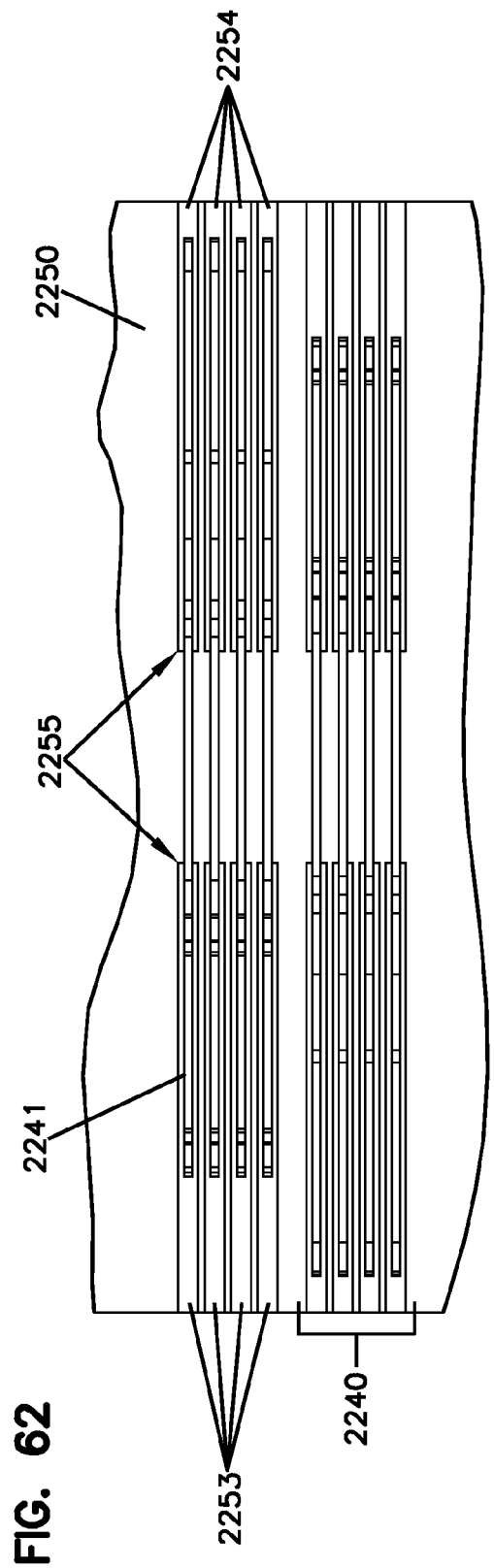
Figure 63:
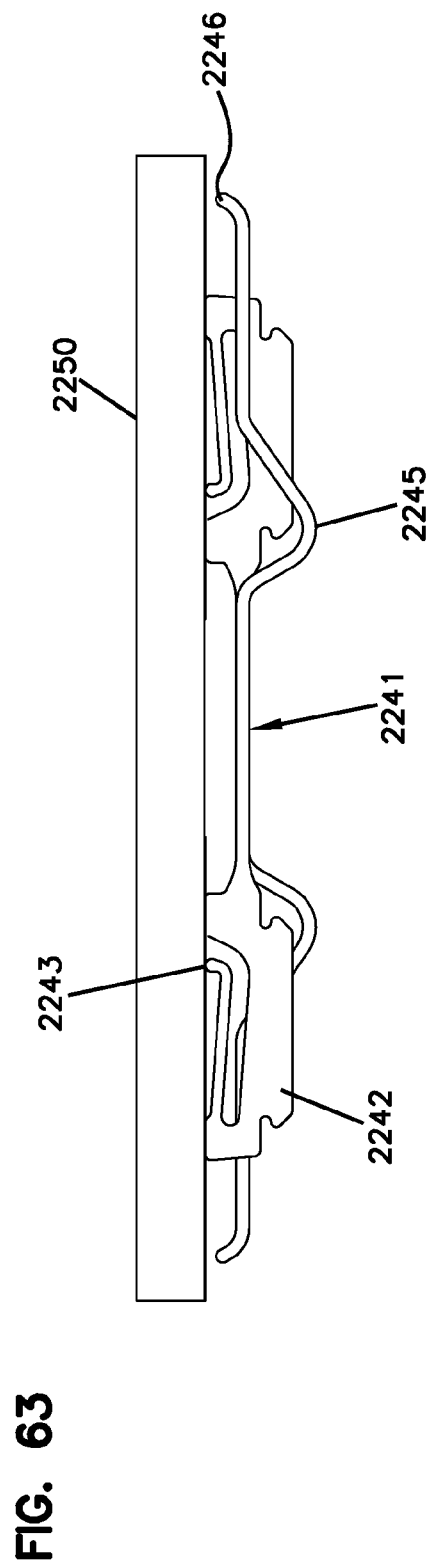

FIGS. 61-63 show portions of one example implementation of a circuit board 2250. The same or similar circuit boards 2250 are suitable for use in any of the coupler assemblies described herein. The example circuit board 2250 includes a plurality of first contact pads 2253 and a plurality of second contact pads 2254 spaced from the first contact pads 2253. In the example shown, the first and second contact pads 2253, 2254 are separated into groups 2256, 2257, respectively. Each group 2256, 2257 of contact pads 2253, 2254 is associated with a media reading interface 2240.

In some implementations, each circuit board 2250 includes a single group 2256, 2257 of each type of contact pad 2253, 2254. In other implementations, each circuit board 2250 includes two groups 2256, 2257 of each type of contact pads 2253, 2254. In certain implementations, the groups 2256, 2257 may be flipped to accommodate media reading interfaces 2240 of different orientations. For example, the circuit board 2250 may include a first group 2256 of first contact pads 2253 at a first end of the board 2250, a first group 2257 of second contact pads 2254 at a second end of the board 2250, a second group 2256 of first contact pads 2253 at the second end of the board 2250, and a second group 2257 of second contact pads 2254 at the first end of the board 2250. In other implementations, each of the groups 2256 of first contact pads 2253 may be positioned at the first end of the board 2250 and each group 2257 of second contact pads 2254 may be positioned at the second end of the board 2250.

In some implementations, each circuit board 2250 may include one or more sets 2258 of one or more groups 2256, 2257 of contact pads. In certain implementations, each circuit board 2250 includes a set 2258 of contact pads for each axial passage defined in the adapter housing 2210. In the example shown in FIG. 61, the circuit board 2250 includes six sets 2258 of contact pads. Each set 2258 of contact pads includes two groups 2256 of first contact pads 2253 and two groups 2257 of second contact pads 2254. Gaps between adjacent contact pad sets 2258 are wider than gaps between adjacent contact pad groups 2256, 2257. Gaps between adjacent contact pad groups 2256, 2257 are wider than gaps between contact pads 2253, 2254 within each group 2256, 2257.

In certain implementations, the circuit board 2250 defines one or more fastener openings 2252 through which fasteners 2255 may extend to secure the circuit board 2250 to the adapter housing 2210. In some implementations, a fastener opening 2252 is defined at opposite ends of the circuit board 2250. In certain implementations, a fastener opening 2252 is defined between each adjacent set 2258 of contact pads. In other implementations, greater or fewer fastener openings 2252 may be provided at the same or other locations on the board 2250.

In some implementations, each of the first contact pads 2253 within each set 2258 is longitudinally aligned with one of the second contact pads 2254 to form a landing pair 2255. In other implementations, however, the first and second contact pads 2253, 2254 may be longitudinally offset from each other. In certain implementations, the first contact pads 2253 are laterally aligned with each other and the second contact pads 2254 are laterally aligned with each other. In other implementations, however, the first contact pads 2253 may be laterally offset or staggered from each other and/or the second contact pads 2254 may be laterally offset of staggered from each other.

Each contact member 2241 of a media reading interface 2240 extends across one landing pair 2255. In the example shown, the first moveable contact surface 2243 of each contact member 2241 touches one of the first contact pads 2253. In certain implementations, the stationary contacts 2257 also touch the first contact pads 2253. The third moveable contact surface 2246 of each contact member 2241 is configured to selectively touch the second contact pad 2254 that forms a landing pair 2255 with the first contact pad 2253. Touching the third contact surface 2246 of a contact member 2241 to the second contact pad 2254 completes a circuit between the first and second contact pads 2253, 2254.

As shown in FIGS. 46-48, the circuit board 2250 is configured to extend over the slots 2225 defined in the adapter housing 2210. Portions of the contact members 2241 of each media reading interfaces 2240 extend towards the circuit board 2250 and portions of the contact members 2241 extend towards the axial passageways 2215 defined in the adapter housing 2210. For example, the first moveable contact section 2243 of each contact member 2241 is configured to extend through the slot 2225 and engage the circuit board 2250. The stationary contacts 2247 also are configured to extend through the slot 2225 to engage the circuit board 2250. The ability of the first contact section 2243 to flex relative to the stationary contact 2247 provides tolerance for placement of the contact member 2241 relative to the circuit board 2250.

The second moveable contact section 2245 is configured to extend through the slot 2225 and into a respective axial passage 2215 defined in the adapter housing 2210. If a connector 1110 is positioned at the passage 2215, then the second moveable contact section 2245 is configured to engage at least a deflection surface of the connector 1110. If a storage device 1130 is installed on the connector 1110, then the second contact surface 2245 is configured to engage the contact pads 1132 of the storage device 1130.

The third moveable contact surface 2246 is configured to selectively extend through the slot 2225 to engage the circuit board 2250. For example, the third moveable contact surface 2246 is configured to swipe against the printed circuit board 2250 (see FIG. 69). In some implementations, the third contact surface 2246 may be configured to engage the circuit board 2250 when a connector 1110 is inserted into a respective passage 2215. For example, the resilient section 2244 enables a force pushing the second section 2245 towards the slot 2225 to move the third section 2246 upwardly through the slot 2225 and toward the circuit board 2250.

FIGS. 64-69 illustrate the effect of inserting a fiber optic connector 1110 into a port of an adapter housing 2210 including a first media reading interface 2240 positioned at the port. The adapter housing 2210 is coupled to a circuit board 1250, only a portion of which is visible in the drawings. The first media reading interface 2240 includes at least a first contact member 2241 positioned in a slot 2225 of the adapter housing 2210. Portions of the first contact member 2241 extend towards the passage 2215 and portions of the first contact member 2241 extend towards the circuit board 2250.

In some implementations, each media reading interface 2240 includes at least three contact members 2241. Each contact member 2241 is positioned in a separate slot 2225. Adjacent slots 2225 are separated by intermediate walls 2229. In certain implementations, each media reading interface 2240 includes four contact members 2241. In other implementations, however, each media reading interface 2240 may include greater or fewer contact members 2241.

Figure 66:
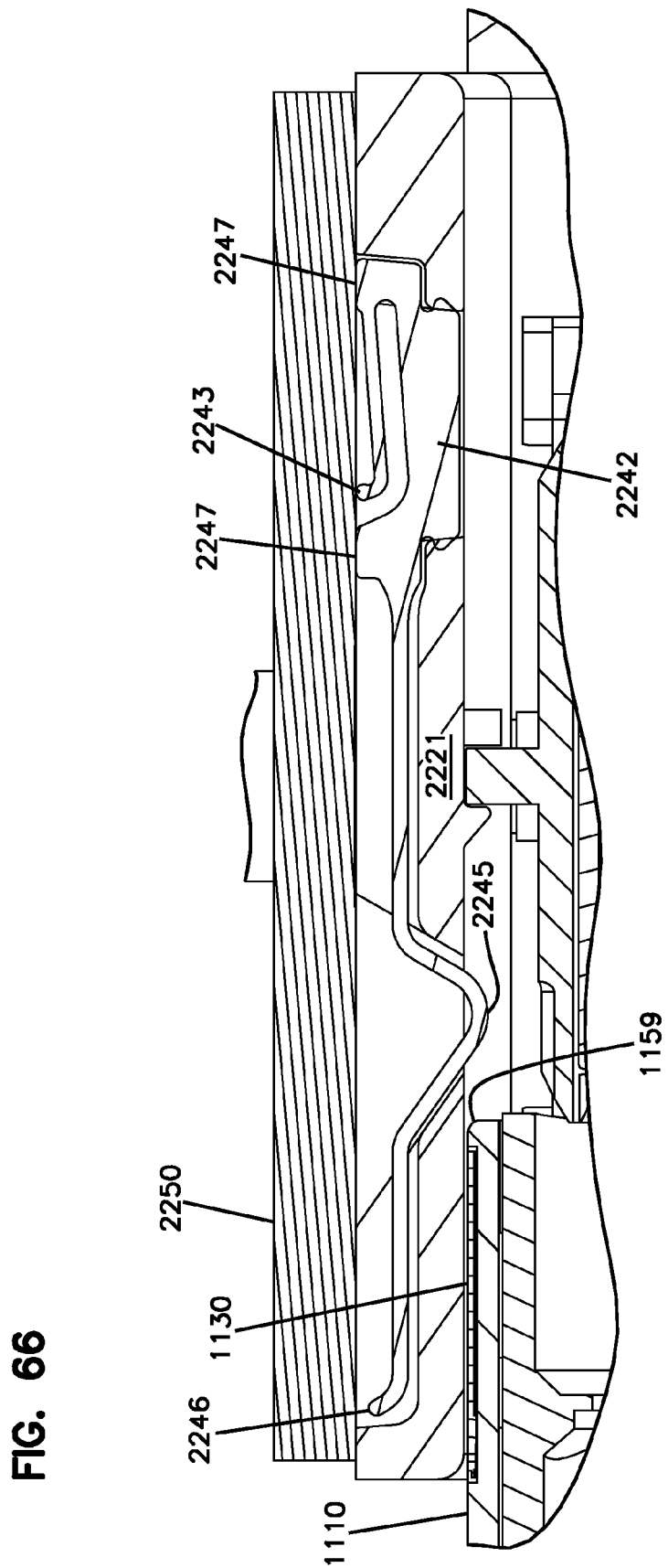
Figure 69:
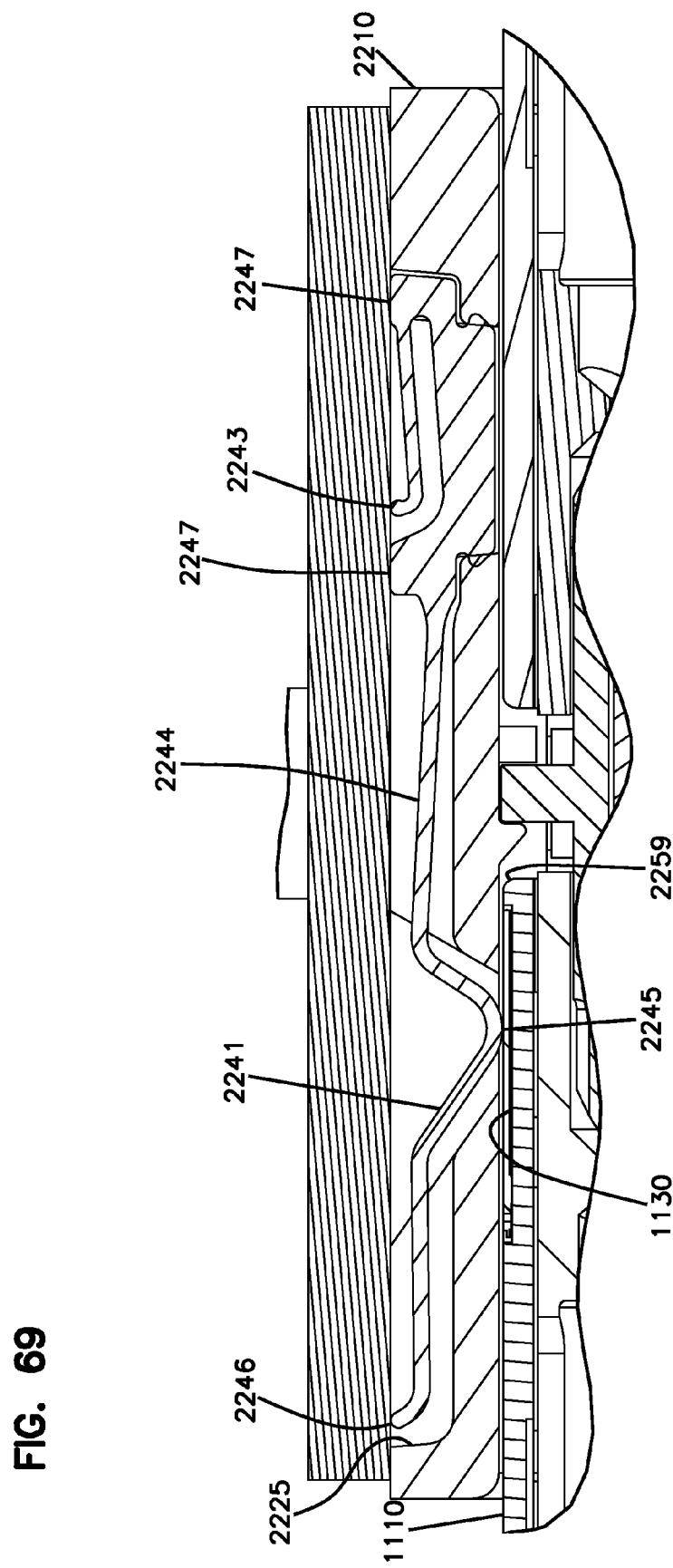

In the cross-sections shown in FIGS. 66 and 69, only the first contact members 2241 of one media reading interface 2240 is visible. Portions of the other contact members 2241 of the same media reading interface 2240 cannot be seen in FIG. 66 since the other contact members 2241 laterally align with the first contact member 2241. In addition, intermediate wall sections 2229 may block the other contact members 2241 of the same or other media reading interfaces 2240 from view.

Figure 64:
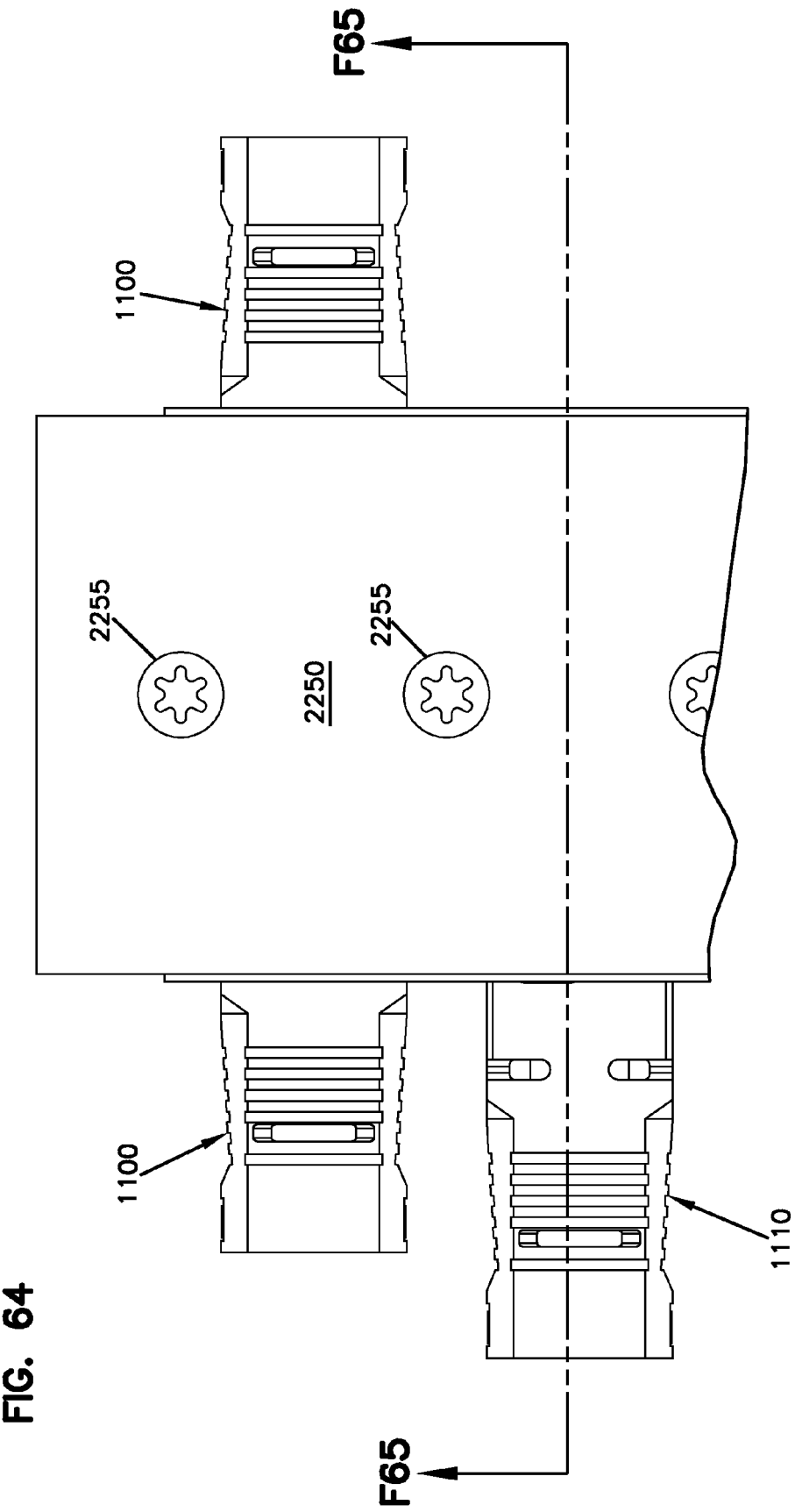
Figure 65:
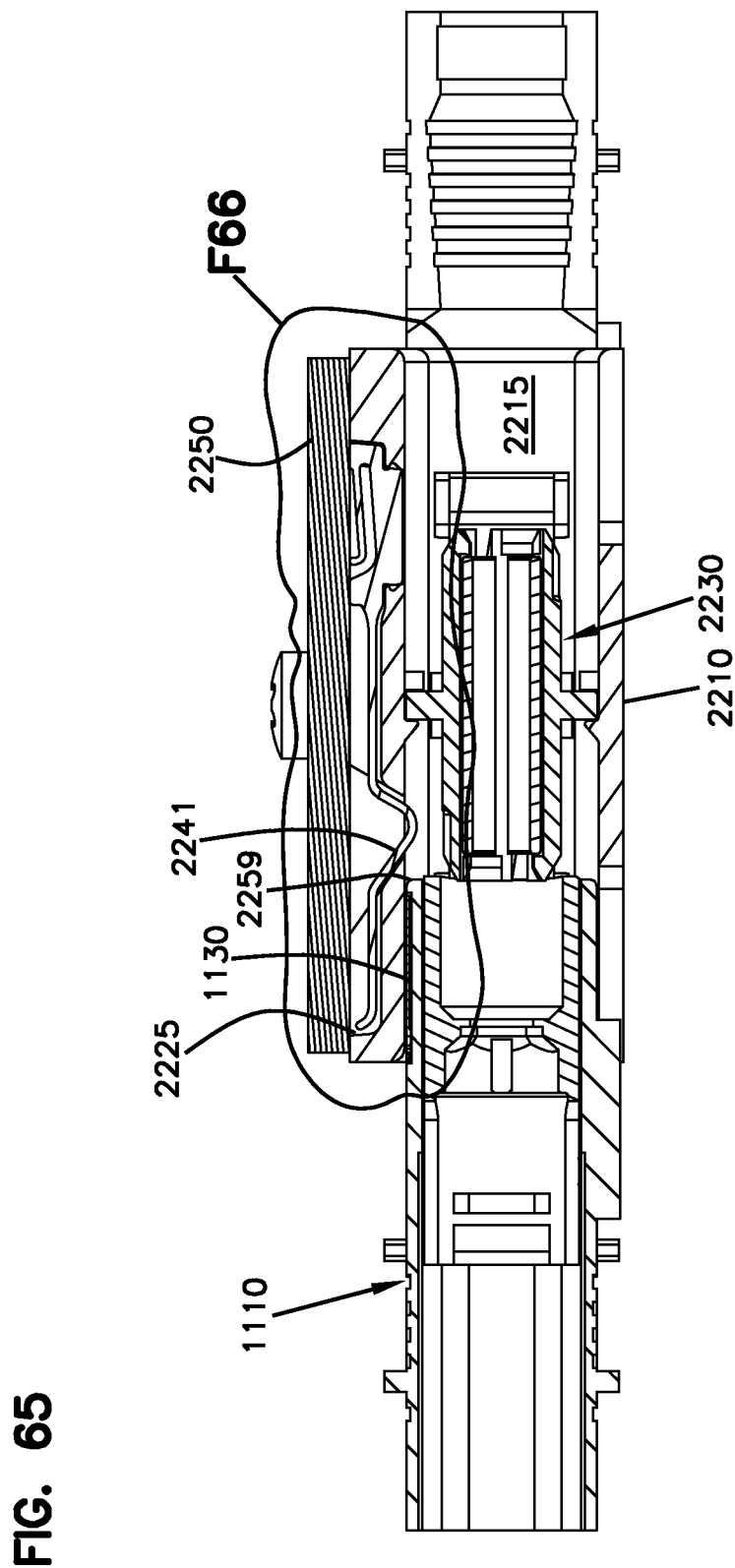

In FIGS. 64-66, one connector 1110 is partially inserted into a port at one side of a passage 2215 defined in the adapter housing 1210. A media reading interface 2240 including at least one contact member 2241 is positioned at a slot 2225 leading to the passage 2215. The base 2242 of the contact member 2241 seats in the second opening 2226 to secure the contact member 2241 within the slots 2225 (e.g., by snapping into second opening 2226). The first moveable contact surface 2243 extends through the slot 2225 and engages one of the first contact pads 2253 of the circuit board 2250. The stationary contacts 2247 also extend through the slot 2225 and engage the first contact pad 2253 of the circuit board 2250.

Inserting a connector 1110 into an adapter passage 2215 causes the deflection surface 1159 of a connector 1110 to slide within the passage 2215 towards the second moveable contact surface 2245. In the example shown in FIG. 66, the deflection surface 1159 of the connector 1110 has not yet reached the second moveable section 2245 of the contact members 2241. Accordingly, the second moveable contact surface 2245 extends through the first opening 2222 in the recessed surface 2221 of the slot 2225 and into the passage 2215 of the adapter housing 2210. The third moveable contact surface 2246 is spaced from the second contact pad 2254 of the circuit board 2250. For example, the third moveable contact surface 2246 may rest against a ledge 2223 defined by the recessed surface 2221 in the slot 2225.

Figure 67:
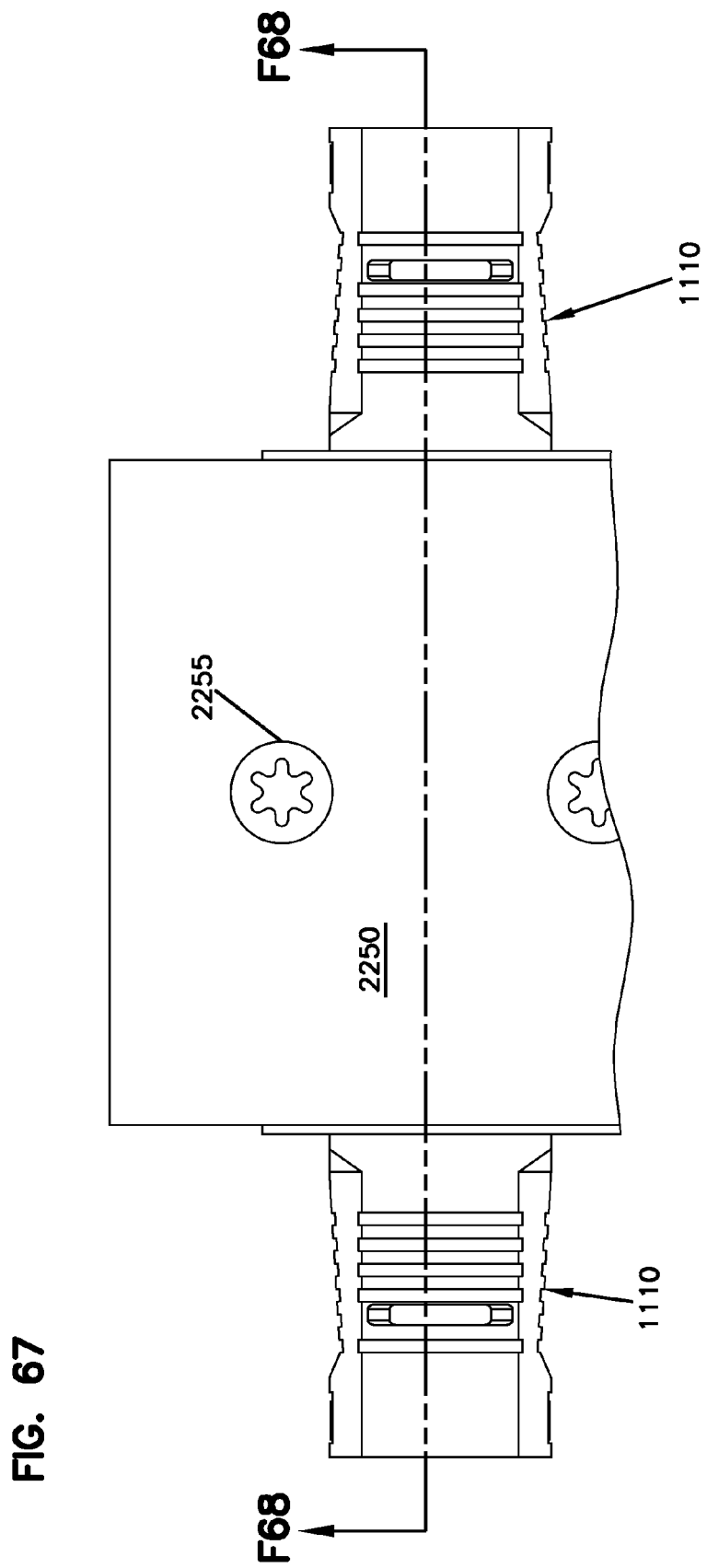
Figure 68:
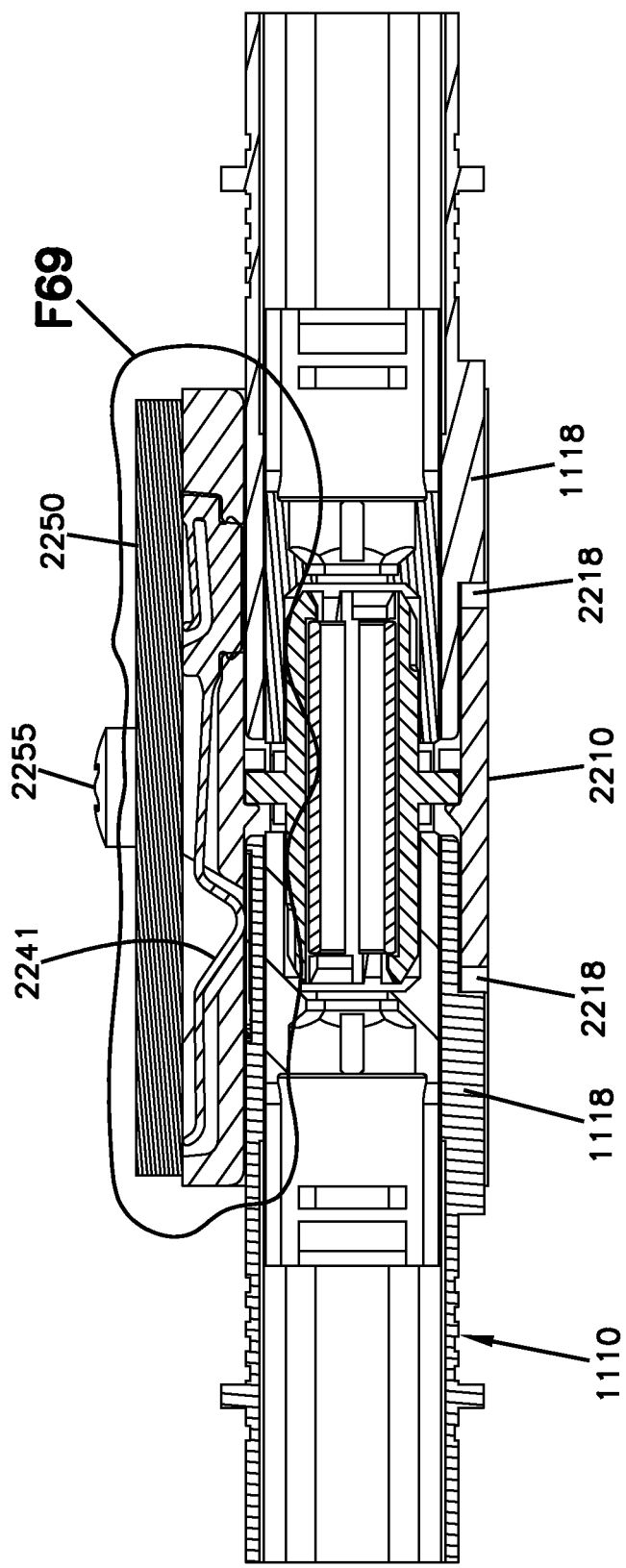

As shown in FIGS. 67-69, continuing to insert the connector 1110 causes the deflection surface 1159 to engage and push the second moveable contact surface 2245 out of the passage 2215. Pushing the second moveable contact surface 2245 out of the passage 2215 pushes the third moveable contact surface 2246 away from the ledge 2223 toward the circuit board 2250. In certain implementations, pushing the third moveable contact surface 2246 away from the ledge 2223 causes the third contact surface 2246 to engage (e.g., touch or wipe across) the second contact pad 2254 of the circuit board 2250. Accordingly, the presence of the connector 1110 in the passage 2215 may be detected when the deflection surface 1159 of the connector 1110 engages the contact member 2241.

In some implementations, the connector 1110 does not include a storage device 1130. For example, the connector 1110 may be an existing connector that does not store physical layer information. In other implementations, the connector 1110 may be part of a duplex connector arrangement in which the other connector 1110 holds the storage device 1130. In other implementations, however, the connector 1110 may include a storage device 1130. In such implementations, the second contact surface 2245 of the contact member 2241 slides or wipes across the surface of the contacts 1132 of the storage device 1130 during insertion of the connector 1110 (see FIG. 69). When the connector 1110 is fully inserted, a processor coupled to the circuit board 2250 can access the memory 1133 of each connector arrangement 1100 through corresponding ones of the contact members 2241, 1131.

In some implementations, the connector storage device 1130 is spaced from the deflection edge 1159 of the connector 1110. When such a connector 1110 is inserted into the passage 2215 of an adapter housing 2210, the deflection edge 1159 engages and pushes the second moveable contact surface 2245 against the circuit board 2250 before the second moveable contact surface 2245 engages the contacts 1132 of the connector storage device 1130. Accordingly, the presence of the connector 1110 within the passage 2215 may be detected before the memory 1133 of the storage device 1130 can be accessed.

In other implementations, at least a portion of the connector storage device 1130 is accessible through a recess in the deflection surface 1159. In such implementations, the second contact surface 2245 of at least one the contact member 2241 touches the storage device contacts 1132 as the third moveable contact surface 2246 is being deflected against the circuit board 2250. Accordingly, the presence of the connector 1110 within the passage 2215 may be detected at approximately the same time that the memory 1133 of the connector storage device 1130 can be accessed.

As discussed above, a processor (e.g., processor 217 of FIG. 2) or other such equipment also can be electrically coupled to the printed circuit board 2250. Accordingly, the processor can communicate with the memory circuitry 1133 on the connector storage device 1130 via the contact members 2241 and the printed circuit board 2250. In accordance with some aspects, the processor is configured to obtain physical layer information from the connector storage device 1130. In accordance with other aspects, the processor is configured to write (e.g., new or revised) physical layer information to the connector storage device 1130. In accordance with other aspects, the processor is configured to delete physical layer information from the connector storage device 1130. In still other implementations, the processor detects the presence or absence of a connector 1110 in each passage 2215.

Removing the connector 1110 from the passage 2215 releases the second moveable contact portion 2245 of the contact member 2241, thereby allowing the third moveable contact portion 2246 to move back to the initial position (see FIG. 66). Dropping the third moveable contact portion 2246 disengages the third contact surface 2246 from the circuit board 2250, thereby interrupting the circuit created by the contact member 2241. Interrupting the circuit enables a processor connected to the circuit board 2250 to determine that the connector 1110 has been removed from the passage 2215.

In accordance with some implementations, dust caps 2260 can be used to protect passages 2215 of the adapter housings 2210 when connector arrangements 1100 or other physical media segments are not received within the passages 2215. For example, a dust cap 2260 can be configured to fit within a front entrance or a rear entrance of each adapter passage 2215. The dust caps 2260 are configured to inhibit the ingress of dust, dirt, or other contaminants into the passage 2215. In accordance with some implementations, the dust caps 2260 are configured not to trigger the presence sensor/switch of the adapter 2210.

FIGS. 71-74 show one example implementation of a dust cap 2260 suitable for use with any of the adapter housings 1210, 2210 disclosed herein. In the example shown, the dust cap 2260 includes a cover 2261 configured to block access to a passage 1215, 2215 of an adapter housing 1210, 2210. In some implementations, the cover 2261 extends over a mouth of the passage 1215, 2215. In other implementations, the cover 2261 is sized to fit inside the passage 1215, 2215 and to sealingly engage an inner periphery of the passage 1215, 2215 (e.g., see FIG. 76).

A handle including a grip 2265 and a stem 2266 extend outwardly from a first side of the cover 2261. The handle facilitates insertion and withdrawal of the dust cap 2260 from the passage 1215, 2215. Certain types of dust caps 2260 include a handle that has a key member that fits with a channel or recess in the adapter passage 1215, 2215.

An insertion member 2262 extends outwardly from a second side of the cover 2261. The insertion member 2262 is configured to fit within a passage 1215, 2215 of the adapter housing 1210, 2210. In the example shown, the front of the insertion member 2262 defines a lug 2268 that is sized and shaped to be received within the sleeve mount arrangement 1231 located in the passage 1215, 2215. Tabs 2269 extend forwardly from the insertion member 2262 on opposite sides of the lug 2268. The tabs 2269 are sized and positioned to slide over an exterior of the passage 1234 defined by the sleeve mount arrangement 1231.

The insertion member 2262 includes outwardly extending ridges 2263 that define recessed sections 2264 between the ridges 2263 and the cover 2261. When the dust cap 2260 is inserted at a port 1215, 2215, the flexible latching hooks 1236 of the sleeve mount arrangement 1231 within the passage 1215, 2215 engage the recessed sections 2264 defined in the insertion member 2262 to releasably hold the dust cap 2260 at the adapter port 1215, 2215. For example, the latching hooks 1236 may flex over the ridges 2263 of the insertion member 2262 and snap into the recessed sections 2264.

Figure 76:
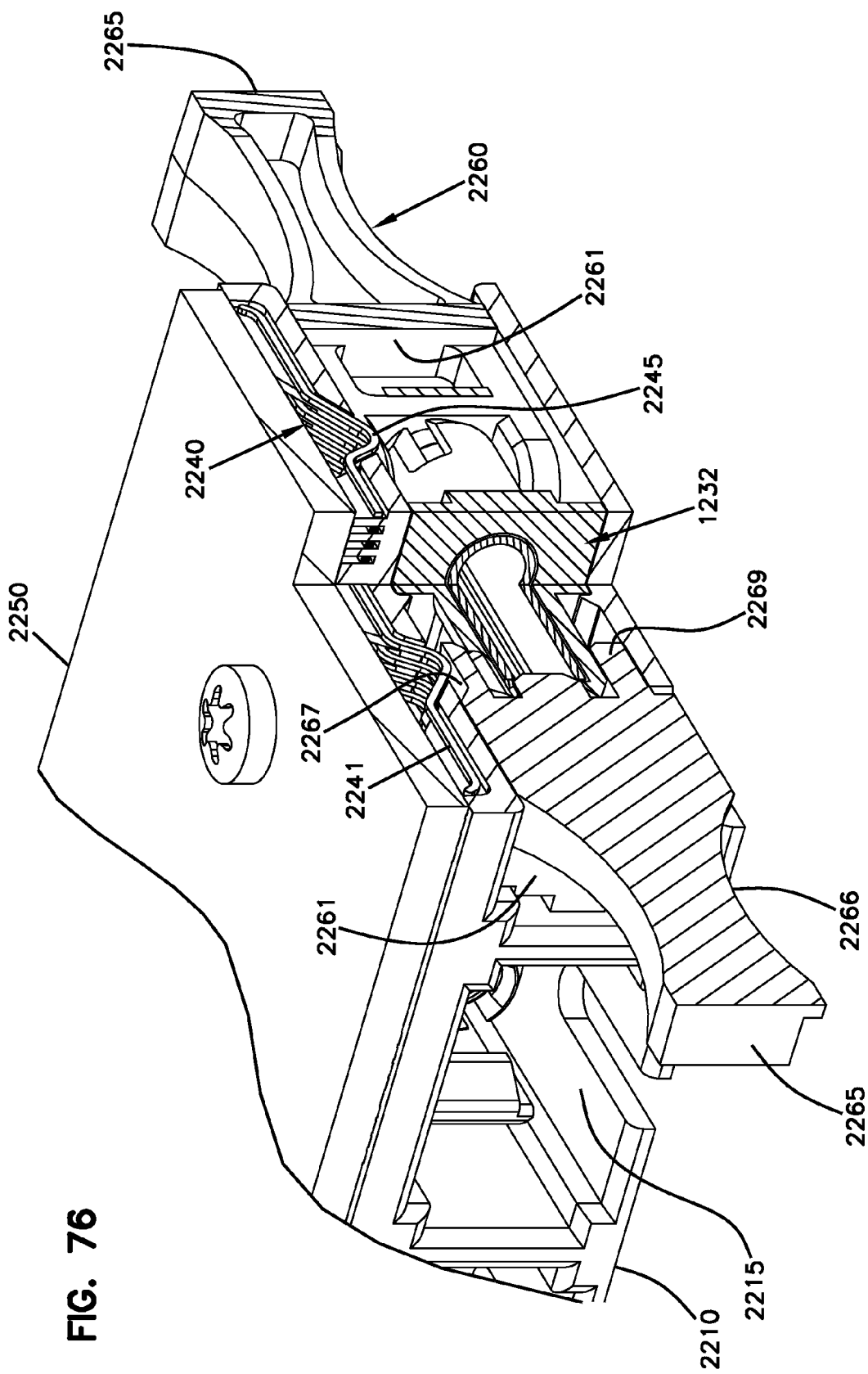
Figure 77:
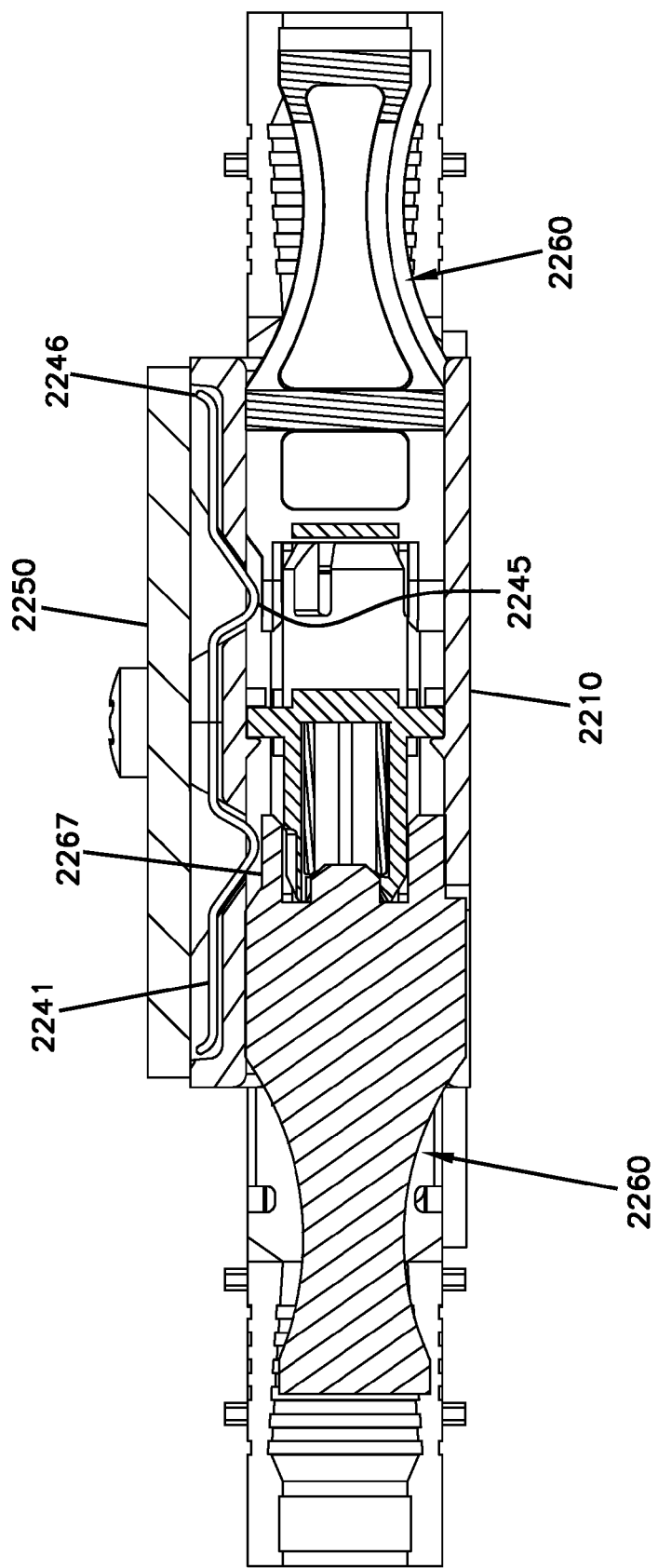

In some implementations, the dust caps 2260 are shaped and configured to avoid triggering the presence detection sensor/switch formed by the media reading interfaces (e.g., see FIGS. 76 and 77). Accordingly, insertion of a dust cap 2260 into a passage 1215, 2215 does not trigger the presence switch associated with the passage 1215, 2215. For example, the dust caps 2260 can be shaped and configured to inhibit engaging the second contact location 1245 of the contact members 1241 associated with the respective passage 1215, 2215. In the example shown, the front ends of one or both tabs 2269 define recessed portions 2267 that taper inwardly or otherwise extend away from the contact members 1241 (see FIG. 77).

In other implementations, the dust caps 2260 may include storage devices containing physical layer information. In such implementations, the dust caps 2260 may be shaped and configured to trigger the presence switch through interaction with the contact members 1241 and to be read through any media reading interfaces 1240 positioned at an adapter passage 1215, 2215.

Figure 70:
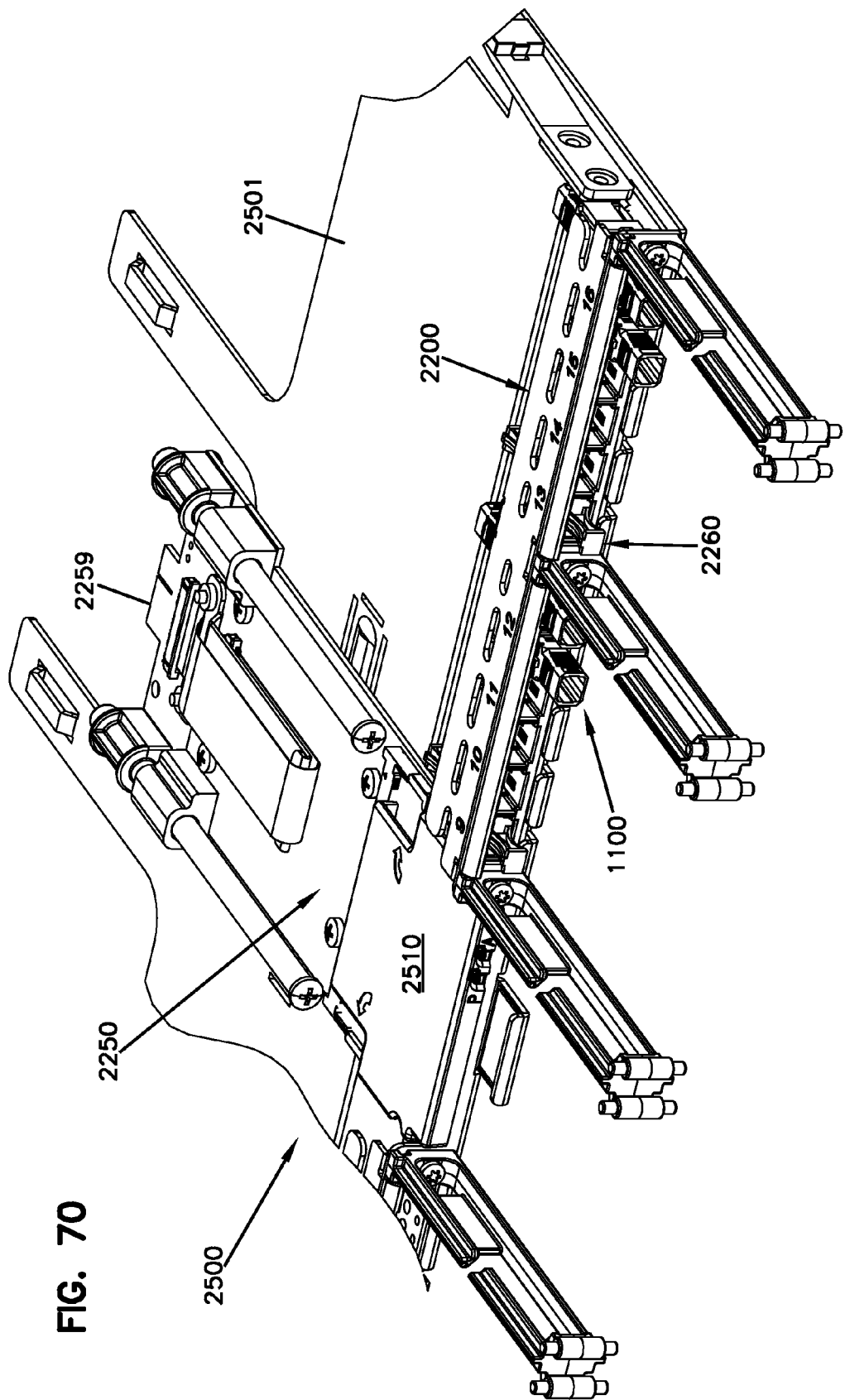
FIG. 70 illustrates an example connector assembly implemented as a blade configured to mount to a chassis, the blade including one or more coupler assemblies for receiving fiber optic connectors.
Figure 75:
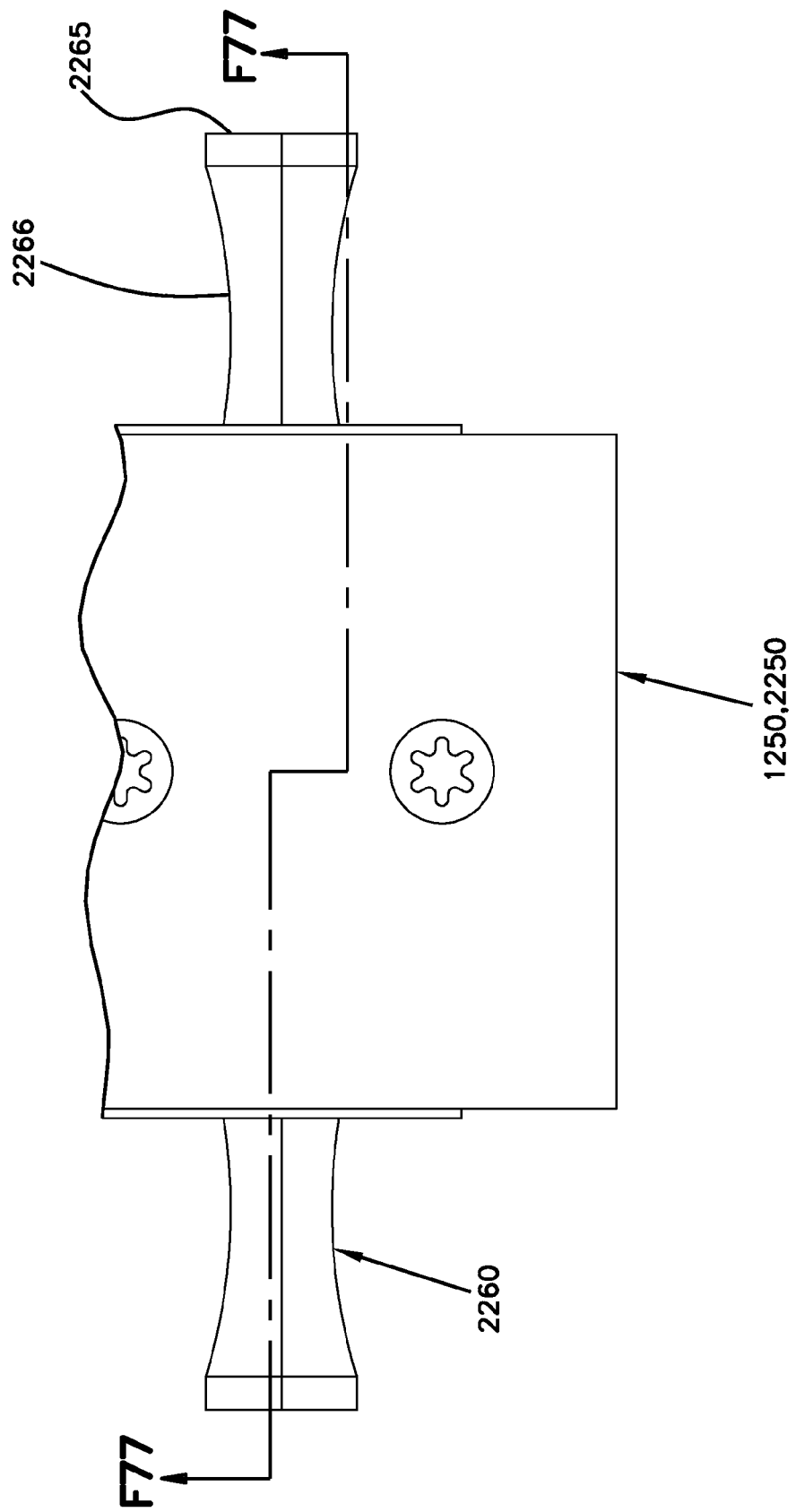

FIG. 70 shows one example implementation of a connector assembly 2500 on which any of the connector systems 1000, 2000 described herein can be implemented. The example connector assembly 2500 is implemented as a bladed chassis. The chassis 2500 includes a blade 2501 on which one or more coupler assemblies 1200, 2200 may be mounted. A processor 2510 also may be positioned on the blade 2501. A circuit board 1250, 2250 also may be positioned on the blade 2501 to electrically connect the coupler assembly 1200, 2200 to the processor 2510. In certain implementations, a portion of the circuit board 1250, 2250 may define a connection end 2259 that is configured to connect to a network port of a data network (e.g., see network 218 of FIG. 2). Additional details regarding bladed chassis systems can be found in U.S. application Ser. No. 13/025,750, filed Feb. 11, 2011, and titled "Communications Bladed Panel System," the disclosure of which is hereby incorporated herein by reference in its entirety.

The above specification, examples and data provide a complete description of the manufacture and use of the composition of the invention. Since many implementations can be made without departing from the spirit and scope of the invention, the invention resides in the claims hereinafter appended.

The invention claimed is:

1. A fiber optic adapter module comprising:
   a housing extending from a first end to a second end, the housing including opposing major surfaces extending between opposing minor surfaces and between the first and second ends, the housing defining at least one passageway extending between the first and second ends of the housing to define first and second ports at the first and second ends, respectively, the housing being configured to retain a fiber optic connector at each port;
   a first media reading interface positioned at a first of the major surfaces of the housing, the first media reading interface including a plurality of contact members; and
   a second media reading interface positioned at the first major surface of the housing, an orientation of the second media reading interface being flipped 180° relative to an orientation of the first media reading interface, wherein a majority of the second media reading interface extends along a majority of the first media reading interface.

2. The fiber optic adapter module of claim 1, wherein each media reading interface includes a plurality of contact members.

3. The fiber optic adapter module of claim 2, wherein the plurality of contact members of each media reading interface includes at least three contact members.

4. The fiber optic adapter module of claim 3, wherein the plurality of contact members of each media reading interface includes four contact members.

5. The fiber optic adapter module of claim 2, further comprising a circuit board coupled to the housing, the circuit board having a first surface defining a first plurality of contact pads and a second plurality of contact pads, the first media reading interface being disposed at the first plurality of contact pads and the second media reading interface being disposed at the second plurality of contact pads.

6. The fiber optic adapter module of claim 1, wherein the first media reading interface is offset towards the first end of the housing relative to the second media reading interface.

7. The fiber optic adapter module of claim 1, wherein the housing defines a plurality of passageways extending between the first and second ends of the housing, wherein the first and second media reading interfaces provide access between a first of the passageways and an exterior of the housing.

8. The fiber optic adapter module of claim 7, wherein a plurality of additional media reading interfaces are positioned at the first major surface of the housing, each of the additional media reading interfaces providing access between another of the passageways and the exterior of the housing.

9. The fiber optic adapter module of claim 8, wherein an orientation of each of the additional media reading interfaces is flipped 180° relative to an orientation of an adjacent one of the additional media reading interfaces.

10. The fiber optic adapter module of claim 7, wherein the plurality of passageways includes six passageways.

11. The fiber optic adapter module of claim 1, wherein the opposing major surfaces and the opposing minor surfaces of the housing are monolithically formed.

12. The fiber optic adapter module of claim 11, wherein a mounting tab extends outwardly from each of the minor sides.

13. The fiber optic adapter module of claim 1, wherein a second of the major surfaces defines a keyway at each port.

14. The fiber optic adapter module of claim 1, wherein the housing is configured to retain an SC-type fiber optic connector at each port.

15. The fiber optic adapter module of claim 1, wherein the housing also defines a first plurality of slots at a first major surface of the housing and a second plurality of slots at the first major surface of the housing, each of the passageways being associated with a respective one of the slots of the first plurality and a respective one of the slots of the second plurality.

16. The fiber optic adapter module of claim 15, wherein the first plurality of slots are offset towards the first end of the housing relative to the second plurality of slots.

17. A fiber optic adapter module comprising:
a housing extending from a front to a rear, the housing including opposing end walls extending between opposing side walls and between the front and rear, the housing defining at least one passageway extending between the front and the rear to define first and second ports at the front and the rear, respectively, the housing being configured to retain a fiber optic connector at each port, the housing also defining at least a first opening in a first of the end walls, the first opening leading to the passageway;
a cover element having first and second major surfaces, the cover element being configured to couple to the housing at the first end wall to cover the first opening, the first major surface of the cover element defining at least one slot, at least a portion of the slot extending through the second major surface of the cover element;
a first media reading interface positioned in the cover element, the first media reading interface having at least a first contact location and a second contact location, the first media reading interface being configured so that the second contact location is accessible from within the passageway and the first contact location is accessible through the slot defined in the first major surface when the cover element is coupled to the housing; and
a second media reading interface positioned at the first major surface of the housing, an orientation of the second media reading interface being flipped 180° relative to an orientation of the first media reading interface, wherein a majority of the second media reading interface extends along a majority of the first media reading interface.

18. The fiber optic adapter module of claim 17, further comprising a first circuit board coupled to the housing, the first circuit board extending over the first major surface of the cover element so that the first contact section of the first media reading interface contacts the first circuit board through the slot defined in the first major surface of the cover element.

19. The fiber optic adapter module of claim 17, further comprising a dust cap received at the first port, the dust cap being configured to not touch the second contact location of the first media reading interface.

* * * * *